US012729216B2

(12) United States Patent
Xu et al.

(10) Patent No.: US 12,729,216 B2
(45) Date of Patent: Sep. 8, 2026

(54) FERROCENE-BASED UNSYMMETRICAL LIGANDS BEARING BULKY DI(ADAMANTYL)PHOSPHINO MOTIF AND THEIR METAL CATALYSTS

(71) Applicant: SIGMA-ALDRICH CO. LLC, St. Louis, MO (US)

(72) Inventors: Guolin Xu, Germantown, WI (US); Thomas Colacot, Cherry Hill, NJ (US); Peng Gao, Mequon, WI (US)

(73) Assignee: SIGMA-ALDRICH CO. LLC, St. Louis, MO (US)

( * ) Notice: Subject to any disclaimer, the term of this patent is extended or adjusted under 35 U.S.C. 154(b) by 523 days.

(21) Appl. No.: 18/551,807

(22) PCT Filed: Mar. 25, 2022

(86) PCT No.: PCT/US2022/021906

§ 371 (c)(1),
(2) Date: Sep. 21, 2023

(87) PCT Pub. No.: WO2022/204490

PCT Pub. Date: Sep. 29, 2022

(65) Prior Publication Data

US 2024/0199671 A1 Jun. 20, 2024

Related U.S. Application Data

(60) Provisional application No. 63/166,094, filed on Mar. 25, 2021.

(51) Int. Cl.

| | |
|---|---|
| ***C07F 17/02*** | (2006.01) |
| ***B01J 31/16*** | (2006.01) |
| ***B01J 31/24*** | (2006.01) |

(52) U.S. Cl.

CPC ........... *C07F 17/02* (2013.01); *B01J 31/1616* (2013.01); *B01J 31/2409* (2013.01); *B01J 2531/0238* (2013.01); *B01J 2531/824* (2013.01)

(58) Field of Classification Search

CPC ................ B01J 31/1616; B01J 31/2409; B01J 2231/4205; B01J 2231/4277;

(Continued)

(56) References Cited

U.S. PATENT DOCUMENTS

2018/0265532 A1* 9/2018 Giardello ............ C07F 15/0046

FOREIGN PATENT DOCUMENTS

| | | |
|---|---|---|
| CN | 101195641 A | 6/2008 |
| CN | 105396616 A | 3/2016 |

(Continued)

OTHER PUBLICATIONS

Alonso, N. et al., “Continuous synthesis of organozinc halides coupled to Negishi reactions”, Advanced Synthesis & Catalysis, vol. 356, No. 18, Jun. 20, 2014, pp. 3737-3741.

(Continued)

*Primary Examiner* — Brian A McCaig

(74) *Attorney, Agent, or Firm* — SIGMA-ALDRICH CO. LLC

(57) ABSTRACT

Ferrocenyl-based unsymmetrical ligands containing di(1-adamantyl)phosphino groups with general formula, Fc($Ad_2P$) ($R_2P$) and corresponding metal complexes, include metal halide complexes, N-biphenyl metal cationic complexes and R-allyl metal cationic complexes, useful in catalysis. The ligands and complexes overcome problems with conventional catalysts, providing new routes to previously challenging cross-coupling reactions, including C—P coupling, $C_{sp2}$-$C_{sp3}$ coupling and other conventional cross-coupling applications, while being scalable so that they can (Continued)

be provided in sufficient quantity and purity for industrial applications.

36 Claims, 6 Drawing Sheets

(58) Field of Classification Search
CPC ......... B01J 2531/0238; B01J 2531/824; C07B 37/04; C07B 2200/05; C07C 1/326; C07C 17/2632; C07C 41/30; C07C 67/343
See application file for complete search history.

(56) References Cited

FOREIGN PATENT DOCUMENTS

| | | | | |
|---|---|---|---|---|
| CN | 106795191 | A | 5/2017 | |
| CN | 108883405 | A | 11/2018 | |
| CN | 109661399 | A | 4/2019 | |
| CN | 110662753 | A | 1/2020 | |
| EP | 1405842 | A1 | 4/2004 | |
| JP | 2000-256384 | A | 9/2000 | |
| JP | 2013-063962 | A | 4/2013 | |
| JP | 2015-527300 | A | 9/2015 | |
| JP | 2019-528296 | A | 10/2019 | |
| WO | 98/57915 | A1 | 12/1998 | |
| WO | 00/34344 | A1 | 6/2000 | |
| WO | WO-0158588 | A1 * | 8/2001 | ............ B01J 31/181 |
| WO | 2013/159229 | A1 | 10/2013 | |
| WO | 2013/184198 | A1 | 12/2013 | |
| WO | 2015/063543 | A1 | 5/2015 | |
| WO | 2017/046133 | A1 | 3/2017 | |
| WO | 2017/193288 | A1 | 11/2017 | |
| WO | 2022/204490 | A1 | 9/2022 | |

OTHER PUBLICATIONS

Alsabeh, P. G. et al., "Stoichiometric reactivity relevant to the Mor-DalPhos/Pd-catalyzed cross-coupling of ammonia and 1-bromo-2-(phenylethynyl) benzene", Organometallics, vol. 31, No. 3, Jan. 19, 2012, pp. 1049-1054.

Atkinson, R. C. et al., "The syntheses and catalytic applications of unsymmetrical ferrocene ligands", Chemical Society Reviews, vol. 33, No. 5, 2004, pp. 313-328.

Atwater, B. et al., "The Selective Cross-Coupling of Secondary Alkyl Zinc Reagents to Five-Membered-Ring Heterocycles Using Pd-PEPPSI-IHeptCI", Angewandte Chemie International Edition, vol. 54, No. 33, 2015, pp. 9502-9506.

Atzrodt, J. et al., "Deuterium-and tritium-labelled compounds: applications in the life sciences", Angewandte chemie international edition, vol. 57, No. 7, 2018, pp. 1758-1784.

Bhonde, V. R. et al., "An Improved System for the Aqueous Lipshutz-Negishi Cross-Coupling of Alkyl Halides with Aryl Electrophiles", Angewandte Chemie, vol. 128, No. 5, 2016, pp. 1849-1853.

Bishop, J. J. et al., "Symmetrically disubstituted ferrocenes: I. The synthesis of potential bidentate ligands", Journal of Organometallic Chemistry, vol. 27, No. 2, 1971, pp. 241-249.

Boudier, A. et al., "Palladium catalyzed stereoselective cross-couplings and acylations of chiral secondary diorganozincs", Tetrahedron letters, vol. 40, No. 4, 1999, pp. 687-690.

Boyes, A. L et al., "Palladium (II) complexes of (diisopropylphosphino)-ferrocenes: improved catalysts for the Heck reaction", Tetrahedron letters, vol. 39, No. 42, 1998, pp. 7763-7766.

Bruno, N. C. et al., "Design and preparation of new palladium precatalysts for C—C and C—N cross-coupling reactions", Chemical science, vol. 4, No. 3, Aug. 20, 2012, pp. 916-920.

Buitrago-Santanilla et al., "Nanomole-scale high-throughput chemistry for the synthesis of complex molecules", Science, vol. 347, No. 6217, 2015, pp. 49-53.

Butler, I. R. et al., "1, 1'-Bis (alkylarylphosphino) ferrocenes: synthesis, metal complex formation, and crystal structure of three metal complexes of Fe (. eta. 5-C5H4PPh2) 2", Organometallics, vol. 4, No. 6, 1985, pp. 972-980.

Butler, I. R. et al., "Synthesis of some isopropylphosphinoferrocenes", Synthesis and Reactivity in Inorganic and Metal-Organic Chemistry, vol. 15, No. 1, 1985, pp. 109-116.

Campeau, L. C. et al., "Cross-coupling and related reactions: connecting past success to the development of new reactions for the future", Organometallics, vol. 38, No. 1, Nov. 27, 2018, pp. 3-35.

Charboneau, D. J. et al., "A Widely Applicable Dual Catalytic System for Cross-Electrophile Coupling Enabled by Mechanistic Studies", ACS catalysis, vol. 10, No. 21, 2020, pp. 12642-12656.

Chawner, S. J., "Divergent Synthesis of Cyclopropane-Containing Lead-Like Compounds, Fragments and Building Blocks through a Cobalt Catalyzed Cyclopropanation of Phenyl Vinyl Sulfide", European journal of organic chemistry, vol. 34, 2017, pp. 5015-5024.

Chen, L. et al., "An "on-cycle" precatalyst enables room-temperature polyfluoroarylation using sensitive boronic acids", ACS Catalysis, vol. 8, No. 4, Mar. 2, 2018, pp. 2989-2994.

Chen, L. et al., "Tri (1-adamantyl) phosphine: expanding the boundary of electron-releasing character available to organophosphorus compounds", Journal of the American Chemical Society, vol. 138, No. 20, May 10, 2016, pp. 6392-6395.

Chien, S. W. et al., "The Coordination and Homogeneous Catalytic Chemistry of 1, 1'-Bis (diphenylphosphino) ferrocene and its Chalcogenide Derivatives", Ferrocenes: Ligands, Materials and Biomolecules, Edited by Petr Stepnicka, 2008, pp. 33-116.

Christl, J. T. et al., "Catalyst activity and selectivity in the isomerising alkoxycarbonylation of methyl oleate", Chemistry—A European Journal, vol. 19, No. 50, Nov. 20, 2013, pp. 17131-17140.

Colacot, T. J.,"A concise update on the applications of chiral ferrocenyl phosphines in homogeneous catalysis leading to organic synthesis", Chemical reviews, vol. 103, No. 8, Feb. 11, 2003, pp. 3101-3118.

Colacot, T. J. et al., "Cp2Fe (PR2) 2PdCl2 (R= i-Pr, t-Bu) complexes as air-stable catalysts for challenging Suzuki coupling reactions", Organic letters, vol. 6, No. 21, Jul. 20, 2004, pp. 3731-3734.

Colacot, T. J. et al., "Ferrocenyl Phosphine Complexes of the Platinum Metals in Non-Chiral Catalysts", Platinum Metals Review, vol. 45, No. 1, 2001, pp. 22-30.

Colacot, T. J. et al., "Synthesis, coordination chemistry and catalytic use of dppf analogs", Ferrocenes: Ligands, Materials and Biomolecules, Edited by Petr Stepnicka, 2008, pp. 117-140.

Colacot, T. J. et al., "Synthesis, single crystal X-ray structure determination and NMR studies of Cp2Fe (PPh2) 2PtPh2 and Cp2Fe (PPh2) 2PtI2", Journal of organometallic chemistry, vol. 557, No. 2, Jun. 24, 1997, pp. 169-179.

Colacot, T. J. et al., "Synthesis, X-ray, spectroscopic and a preliminary Suzuki coupling screening studies of a complete series of dppfMX2 (M=Pt, Pd; X=Ci, Br, I)", Journal of Organometallic Chemistry, vol. 637, May 2, 2001, pp. 691-697.

Corcoran, E. B. et al., "Aryl amination using ligand-free Ni (II) salts and photoredox catalysis", Science, vol. 353, No. 6296, 2016, pp. 279-283.

Corley, E. G. et al., "Direct synthesis of 4-arylpiperidines via palladium/copper (I)-cocatalyzed Negishi coupling of a 4-piperidylzinc iodide with aromatic halides and triflates", The Journal of Organic Chemistry, vol. 69, No. 15, Jun. 25, 2004, pp. 5120-5123.

Cullen, W. R. et al., "Structure of the hydrogenation catalyst [(PP) Rh (Nbd)] ClO4, PP=(. eta. 5-(Me3C) 2PC5H4) 2Fe, and some comparative rate studies", Organometallics, vol. 2, No. 6, 1983, pp. 714-719.

Dai, C. et al., "The first general method for palladium-catalyzed Negishi cross-coupling of aryl and vinyl chlorides: use of commercially available Pd (P (t-Bu) 3) 2 as a catalyst", Journal of the American Chemical Society, vol. 123, No. 12, Feb. 22, 2001, pp. 2719-2724.

Deangelis, A. et al., "Prominent ligand types in modern cross-coupling reactions", RSC Catalysis Series No. 21, In New Trends in Cross-Coupling, 2014, pp. 20-90.

Dilauro, G. et al., "Scalable Negishi coupling between organozinc compounds and (Hetero) Aryl bromides under aerobic conditions

(56) References Cited

OTHER PUBLICATIONS when using bulk water or deep eutectic solvents with no additional ligands", Angewandte Chemie, vol. 60, 2021, pp. 10632-10636.
Dong, K. et al., "Efficient Palladium-Catalyzed Alkoxycarbonylation of Bulk Industrial Olefins Using Ferrocenyl Phosphine Ligands", Angewandte Chemie, vol. 129, No. 19, pp. 5351-5355, 2017.
Dreher, S. D. et al., "Efficient Cross-Coupling of Secondary Alkyltrifluoroborates with Aryl Chlorides Reaction Discovery Using Parallel Microscale Experimentation", Journal of the American Chemical Society, vol. 130, No. 29, Jun. 27, 2008, pp. 9257-9259.
Duplais, C. et al., "Cross-couplings between benzylic and aryl halides "on water": synthesis of diarylmethanes", Chemical communications, vol. 46, No. 4, Dec. 9, 2009, pp. 562-564.
Duplais, C. et al., "Organozinc chemistry enabled by micellar catalysis. Palladium-catalyzed cross-couplings between alkyl and aryl bromides in water at room temperature", Organometallics, vol. 30, No. 22, Nov. 21, 2011, pp. 6090-6097.
Ehrentraut, A. et al., "A new efficient palladium catalyst for Heck reactions of deactivated aryl chlorides", Synlett, vol. 11, 2000, pp. 1589-1592.
El-Maiss, J. et al., "Recent advances in metal-catalyzed alkyl-boron (C (sp3)-C (sp2)) Suzuki-Miyaura cross-couplings.", Catalysts, vol. 10, No. 3, Mar. 5, 2020, pp. 296-1-296-25.
Elsagir, A. R. et al., "Bidentate ferrocenylphosphines and their palladium (II) dichloride complexes—X-ray structural and NMR spectroscopic investigations and first results of their characteristics in the Pd-catalysed cooligomerisation of 1, 3-butadiene with CO2", Journal of Organometallic Chemistry, vol. 597, No. 1-2, 2000, pp. 139-145.
Espinosa, M. R. et al., "Differences in the Performance of Allyl Based Palladium Precatalysts for Suzuki-Miyaura Reactions", Advanced synthesis & catalysis, vol. 362, No. 22, Sep. 17, 2020, pp. 5062-5078.
Fier, P. S. et al., "Reagent design and ligand evolution for the development of a mild copper-catalyzed hydroxylation reaction", Organic letters, vol. 19, No. 11, 2017, pp. 3033-3036.
Fier, P. S.,"Synthesis of complex phenols enabled by a rationally designed hydroxide surrogate", Angewandte Chemie, vol. 129, No. 16, 2017, pp. 4549-4553.
Freure, G. P. et al., "Palladium-Catalyzed Cross-Coupling of Superbase-Generated C (sp3) Nucleophiles", ACS Catalysis, vol. 11, No. 19, Sep. 21, 2021, pp. 12258-12263.
Gant, T. G.,"Using deuterium in drug discovery: leaving the label in the drug", Journal of medicinal chemistry, vol. 57, No. 9, Dec. 2, 2013, pp. 3595-3611.
Giannerini, M. et al., "Direct catalytic cross-coupling of organolithium compounds", Nature Chemistry, vol. 5, No. 8, Jun. 9, 2013, pp. 667-672.
Grasa, G. A. et al., "α-Arylation of ketones using highly active, air-stable (DtBPF) PdX2 (X=Cl, Br) catalysts", Organic letters, vol. 9, No. 26, Oct. 4, 2007, pp. 5489-5492.
Greshock, T. J. et al., "Synthesis of Complex Druglike Molecules by the Use of Highly Functionalized Bench-Stable Organozinc Reagents", Angewandte Chemie, vol. 55, 2016, pp. 13714-13718.
Hagopian, L. E. et al., "Synthesis and electrochemistry of late transition metal complexes containing 1, 1'-bis(dicyclohexylphosphino) ferrocene (dcpf). The X-ray structure of [PdCl2 (dcpf)] and Buchwald-Hartwig catalysis using [PdCl2 (bisphosphinometallocene)] precursors", Journal of organometallic chemistry, vol. 691, No. 23, Aug. 22, 2006, pp. 4890-4900.
Halford, B.,"Deuterium switcheroo breathes life into old drugs", Chem. Eng. News, vol. 94, No. 27, 2016, pp. 32-36.
Han, C. et al., "Negishi coupling of secondary alkylzinc halides with aryl bromides and chlorides", Journal of the American Chemical Society, vol. 131, No. 22, 2009, pp. 7532-7533.
Dong et al., "Efficient Palladium-Catalyzed Alkoxycarbonylation of Bulk Industrial Olefins Using Ferrocenyl Phosphine Ligands", Angewandte Chemie (International Edition in English), vol. 56, No. 19, May 2, 2017, pp. 5267-5271.
Guolin, et al., "Tunable Unsymmetrical Ferrocene Ligands Bearing a Bulky Di-1-adamantylphosphino Motif for Many Kinds of Csp2-Csp3 Couplings", ACS Catalysis, vol. 12, No. 9, Apr. 15, 2022, pp. 5123-5135.
Hassan, J. et al., "Aryl-aryl bond formation one century after the discovery of the Ullmann reaction", Chemical reviews, vol. 102, No. 5, Mar. 8, 2002, pp. 1359-1470.
Hayashi, T. et al., "Dichloro[1,1'-bis(diphenylphosphino)ferrocene]palladium(II): an effective catalyst for cross-coupling of secondary and primary alkyl Grignard and alkylzinc reagents with organic halides", Journal of the American Chemical Society, vol. 106, No. 1, 1984, pp. 158-163.
Hazra, S. et al., "The resurrection of Murahashi coupling after four decades", ACS Catalysis, vol. 11, No. 21, 2021, pp. 13188-13202.
Heijnen, D. et al., "Palladium-catalyzed C (sp 3)-C (sp 2) cross-coupling of (trimethylsilyl) methyllithium with (hetero) aryl halides", Organic letters, vol. 17, No. 9, 2015, pp. 2262-2265.
Helbert, H. et al., "Cross-coupling of [11 C] methyllithium for 11 C-labelled PET tracer synthesis", Chemical Communications, vol. 57, No. 2, 2021, pp. 203-206.
Jae-Kook, U. et al., "Functionalized organometallic ligand (1) synthesis of some ferrocene derivatives of cyclohexyl- and cyclopentadienyl-phosphines", Bulletin of the Korean Chemical Society, vol. 13, No. 6, 1992, pp. 588-592.
Jana, R. et al., "Advances in transition metal (Pd, Ni, Fe)-catalyzed cross-coupling reactions using alkyl-organometallics as reaction partners", Chemical reviews, vol. 111, No. 3, Feb. 14, 2011, pp. 1417-1492.
Kambe, N. et al., "Pd-catalyzed cross-coupling reactions of alkyl halides", Chemical Society Reviews, vol. 40, No. 10, Jul. 25, 2011, pp. 4937-4947.
Keylor, M. H. et al., "Inverting conventional chemoselectivity in Pd-catalyzed amine arylations with multiply halogenated pyridines", Journal of the American Chemical Society, vol. 139, No. 31, Jul. 17, 2017, pp. 10613-10616.
Knapp, D. M. et al., "A general solution for unstable boronic acids: slow-release cross-coupling from air-stable MIDA boronates", Journal of the American Chemical Society, vol. 131, No. 20, Apr. 30, 2009, pp. 6961-6963.
Kondolff, I. et al., "Palladium-Tetraphosphine as Catalyst Precursor for High-Turnover-Number Negishi Cross-Coupling of Alkyl- or Phenylzinc Derivatives with Aryl Bromides", Organometallics, vol. 25, No. 22, Sep. 29, 2006, pp. 5219-5222.
Krasovskiy, A. et al., "Cross-couplings of alkyl halides with heteroaromatic halides, in water at room temperature", Tetrahedron Letters, vol. 52, No. 17, 2011, pp. 2203-2205.
Krasovskiy, A. et al., "Zn-mediated, Pd-catalyzed cross-couplings in water at room temperature without prior formation of organozinc reagents", Journal of the American Chemical Society, vol. 131, No. 43, 2009, pp. 15592-15593.
Kutchukian, P. S. et al., "Chemistry informer libraries: a chemoinformatics enabled approach to evaluate and advance synthetic methods", Chemical science, vol. 7, No. 4, Jan. 26, 2016, pp. 2604-2613.
Larson, H. et al., "Ni-Catalyzed C—H Arylation of Oxazoles and Benzoxazoles Using Pharmaceutically Relevant Aryl Chlorides and Bromides", The Journal of Organic Chemistry, vol. 84, No. 20, 2019, pp. 13092-13103.
Li, H. et al., "Development of preformed Pd catalysts for cross-coupling reactions, beyond the 2010 Nobel Prize", ACS Catalysis, vol. 2, No. 6, Apr. 18, 2012, pp. 1147-1164.
Li, L. et al., "Stereospecific Pd-catalyzed cross-coupling reactions of secondary alkylboron nucleophiles and aryl chlorides", Journal of the American Chemical Society, vol. 136, No. 40, 2014, pp. 14027-14030.
Limmert, M. E. et al., "Kumada coupling of aryl and vinyl tosylates under mild conditions", The Journal of Organic Chemistry, vol. 70, No. 23, Oct. 13, 2005, pp. 9364-9370.
Lundgren, R. J. et al., "AP, N-Ligand for Palladium-Catalyzed Ammonia Arylation: Coupling of Deactivated Aryl Chlorides, Chemoselective Arylations, and Room Temperature Reactions", Angewandte Chemie, vol. 122, No. 24, Apr. 30, 2010, pp. 4071-4074.

(56) References Cited

OTHER PUBLICATIONS

Lundgren, Rylan J. et al., "A Highly Versatile Catalyst System for the Cross-Coupling of Aryl Chlorides and Amines", Chemistry—A European Journal vol. 16, No. 6, 2010, pp. 1983-1991.
Luo, X. et al., "Superior Effect of a TT-Acceptor Ligand (Phosphine-Electron-Deficient Olefin Ligand) in the Negishi Coupling Involving Alkylzinc Reagents", Organic Letters, vol. 9, No. 22, Oct. 6, 2007, pp. 4571-4574.
Marr, G. et al., "Unsymmetrically disubstituted ferrocenes. Part VIII. Synthesis and reactivity of some 2-substituted ferrocenylphosphines", Journal of the Chemical Society C: Organic, vol. 7, Jan. 1, 1969, pp. 1070-1072.
Melzig, L. et al., "Direct aminoalkylation of arenes and hetarenes via Ni-catalyzed Negishi cross-coupling reactions", Organic Letters, vol. 9, No. 26, Nov. 30, 2007, pp. 5529-5532.
Miyaura, N., "Metal-Catalyzed Cross-Coupling Reactions of Organoboron Compounds with Organic Halides", Metal-Catalyzed Cross-Coupling Reactions, Edited by Armin de Meijere, 2004, pp. 41-123.
Miyaura, N.,"Organoboron Compounds in Cross-Coupling Reaction", Topics in Current Chemistry, vol. 219, 2002, pp. 11-59.
Molander, G. A. et al., "Cross-Coupling of Cyclopropyl-and Cyclobutyltrifluoroborate with Aryl- and Heteroaryl Chlorides", The Journal of organic chemistry, vol. 73, No. 19, Oct. 3, 2008, pp. 7481-7485.
Molander, G. A. et al., "Organotrifluoroborates and monocoordinated palladium complexes as catalysts—a perfect combination for Suzuki-Miyaura coupling", Angewandte Chemie International Edition, vol. 48, No. 49, 2009, pp. 9240-9261.
Murahashi, S. et al., "Stereoselective synthesis of alkenes and alkenyl sulfides from alkenyl halides using palladium and ruthenium catalysts", The Journal of Organic Chemistry, vol. 44, No. 14, 1979, pp. 2408-2417.
Murata, M. et al., "A general and efficient method for the palladium-catalyzed cross-coupling of thiols and secondary phosphines", Tetrahedron, vol. 60, No. 34, Jun. 7, 2004, pp. 7397-7403.
International Search Report and Written Opinion received for PCT Application No. PCT/US2022/021906, mailing date Jun. 23, 2022, 9 Pages.
Pfaltz, A. et al., "Design of chiral ligands for asymmetric catalysis: From C2-symmetric P, P- and N, N-ligands to sterically and electronically nonsymmetrical P, N-ligands.", Proceedings of the National Academy of Sciences, vol. 101, No. 16, Apr. 20, 2004, pp. 5723-5726.
Piou, T. et al., "Direct arylation of azoles enabled by Pd/Cu dual catalysis", Organic Letters, vol. 23, No. 6, 2021, pp. 1996-2001.
Pompeo, M. et al., "Pd-PEPPSI-IPentCI: A Highly Effective Catalyst for the Selective Cross-Coupling of Secondary Organozinc Reagents", Angewandte Chemie International Edition, vol. 51, No. 45, 2012, pp. 11354-11357.
Ray, R. et al., "Oxalohydrazide Ligands for Copper-Catalyzed C—O Coupling Reactions with High Turnover Numbers", Angewandte Chemie, vol. 60. No. 15, 2021, pp. 8203-8211.
Sandrock, D. L. et al., "Stereospecific cross-coupling of secondary alkyl β-trifluoroboratoamides", Journal of the American Chemical Society, vol. 132, No. 48, Nov. 15, 2010, pp. 17108-17110.
Scherpf, T. et al., "Efficient Pd-Catalyzed Direct Coupling of Aryl Chlorides with Alkyllithium Reagents", Angewandte Chemie, vol. 132, No. 46, 2020, pp. 20777-20784.
Seechurn, C. C. et al., "Introduction to New trends in cross-coupling", RCS Catalysis Series, No. 21, 2014, 19 Pages.
Seibert, A. R. et al., "Bis (dialkylaminophosphino) ferrocenes: Reactivity and electrochemistry", Inorganica Chimica Acta, vol. 364, No. 1, Jul. 6, 2010, pp. 30-38.
Sivendran, N. et al., "Halogen-Bridged Methylnaphthyl Palladium Dimers as Versatile Catalyst Precursors in Coupling Reactions", Angewandte Chemie International Edition, vol. 60, No. 47, 2021, pp. 25151-25160.
Sollott, G. P. et al., "Phosphorus, arsenic, and boron-containing ferrocene derivatives", Chemical Abstract, vol. 63, 1965, p. 18147b.
Stauffer, S. et al., "Palladium-catalyzed arylation of ethyl cyanoacetate. Fluorescence resonance energy transfer as a tool for reaction discovery", Journal of the American Chemical Society, vol. 123, No. 19, Apr. 24, 2001, pp. 4641-4642.
Steverlynck, J. et al., "The Deuterated "Magic Methyl" Group: A Guide to Site-Selective Trideuteromethyl Incorporation and Labeling by Using CD3 Reagents", Chemistry—A European Journal, vol. 27, No. 46, 2021, 11751-11772.
Su, M. et al., "A Bulky Biaryl Phosphine Ligand Allows for Palladium-Catalyzed Amidation of Five-Membered Heterocycles as Electrophiles", Angewandte Chemie International Edition, vol. 51, No. 19, Mar. 30, 2012, pp. 4710-4713.
Sun, Q. et al., "Broadening of Horizons in the Synthesis of CD 3-labeled Molecules", Chemical Society Reviews, vol. 50, No. 19, 2021, pp. 10806-10835.
Talele, T. T.,"The "cyclopropyl fragment" is a versatile player that frequently appears in preclinical/clinical drug molecules", Journal of medicinal chemistry, vol. 59, No. 19, 2016, pp. 8712-8756.
Tamao, K. et al., "Introduction to Cross-Coupling Reaction", Topics in Current Chemistry, vol. 219, 2002, pp. 1-9.
Tamao, K. et al., "Alkyl group isomerization in the cross-coupling reaction of secondary alkyl Grignard reagents with organic halides in the presence of nickel-phosphine complexes as catalysts", Journal of the American Chemical Society, vol. 94, No. 26, Dec. 27, 1972, pp. 9268-9269.
Tanimoto, Y. et al., "Synthesis of [2] ferrocenophanes containing trivalent diphosphine units", Journal of Organometallic Chemistry, vol. 713, 2012, pp. 80-88.
Timmins, G. S., "Deuterated drugs: where are we now?", Expert opinion on therapeutic patents, vol. 24, No. 10, Jul. 29, 2014, pp. 1067-1075.
Timmins, G. S., "Deuterated drugs; updates and obviousness analysis", Expert opinion on therapeutic patents, vol. 27, No. 12, Sep. 14, 2017, pp. 1353-1361.
Togni, A. et al., "Ferrocenes, homogeneous catalysis, organic synthesis and materials science", VCH Publisher, Weinheim, 1995, p. 1.
Tung, R. D.,"Deuterium medicinal chemistry comes of age", Future Medicinal Chemistry, vol. 8, No. 5, 2016, pp. 491-494.
Valente, C. et al., "Pd-PEPPSI Complexes and the Negishi Reaction", European Journal of Organic Chemistry, vol. 23, 2010, pp. 4343-4354.
Vara, B. A. et al., "Scalable thioarylation of unprotected peptides and biomolecules under Ni/photoredox catalysis", Chemical Science, vol. 9, No. 2, Nov. 13, 2017, pp. 336-344.
Vila, C. et al., "Palladium-Catalysed Direct Cross-Coupling of Organolithium Reagents with Aryl and Vinyl Triflates", Chemistry—A European Journal, vol. 20, No. 41, 2014, pp. 13078-13083.
Vila, C. et al., "Palladium-catalysed direct cross-coupling of secondary alkyllithium reagents", Chemical Science, vol. 5, No. 4, Nov. 29, 2013, pp. 1361-1367.
Vosáhlo, P. et al., "Comparing the asymmetric dppf-type ligands with their semi-homologous counterparts", Journal of Organometallic Chemistry, vol. 860, Jan. 31, 2018, pp. 14-29.
Wagner, J. P. et al., "London dispersion in molecular chemistry-reconsidering steric effects", Angewandte Chemie International Edition, vol. 54, No. 42, Aug. 11, 2015, pp. 12274-12296.
Wang, C. Y. et al., "Configurationally stable, enantioenriched organometallic nucleophiles in stereospecific Pd-catalyzed cross-coupling reactions: an alternative approach to asymmetric synthesis", Chemical science, vol. 6, No. 9, Jul. 1, 2015, pp. 5105-5113.
Wang, M. et al., "Bioinspired design of a robust d 3-methylating agent", Science Advances, vol. 6, No. 19, May 8, 2020, pp. eaba0946-1-eaba0946-7.
Wybon, C. et al., "Zn-catalyzed tert-butyl nicotinate-directed amide cleavage as a biomimic of metallo-exopeptidase activity", ACS Catalysis, vol. 8, No. 1, Nov. 14, 2017, pp. 203-218.
Yamamura, M. et al., "The reaction of σ-vinylpalladium complexes with alkyllithiums. Stereospecific syntheses of olefins from vinyl halides and alkyllithiums", Journal of Organometallic Chemistry, vol. 91, No. 2, 1975, pp. C39-C42.

(56) References Cited

OTHER PUBLICATIONS

Yang, Y. C. et al., "Palladium-Catalyzed Cascade Arylation of Vinylogous Esters Enabled by Tris (1-adamantyl) phosphine", Organic letters, vol. 21, No. 23, Oct. 8, 2019, pp. 9286-9290.
Yoon, T. P. et al., "Privileged chiral catalysts", Science, vol. 299, No. 5613, Mar. 14, 2003, pp. 1691-1693.
Zhang, R. et al., "Profiling and application of photoredox C (sp3)-C (sp2) cross-coupling in medicinal chemistry", ACS Medicinal Chemistry Letters, vol. 9, No. 7, 2018, pp. 773-777.
Zhao, Q. et al., "IPr#-highly hindered, broadly applicable N-heterocyclic carbenes", Chemical Science, vol. 12, No. 31, Jul. 2, 2021, pp. 10583-10589.
International Preliminary Report on Patentability received for PCT Application No. PCT/US2022/021906, mailing date Oct. 5, 2023, 8 Pages.

* cited by examiner (I)

(I)

R = Ph, Cy, iPR, tBu;
X = H, CH3, Ph, etc;
Y = Cl, Br, I, OMs, OTf, BF4, PF6, SbF6, etc

FERROCENE-BASED UNSYMMETRICAL LIGANDS BEARING BULKY DI(ADAMANTYL)PHOSPHINO MOTIF AND THEIR METAL CATALYSTS

CROSS-REFERENCE TO RELATED APPLICATIONS

The present application is a U.S. National Stage Application of International Application No. PCT/US2022/021906 filed Mar. 25, 2022, which claims the benefit of priority of U.S. provisional patent application No. 63/166,094, filing date Mar. 25, 2021, the entire content of each of which is incorporated herein by reference in its entirety.

BACKGROUND

Provided are a new class of ferrocenyl-based unsymmetrical ligands containing di(1-adamantyl)phosphino groups with general formula, $Fc(Ad_2P)(R_2P)$ and corresponding metal complexes, include metal halide complexes, N-biphenyl metal cationic complexes and R-allyl metal cationic complexes, as shown in FIG. 1, useful in catalysis.

By virtue of their flexible bite angles, tunability of steric and electronic characteristics, ferrocenyl based bidentate ligands and their corresponding metal catalysts stood out to be the most sought out bidentate systems in metal catalyzed organic transformations.[1] Since the introduction of 1,1'-bis(diphenylphosphino)ferrocene,[2] dppf, and its corresponding $(dppf)PdCl_2$ by Hayashi and Kumada in 1972,[3] numerous efforts have been devoted to their commercialization and newer applications in process chemistry and discovery.[4] Subsequent work from the Colacot group has identified for the first time that $Fc(PR_2)_2PdCl_2$ (R=$^{i}$Pr, Cy, $^{t}$Bu) complexes are air-stable, yet highly active catalysts for challenging C—C coupling and α-arylation reactions.[5] Today, these "privileged" bis(phosphine)ligands and catalysts are commercially available in multi-kg quantities for various organic processes.[6]

Among the new generation ligands, adamantyl based phosphine ligands are a special class of ligands, which offer very unique characteristics, such as "electron-releasing properties exceeding a boundary for organophosphines that has persisted over many decades."[8,9] Examples include the unique cross-coupling applications of $Ad_3P$ by Carrow's group,[10] Adamantyl Brettphos by Buchwald et al.,[11] Dalphos class of ligands by the Stradiotto group[12] and $Ad_2$(n-Bu)P (Cataxium) by Beller et al.[13] (FIG. 2). However, the syntheses of these ligands are not trivial considering the isolation and purification, thereby limiting their offerings in bulk quantities for industrial applications.

Despite these advances, a need still exists for new ligands that (1) can address some of the existing challenges in cross coupling, and (2) which have syntheses that are amenable to scale up in manufacture sufficient to prepare sufficient quantities at a purity acceptable for industrial applications.

SUMMARY

Provided are diadamantylphosphino-containing compounds useful as ligands and in precatalysts for coupling reactions. In a first embodiment, a compound of formula I is provided:

I

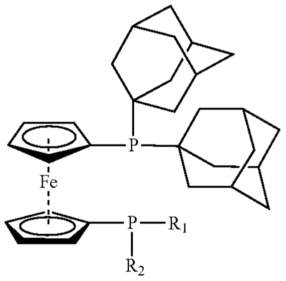

wherein $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together can form a saturated or unsaturated 5- or 6-membered ring, the ring optionally including one or more additional heteroatoms selected from O, S and N and one or more optional substituents. Each optional substituent, when present, is individually selected from $C_1$-$C_4$ alkyl, $C_1$-$C_4$ haloalkyl, and $C_1$-$C_4$ alkoxy.

Also provided is a precatalyst is formula II:

II

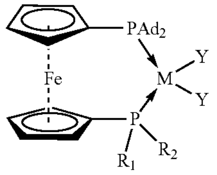

wherein Ad is adamantyl; $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together can form a saturated or unsaturated 5- or 6-membered ring, the ring optionally including one or more additional heteroatoms selected from O, S and N and one or more optional substituents. Each optional substituent, when present, is individually selected from $C_1$-$C_4$ alkyl, $C_1$-$C_4$ haloalkyl, and $C_1$-$C_4$ alkoxy. M is a transition metal selected from Group 9 or Group 10, and Y is halo.

Also provided is a precatalyst of formula III:

III

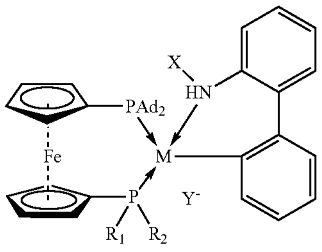

wherein Ad is adamantyl; $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents. Each optional substituent, when present, is selected from $C_1$-$C_4$ alkyl, $C_1$-$C_4$ haloalkyl, and $C_1$-$C_4$ alkoxy. M represents a transition metal selected from Group 9 or Group 10. X is selected from H, $C_1$-$C_4$ alkyl and phenyl. $Y^-$ is an anion selected from halide, triflate ($^-$OTf), tetrafluoroborate ($^-BF_4$), hexafluorophosphate ($^-PF_6$), mesylate ($^-$OMs), tosylate ($^-$OTs), tetrakis[3,5-bis(trifluoromethyl)phenyl]borate ($^-$BArF), hexafluoro antimonate ($^-SbF_6$) and combinations thereof.

Further provided is a precatalyst of formula IV:

IV

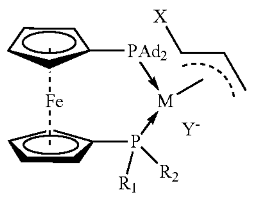

wherein Ad is adamantyl; $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents. Each optional substituent, when present, is selected from $C_1$-$C_4$ alkyl, $C_1$-$C_4$ haloalkyl and $C_1$-$C_4$ alkoxy. M represents a transition metal selected from Group 9 or Group 10. X is selected from H, $C_1$-$C_4$ alkyl and phenyl. $Y^-$ is an anion selected from halide, triflate ($^-$OTf), tetrafluoroborate ($^-BF_4$), hexafluorophosphate ($^-PF_6$), mesylate ($^-$OMs), tosylate ($^-$OTs), tetrakis[3,5-bis(trifluoromethyl)phenyl]borate ($^-$BArF), hexafluoro antimonate ($^-SbF_6$) and combinations thereof.

Further provided are methods for performing a metal-catalyzed P—C cross-coupling reaction. The methods include the steps of contacting a ligand of formula I, as described above, with a metal catalyst in the presence of an aromatic solvent and a base in a reaction vessel; adding a first substrate of formula Ar—X', wherein Ar is aryl and X' is halo and a second substrate of formula $R'_2PH$, wherein R' is selected from $C_1$-$C_{10}$ alkyl and $C_3$-$C_{10}$ cycloalkyl, to the reaction vessel; heating the reaction vessel to a temperature in the range from 100° C. to 200° C. for a time sufficient to form the carbon-phosphorous bond.

Further provided are methods for performing a metal-catalyzed $C_{sp2}$-$C_{sp3}$ cross-coupling reaction. The method includes the steps of contacting a precatalyst of formula II, as described above, with a first substrate and a second substrate in the presence of a solvent in a reaction vessel, optionally, heating the reaction vessel, and allowing first substrate and the second substrate to react in the presence of the precatalyst for a time sufficient for the $C_{sp2}$-$C_{sp3}$ cross-coupling to occur. In various embodiments of this method, the first substrate is of formula Ar—X', wherein Ar is optionally substituted aryl or optionally substituted heteroaryl and X' is chloro or bromo or iodo. The second substrate is of formula R'[M], wherein R' is selected from $C_1$-$C_{10}$ alkyl and $C_3$-$C_{10}$ cycloalkyl, [M] is selected from Li, MgX', ZnX' and $B(OH)_2$ and related boron reagents, and X' is selected from chloro, bromo and iodo.

DETAILED DESCRIPTION

Figure 1:
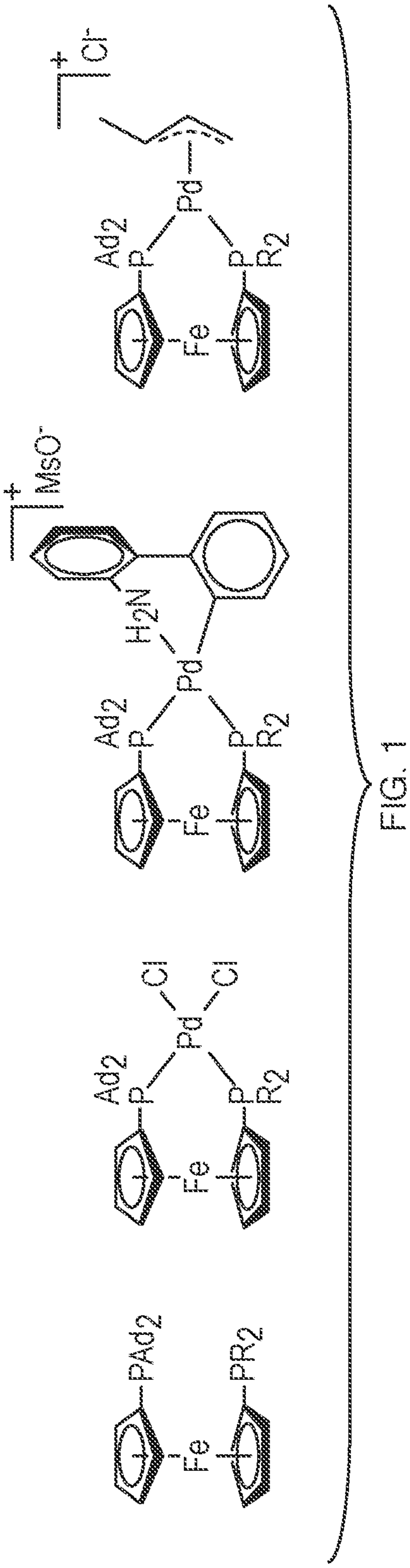
FIG. 1 exemplifies the ferrocenyl-based unsymmetrical phosphines and their $PdCl_2$, G3-Palladacycles and (R-allyl) PdCl complexes described herein.
Figure 2A:
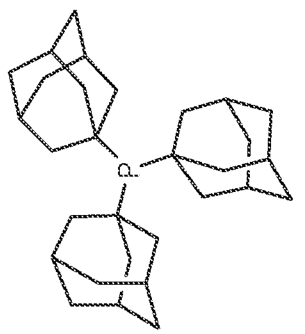
FIG. 2A shows $Ad_3P$, FIG. 2B—Dalphos, FIG. 2C—adamantyl Brettphos, and FIG. 2D—$Ad_2$(n-Bu)P (Cataxium), each of which are conventional phosphines bearing di-1-adamantylphosphino ($Ad_2P$) moiety.
Figure 2B:
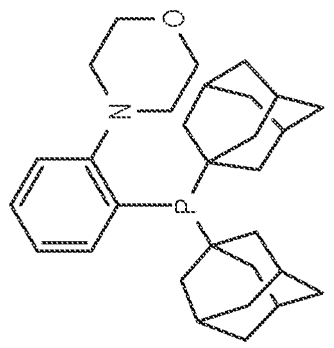
Figure 2C:
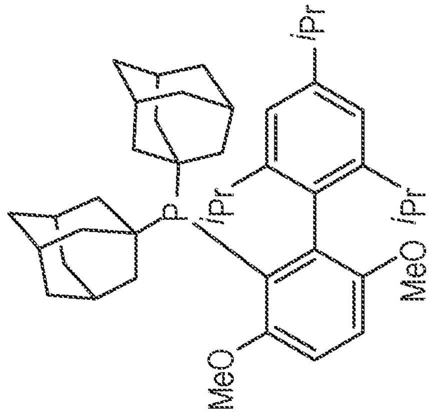
Figure 2D:
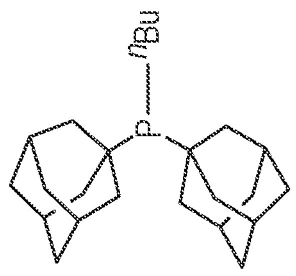

The new ligands and precatalysts described herein, such as those shown in FIG. 1 overcome the problems with conventional catalysts—providing powerful new routes to previously challenging cross-coupling reactions, while being scalable so that they can be provided in sufficient quantity and purity for industrial applications. These new ligands and precatalysts utilize a ferrocenyl backbone and di(adamanyl)phosphino moiety, which, as described herein, provide significant advantages over existing ligands and precatalysts.

Figure 3A:
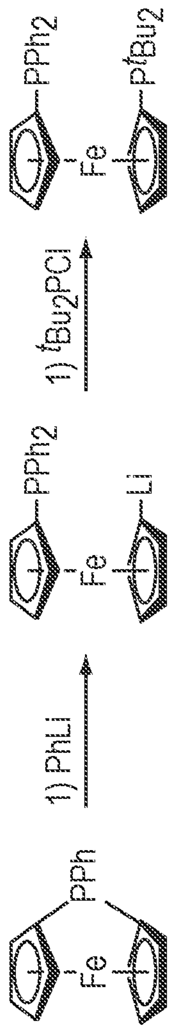
FIG. 3A illustrates reaction scheme 1, the synthesis of ferrocenyl-based unsymmetrical bidentate phosphine ligands, using the Cullen method.
Figure 3B:
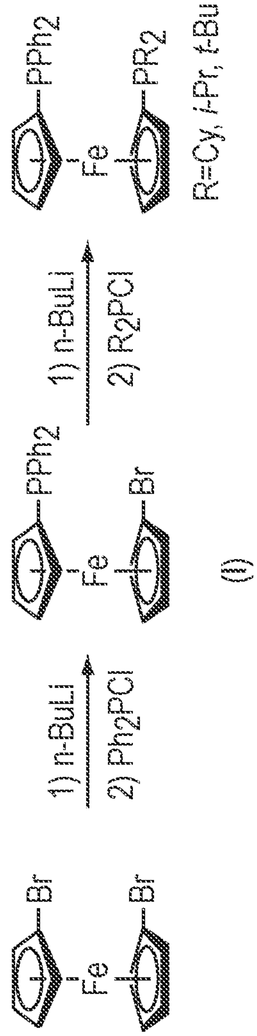
FIG. 3B illustrates reaction scheme 1 using the Stepnicka method; compared to FIG. 3C illustrating reaction scheme 1 using the methods described herein.

Conventional methods to make ferrocenyl based unsymmetrical ligands, as shown in FIG. 3A and FIG. 3B are not suitable to incorporate the $Ad_2P$ moiety to make Fc($Ad_2P$)($R_2P$) ligands.[14]

Figure 3C:
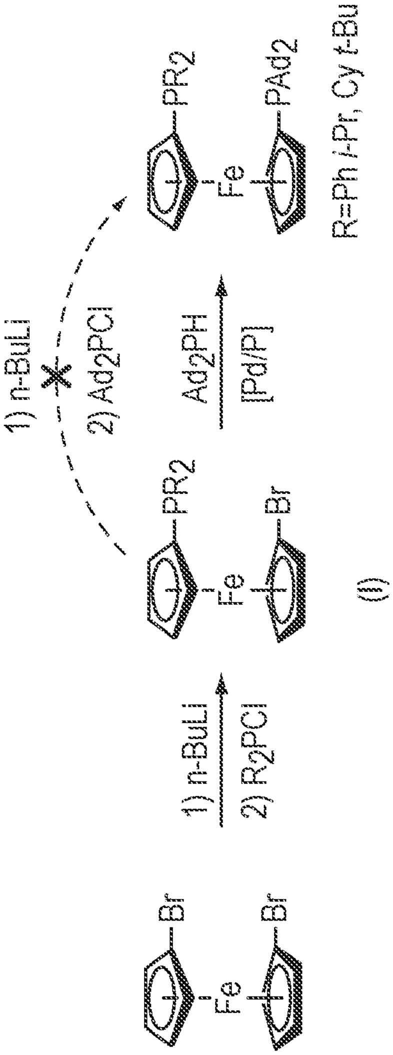

Herein is described a new class of ferrocenyl based unsymmetrical phosphines containing $Ad_2P$ moiety FIG. 3C, as well as a convenient synthesis protocol for making the ligands, and the synthesis of their corresponding metal complexes. Also provided are methods of using the new ligands and precatalysts described herein in $C_{sp2}$-$C_{sp3}$ coupling, e.g., Kumada, Negishi, Suzuki and Murahashi, and C—P coupling applications with a wide variety of substrates as these class of coupling reactions are challenging and underrepresented in the literature. It is highly desirable to have such ligands and precatalysts commercially available.

First provided are diadamantylphosphino-containing compounds useful as ligands and precatalysts for coupling reactions. In a first embodiment, a compound of formula I is provided:

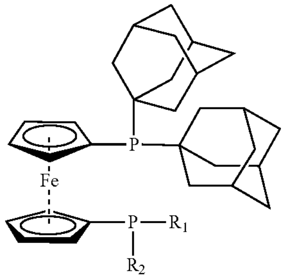

I wherein $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together form a saturated or unsaturated 5- or 6-membered ring, the ring optionally including one or more additional heteroatoms selected from O, S and N, and one or more optional substituents. Some representative —$NR_4R_5$ ring structures, include but are not limited to, pyrrolo, pyrrolidino, pyrazolo, piperidino, morpholino, thiomorpholino, piperazino, N-methyl piperazino, and so forth. Each optional substituent, when present, is individually selected from $C_1$-$C_4$ alkyl, $C_1$-$C_4$ haloalkyl and $C_1$-$C_4$ alkoxy. In some embodiments of compound I, $R_1$ and $R_2$ are independently selected from phenyl, optionally substituted phenyl, cyclohexyl, isopropyl, tert-butyl. In some embodiments, $R_1$ and $R_2$ are each substituted phenyl.

In embodiments in which $R_1$ and $R_2$ are substituted phenyl, the substituted phenyl can have from one to five substituents, and the substituents can be the same or different. In one embodiment, the substituted phenyl includes one substituent at the para position. In other embodiments, the substituted phenyl includes one substituent at the ortho position. In other embodiments, the substituted phenyl includes one substituent at the meta position. In some embodiments, the substituted phenyl includes two substituents, both at the ortho positions. In other embodiments, the substituted phenyl includes two substituents, both at the meta positions. In other embodiments, the two substituents are at the ortho and the para positions. In still other embodiments, the two substituents are at the meta and para positions. In still other embodiments, the substituted phenyl includes three substituents, which may be the same or different. In some embodiments, the three substituents are at the para position and two ortho positions. In other embodiments, the three substituents are at the para and two meta positions. In still other embodiments, the substituents are at one ortho, one meta and the para positions. In other embodiments, the substituted phenyl includes four substituents, each of which may be the same or different and which may be at the ortho and meta positions or at a combination of ortho, meta and para positions. In still other embodiments, the substituted phenyl may include five substituents, each of which may be the same or different.

In some preferred embodiments, —$PR_1R_2$ is selected from

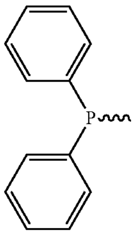
,
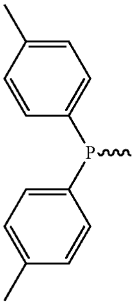
,
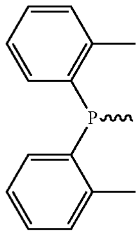
,
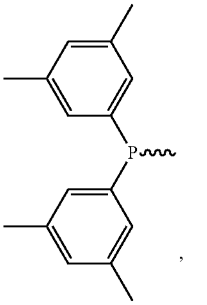
,
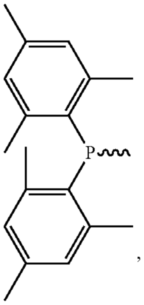
,
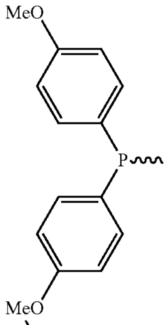
,
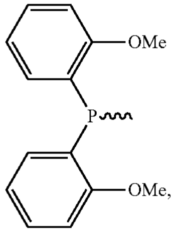
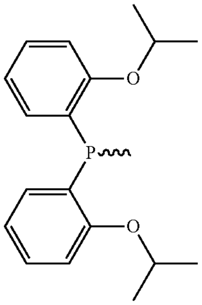
,
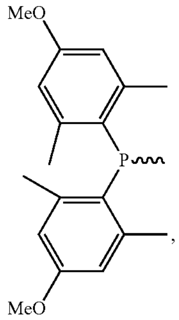
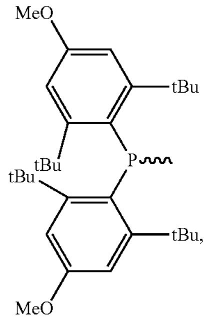
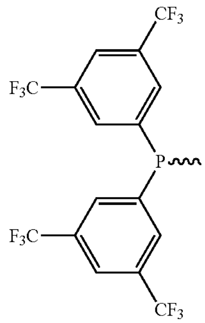
.

In some preferred embodiments, the compound of formula I is a ligand selected from

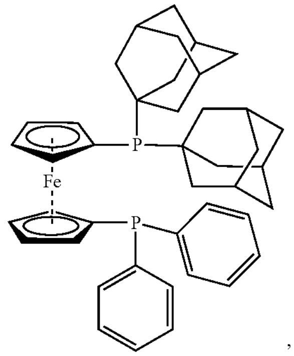

,

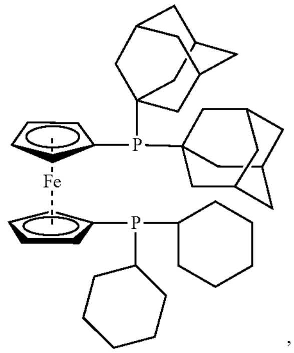

,

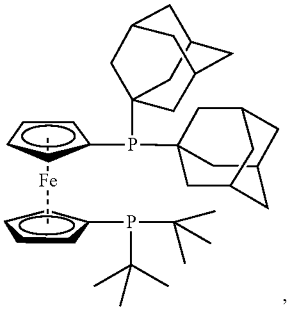

, and

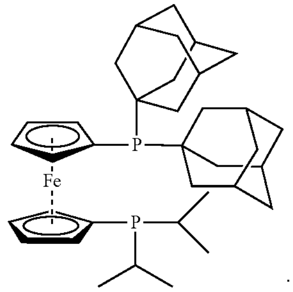

.

Also provided herein are precatalysts of formula II:

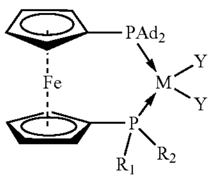

II wherein Ad is adamantyl; and $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together form a saturated or unsaturated 5- or 6-membered ring, the ring optionally including one or more additional heteroatoms selected from O, S and N, and optionally includes one or more substituents. Some representative —$NR_4R_5$ ring structures, include, but are not limited to, pyrrolo, pyrrolidino, pyrazolo, piperidino, morpholino, thiomorpholino, piperazino, N-methyl piperazino, and so forth. Each optional substituent, when present, is individually selected from $C_1$-$C_4$ alkyl, $C_1$-$C_4$ haloalkyl, $C_1$-$C_4$ alkoxy. In some embodiments, $R_1$ and $R_2$ are independently selected from phenyl, substituted phenyl, cyclohexyl, isopropyl, tert-butyl. In a preferred embodiment, $R_1$ and $R_2$ are each substituted phenyl as described above.

M in formula II is a transition metal selected from Group 9 or Group 10. In some embodiments, M is selected from Pd, Ni, Rh, Co, Ir and Pt. In a preferred embodiment, M is Pd.

Y in formula II is halo, i.e., in various embodiments, Y may be chloro, bromo or iodo. In a preferred embodiment, Y is chloro.

Some preferred embodiments of the precatalyst of formula II include

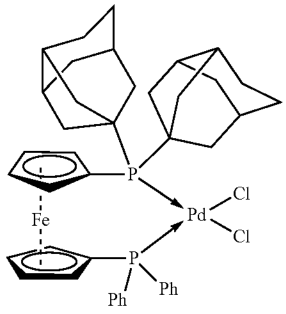

,

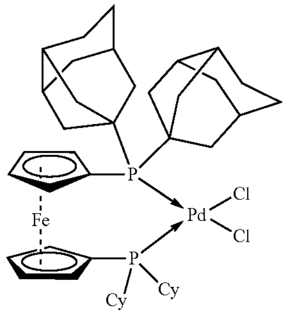

,

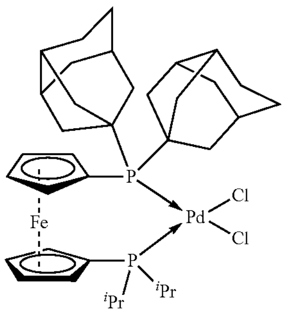

and

-continued

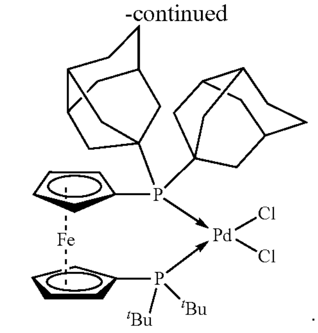

.

Also provided is a precatalyst of formula III:

III

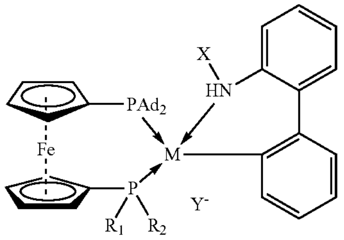

wherein Ad is adamantyl; $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together form a saturated or unsaturated 5- or 6-membered ring, the ring optionally including one or more additional heteroatoms selected from O, S and N and may include one or more optional substituents. Some representative —$NR_4R_5$ ring structures include, but are not limited to, pyrrolo, pyrrolidino, pyrazolo, piperidino, morpholino, thiomorpholino, piperazino, N-methyl piperazino, and so forth. Each optional substituent, when present, is individually selected from $C_1$-$C_4$ alkyl, $C_1$-$C_4$ haloalkyl, $C_1$-$C_4$ alkoxy. In some embodiments, $R_1$ and $R_2$ are independently selected from phenyl, cyclohexyl, isopropyl, tert-butyl.

M in formula III represents a transition metal selected from Group 9 or Group 10. In some embodiments, M is selected from Pd, Ni, Rh, Co, Ir and Pt. In a preferred embodiment, M is Pd.

X of formula III may be selected from H, $C_1$-$C_4$ alkyl and phenyl. In some embodiments, X is selected from H, methyl and phenyl.

In the precatalyst of formula III, $Y^-$ is an anion selected from halide, triflate ($^-$OTf), tetrafluoroborate ($^-BF_4$), hexafluorophosphate ($^-PF_6$), mesylate ($^-$OMs), tosylate ($^-$OTs), tetrakis[3,5-bis(trifluoromethyl)phenyl]borate ($^-$BArF), hexafluoro antimonate ($^-SbF_6$) and combinations thereof. In various embodiments, $Y^-$ is selected from $Cl^-$, $Br^-$, $I^-$, $^-$OTf, $^-BF_4$, $^-$OMs, $^-$OTs, $^-$PF6, $^-$BArF, and $^-$SbF6.

In some preferred embodiments, the precatalyst of formula III is

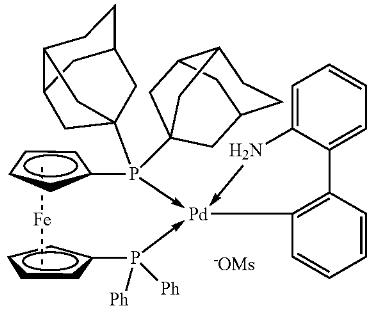

,

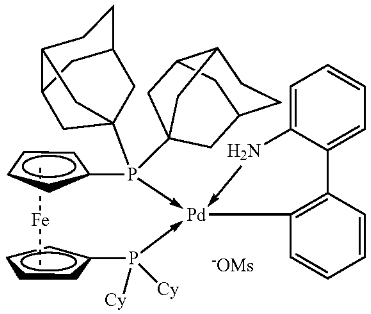

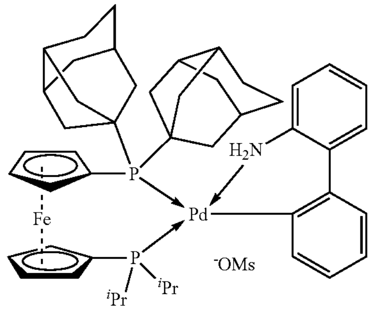

,

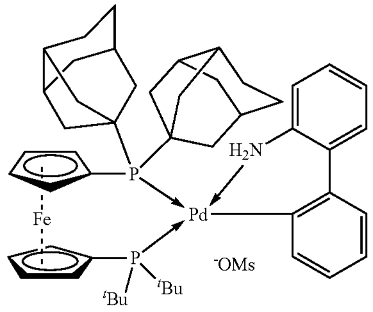

.

Further provided is a precatalyst of formula IV:

IV

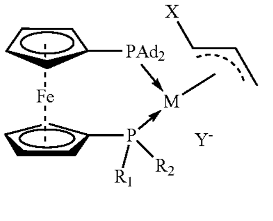

wherein Ad is adamantyl; $R_1$ and $R_2$ are independently selected from $C_1$-$C_{12}$ alkyl, $C_3$-$C_{12}$ cycloalkyl, $C_1$-$C_{12}$ alkoxy, —$NR_4R_5$, and optionally substituted phenyl. $R_4$ and $R_5$ are individually selected from H and $C_1$-$C_{12}$ alkyl, or $R_4$ and $R_5$ together form a saturated or unsaturated 5- or 6-membered ring, the ring optionally including one or more additional heteroatoms selected from O, S and N, and one or more optional substituents. Some representative —$NR_4R_5$ ring structures include, but are not limited to, pyrrolo, pyrrolidino, pyrazolo, piperidino, morpholino, thiomorpholino, piperazino, N-methyl piperazino, and so forth. Each optional substituent, when present, is individually selected from $C_1$-$C_4$ alkyl, $C_1$-$C_4$ haloalkyl and $C_1$-$C_4$ alkoxy. In some preferred embodiments, $R_1$ and $R_2$ are independently selected from phenyl, cyclohexyl, isopropyl, tert-butyl.

M in formula IV represents a transition metal selected from Group 9 or Group 10. In some embodiments, M is selected from Pd, Ni, Rh, Co, Ir and Pt. In a preferred embodiment of formula IV, M is Pd.

X of formula IV is selected from H, $C_1$-$C_4$ alkyl and phenyl. In some preferred embodiments, X is selected from H, methyl and phenyl.

$Y^-$ is an anion selected from halide, triflate ($^-$OTf), tetrafluoroborate ($^-BF_4$), hexafluorophosphate ($^-PF_6$), mesylate ($^-$OMs), tosylate ($^-$OTs), tetrakis[3,5-bis(trifluoromethyl)phenyl]borate ($^-$BArF), hexafluoro antimonate ($^-SbF_6$) and combinations thereof. In some preferred embodiments, $Y^-$ is selected from $Cl^-$, $Br^-$, $I^-$, $^-$OTf, $^-BF_4$, $^-$OMs, $^-$OTs, $^-$PF6, $^-$BArF, and $^-$SbF6.

In some preferred embodiments, the precatalyst of formula IV is selected from

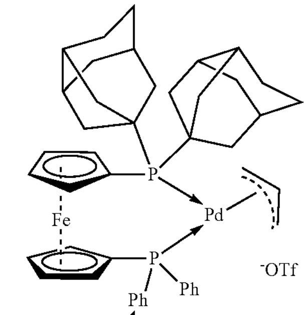

,

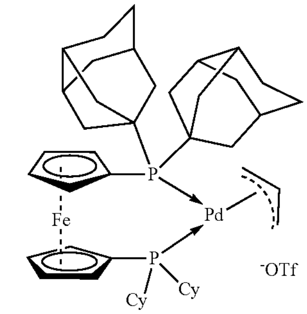

,

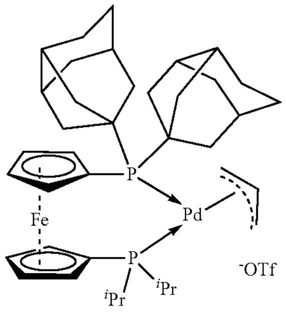

and

-continued

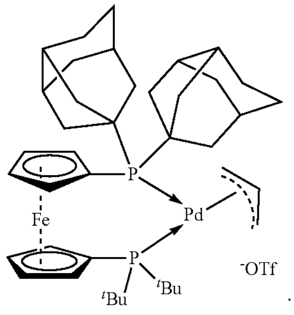

.

Further provided are methods for performing a metal-catalyzed P—C cross-coupling reaction. The methods include the steps of contacting a ligand of formula I, as described above, with a metal catalyst in the presence of an aromatic solvent and a base in a reaction vessel; adding a first substrate of formula Ar—X', wherein Ar is aryl and X' is halo and a second substrate of formula $R'_2PH$, wherein R' is selected from $C_1$-$C_{10}$ alkyl and $C_3$-$C_{10}$ cycloalkyl, to the reaction vessel; heating the reaction vessel to a temperature in the range from 100° C. to 200° C. for a time sufficient to form the carbon-phosphorous bond.

In a preferred embodiment of this metal-catalyzed P—C cross-coupling reaction method, the ligand is selected from

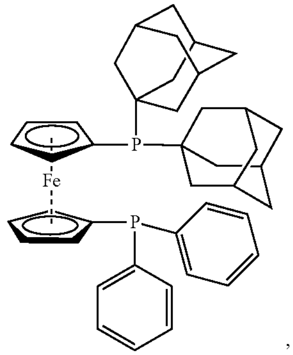

,

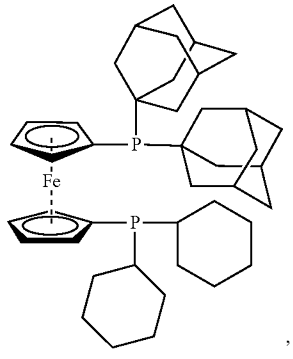

,

-continued

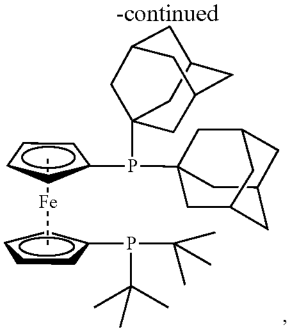

, and

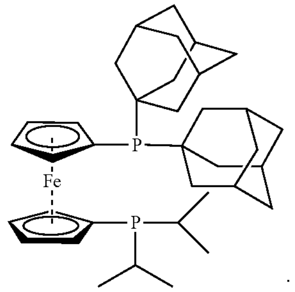

.

and the catalyst is a Pd catalyst.

Further provided are methods for performing a metal-catalyzed $C_{sp2}$-$C_{sp3}$ cross-coupling reaction. The method includes the steps of contacting a precatalyst of formula II, as described above, with a first substrate and a second substrate in the presence of a solvent in a reaction vessel, optionally, heating the reaction vessel, and allowing first substrate and the second substrate to react in the presence of the precatalyst for a time sufficient for the $C_{sp2}$-$C_{sp3}$ cross-coupling to occur.

In various embodiments of this method, the first substrate is of formula Ar—X', wherein Ar is optionally substituted aryl or optionally substituted heteroaryl and X' is chloro or bromo or iodo. In some embodiments of this method, the first substrate is selected from optionally substituted phenyl, optionally substituted pyridyl, optionally substituted thiophene, and optionally substituted furan.

In various embodiments, the second substrate is of formula R'[M], wherein R' is selected from $C_1$-$C_{10}$ alkyl and $C_3$-$C_{10}$ cycloalkyl, [M] is selected from Li, MgX', ZnX' and $B(OH)_2$, and X' is selected from chloro, bromo and iodo.

In certain embodiments according to this method, [M] is Li, the solvent is toluene, and the reaction vessel is not heated.

In certain embodiments according to this method, [M] is selected from MgX' and ZnX', the solvent is tetrahydrofuran, and the reaction vessel is heated to 50° C.

In still other embodiments according to this method, [M] is $B(OH)_2$, the solvent is toluene and the reaction vessel is heated to 100° C.

The synthesis of and use of the ligands and precatalysts described herein is provided in greater detail. Table 1 shows ferrocenyl based unsymmetrical phosphines and their $PdCl_2$, G3-Palladacycles and (R-allyl)PdCl complexes.

TABLE 1

| R | 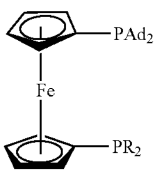 | 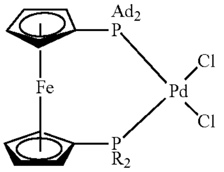 | 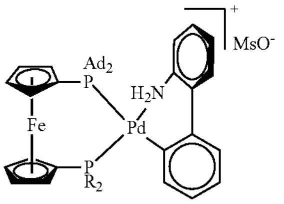 | 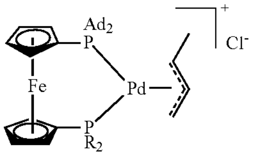 |
|---|---|---|---|---|
| R = Ph | L1 | Pd1-a | Pd1-b | Pd1-c |
| R = Cy | L2 | Pd2-a | Pd2-b | Pd2-c |
| R = $^{i}$Pr | L3 | Pd3-a | Pd3-b | Pd3-c |
| R = $^{t}$Bu | L4 | Pd4-a | Pd4-b | Pd4-c |

Figures 4A, 4B:
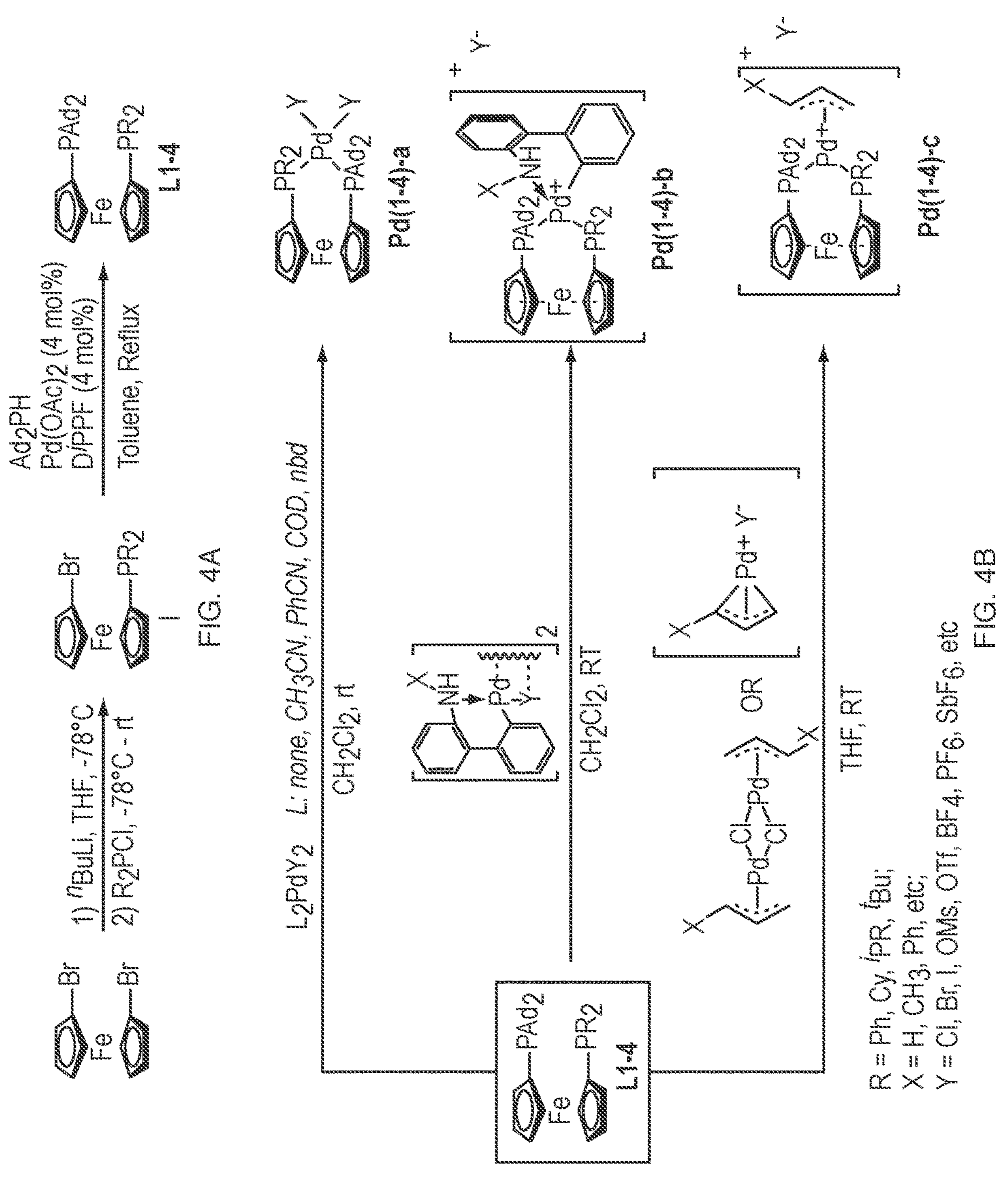
FIG. 4A shows the synthesis of ferrocenyl based unsymmetrical bidentate ligands (L1-4)
FIG. 4B shows their corresponding Pd complexes (Pd(1-4)-(a-c)).

The synthesis of the ligands L1-4 were achieved in two steps from readily available 1,1'-dibromoferrocene (FIG. 3). Following the reported procedure,[14b] the intermediate (I) was synthesized by selective lithiation of dibromoferrocene with 1 equiv. of n-BuLi, followed by quenching with dialkyl chlorophosphine (eg. $Ph_2PCl$) to give mono bromo ferrocenylphosphine (I). Stepnicka was able to perform another lithiation followed by $R_2PCl$ quench to make a few examples of mixed ligands as shown in FIG. 3B. Applying the same protocol to incorporate the $Ad_2P$ moiety onto the intermediate (I) did not afford the designed products (L1-4). Adding catalytic (or stoichiometric) amount copper (I) salt,[15] such as CuCl, also didn't help either. Rather, Pd-catalyzed P—C coupling was used as an alternative approach (FIG. 4A).[16] All ligands L1-4 were synthesized with unoptimized yields at ca. 70% in two steps, and characterized by $^1$H-NMR, $^{13}$C-NMR, $^{31}$P-NMR and elemental analysis.

The corresponding three classes of palladium pre-catalysts were synthesized in high yields and were characterized by NMR and elemental analysis (FIG. 4). Several of them, ((L1)$PdCl_2$, Pd1-a; (L3)$PdCl_2$, Pd3-a; (L4)$PdCl_2$, Pd4-a; (L1)Pd G3, Pd1-b; (L2)Pd G3, Pd2-b), were unambiguously characterized with single crystal X-Ray studies (see FIGS. 5-9). X-Ray crystal structures of five palladium complexes are also reported here-in, where single crystals were obtained by slow diffusion of pentane into dichloromethane solution.

Figure 5:
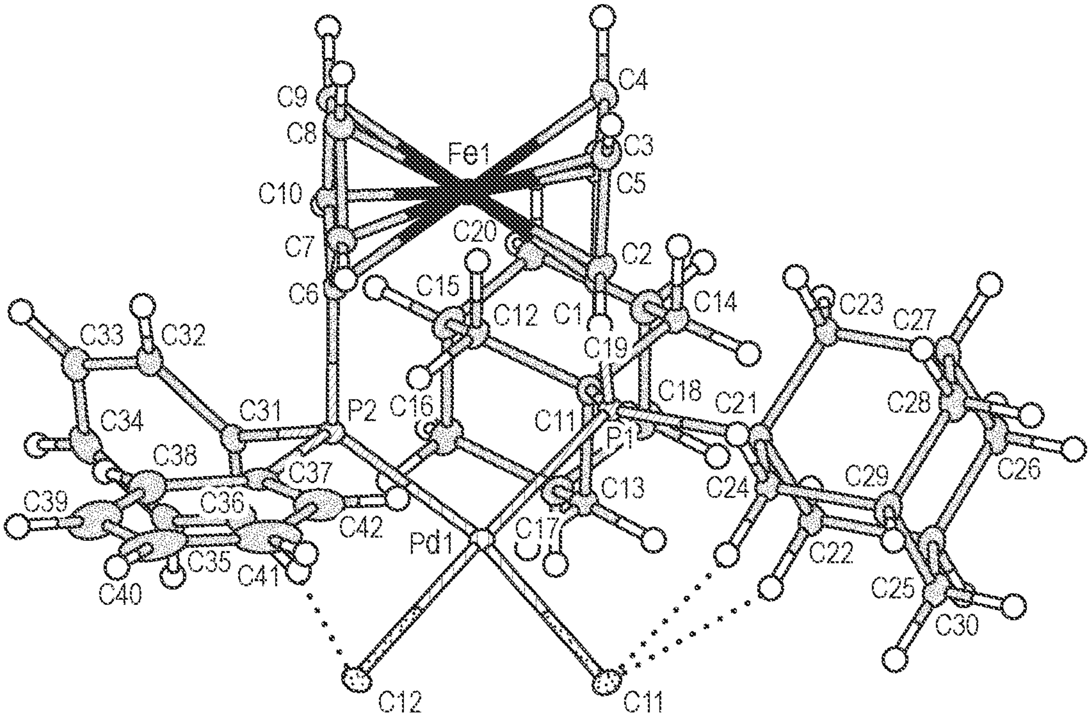
FIG. 5 is an X-Ray plot of the molecular structures of (L1)$PdCl_2$, Pd1-a.

FIG. 5 shows the X-Ray plot of the molecular structures of (L1)$PdCl_2$, Pd1-a; selected bond lengths (Å) and bond angles (deg): Pd—P1 2.3370(5), Pd—P2 2.2964(5), Pd—Cl1 2.3484(4), Pd—Cl2 2.3541(4); P1-Pd—P2 100.973(16), Cl1-Pd—Cl2 84.988(15), P1-Pd—Cl1 91.834(16), P1-Pd—Cl2 174.508(16), P2-Pd—Cl1 166.954(17), P2-Pd—Cl2 82.048(16).

Figure 6:
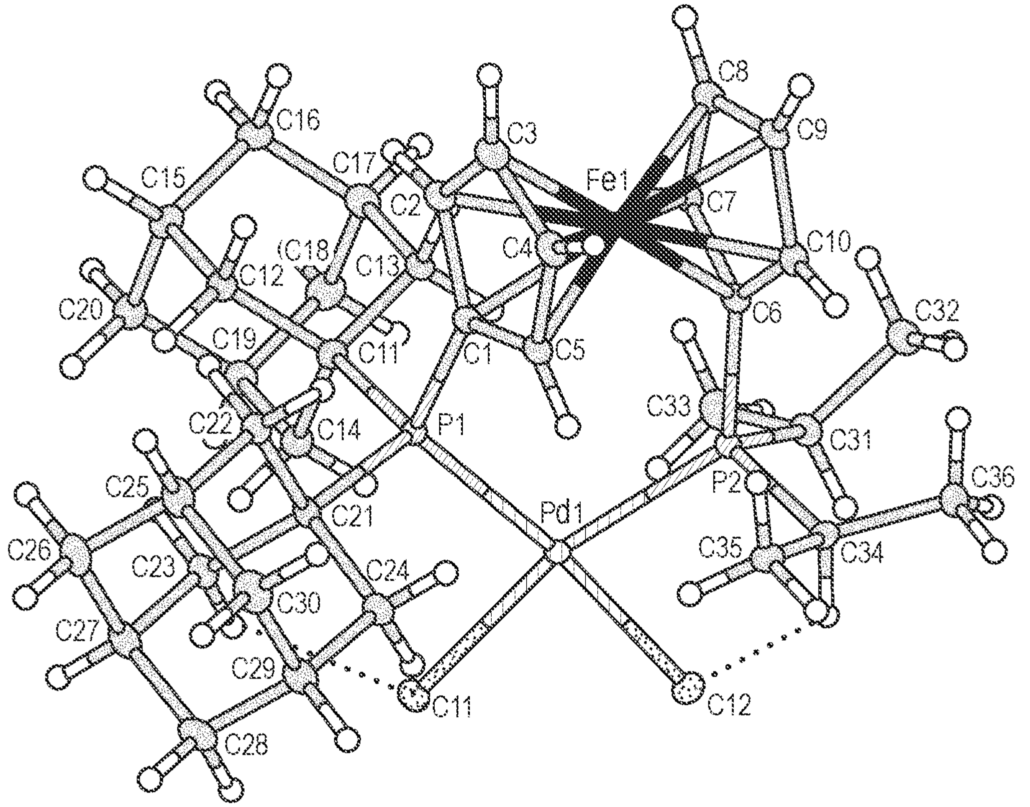
FIG. 6 is an X-Ray plot of the molecular structures of (L3)$PdCl_2$, Pd3-a.

FIG. 6 shows the X-Ray plot of the molecular structures of (L3)$PdCl_2$, Pd3-a; selected bond lengths (Å) and bond angles (deg): Pd—P1 2.3365(4), Pd—P2 2.3127(4), Pd—Cl1 2.3519(4), Pd—Cl2 2.3673(4); P1-Pd—P2 103.587(15), Cl1-Pd—Cl2 84.089(14), P1-Pd—Cl1 90.173(14), P1-Pd—Cl2 174.226(15), P2-Pd—Cl1 166.239(15), P2-Pd—Cl2 82.153(15).

Figure 7:
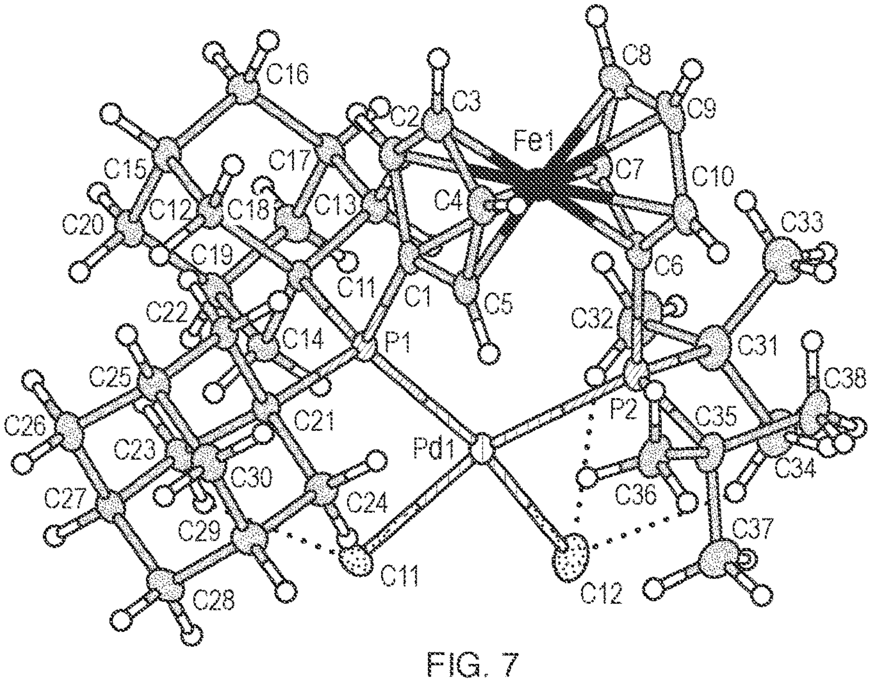
FIG. 7 is an X-Ray plot of the molecular structures of (L4)$PdCl_2$, Pd4-a.

FIG. 7 shows the X-Ray plot of the molecular structures of (L4)$PdCl_2$, Pd4-a; selected bond lengths (Å) and bond angles (deg): Pd—P1 2.3679(5), Pd—P2 2.3736(6), Pd—Cl1 2.3370(6), Pd—Cl2 2.3290(6); P1-Pd—P2 106.72(2), Cl1-Pd—Cl2 82.56(2), P1-Pd—Cl1 87.18(2), P1-Pd—Cl2 166.82(2), P2-Pd—Cl1 164.89(2), P2-Pd—Cl2 84.45(2).

Figure 8:
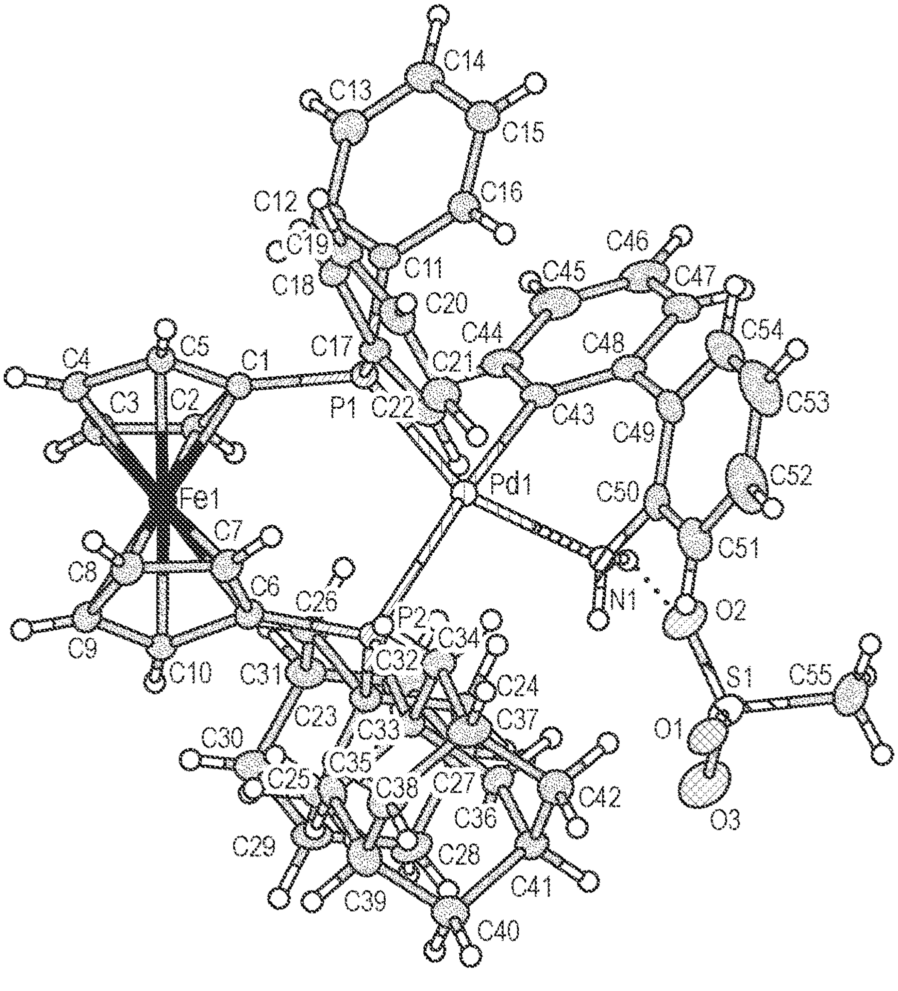
FIG. 8 is an X-Ray plot of the molecular structures of (L1)Pd G3, Pd1-b.

FIG. 8 shows the X-Ray plot of the molecular structures of (L1)Pd G3, Pd1-b; selected bond lengths (Å) and bond angles (deg): Pd—P1 2.2791(8), Pd—P2 2.4635(7), Pd—N1 2.147(2), Pd—C43 2.033(3); P1-Pd—P2 102.68(3), N1-Pd—C43 80.64(11), P1-Pd—N1 152.16(7), P1-Pd—C43 86.39(8), P2-Pd—N1 97.22(7), P2-Pd—C43 161.22(9).

Figure 9:
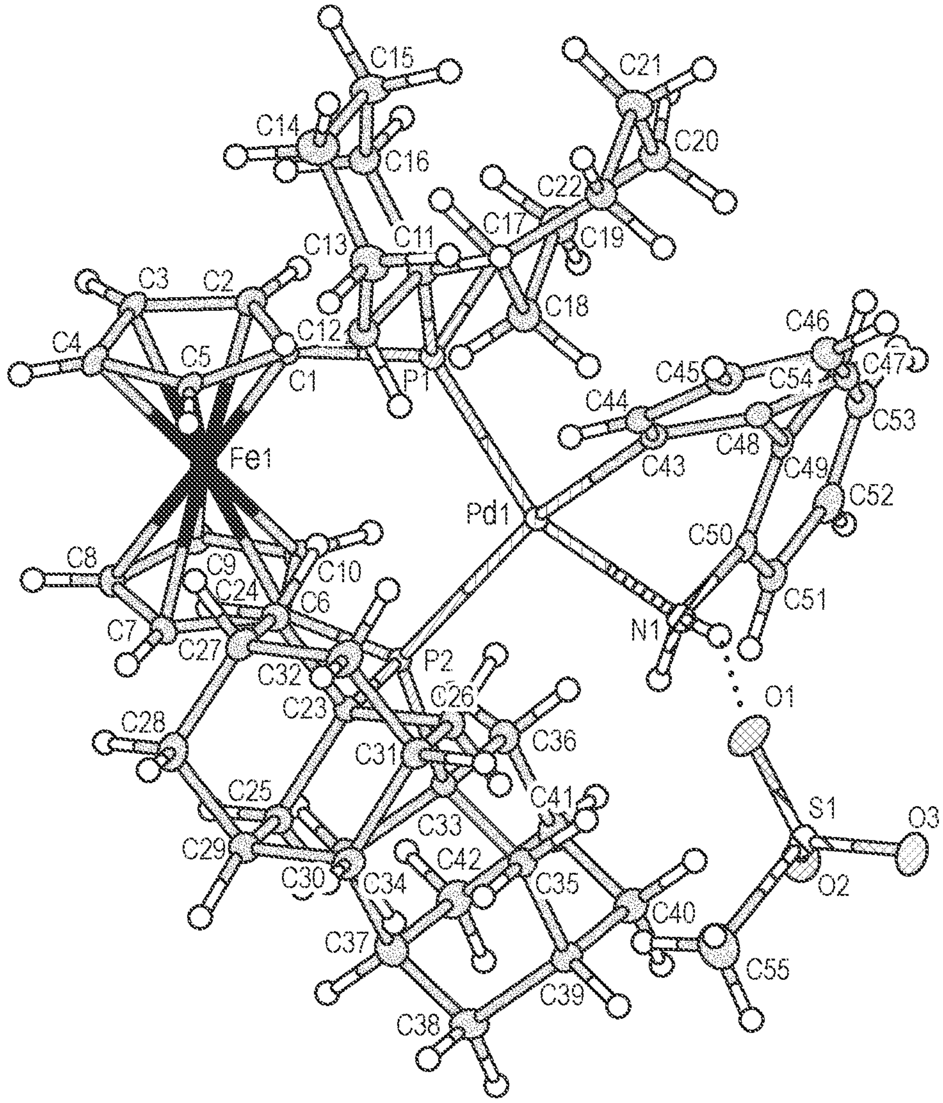
FIG. 9 is an X-Ray plot of the molecular structures of (L2)Pd G3, Pd2-b.

FIG. 9 shows the X-Ray plot of the molecular structures of (L2)Pd G3, Pd2-b. Selected bond lengths (Å) and bond angles (deg): Pd—P1 2.3094(4), Pd—P2 2.4626(4), Pd—N1 2.1657(14), Pd—C43 2.0454(17); P1-Pd—P2 103.304(17), N1-Pd—C43 80.40(6), P1-Pd—N1 153.33(4), P1-Pd—C43 87.65(5), P2-Pd—N1 95.50(4), P2-Pd—C43 160.31(5).

Selected P—Pd—P bite angles (in deg) are presented in Table 2, as well as other analogues taken from literature data for comparison purpose. All Pd centers have a distorted square planar geometry with the two phosphorus atoms in a cis configuration. Notably, (L4)$PdCl_2$, Pd4-a, has a very large P—Pd—P bite angle (106.72°, entry 3). To best of our knowledge, it is the largest P—Pd—P bite angle reported in literature among the $PdCl_2$ complexes with ferrocenyl based bidentate ligands. While comparing to the bite angle of the "state of the art catalyst," (dtbpf)$PdCl_2$ (104.22°, entry 6), the P—Pd—P bite angle of (L4)$PdCl_2$ is significantly high.

TABLE 2

| Entry | Pd Complexes | P—Pd—P (deg) |
|---|---|---|
| 1 | (L1)$PdCl_2$, Pd1-a | 100.97 |
| 2 | (L3)$PdCl_2$, Pd3-a | 103.60 |
| 3 | (L4)$PdCl_2$, Pd4-a | 106.72 |
| 4 | (dppf)$PdCl_2$[(14a)] | 97.98 |
| 5 | ($d^i$ppf)$PdCl_2$[(14c)] | 103.59 |
| 6 | ($d^t$bpf)$PdCl_2$[(5b)] | 104.22 |
| 7 | [Fc($PPh_2$)($PCy_2$))$PdCl_2$[(14b)] | 101.28 |
| 8 | [Fc($PPh_2$)($P^iPr_2$))$PdCl_2$[(14b)] | 102.49 |
| 9 | [Fc($PPh_2$)($P^tBu_2$))$PdCl_2$[(14b)] | 101.97 |
| 10 | (L1)Pd G3, Pd1-b | 102.68 |
| 11 | (L2)Pd G3, Pd2-b | 103.30 |

Owing to the bidentate nature and steric bulkiness of the ferrocenyl ligands, all (L)Pd G3 complexes are in cationic form, as illustrated in the structures of (L1)Pd G3 (Pd1-b) and (L2)Pd G3 (Pd2-b). The MsO group in each structure is displaced by second phosphine on the ferrocenyl ligand to form a mesylate anion, while the $NH_2$ group stay coordinated with Pd center. Similar phenomena were reported by Buchwald as well.[17] (BINAP)Pd G3, tBuXPhos Pd G3 and BrettPhos Pd G3 are in cationic forms with mesylate (MsO) out of the coordination sphere, while in XPhos Pd G3 is in a covalent form even with MsO. Both structures from Pd1-b and Pd2-b have significant tetrahedral distortion on Pd center (28.6° in Pd1-b and 28.2° in Pd2-b).

Applications of the ligands and precatalysts described herein in catalysis, particularly for two challenging and underrepresented class of reactions namely $C_{sp2}$—$C_{sp3}$ coupling and P—C coupling was also done, as detailed in the examples below.

As used herein the term "Ad" refers to an adamantyl functional group, i.e., a tricyclo bridged hydrocarbon of formula (—$C_{10}H_{15}$), which may also be written as (—C$(CH)_3(CH_2)_6$).

The term "alkyl" refers to a saturated hydrocarbon chain of 1 to 10 carbon atoms in length, such as, but not limited to, methyl, ethyl, propyl and butyl. The alkyl group may be straight-chain or branched-chain. For example, as used herein, propyl encompasses both n-propyl and iso-propyl; butyl encompasses n-butyl, sec-butyl, iso-butyl and tert-butyl, and so forth.

The term "aryl" refers to an aromatic hydrocarbon group. Aryl includes, e.g., phenyl, biphenyl, naphthyl, anthracenyl, and so forth, as well as the substituted forms of each. Heteroaryl refers to aromatic hydrocarbons in which one or more of the aromatic carbon atoms has been replaced with another atom such as nitrogen, oxygen or sulfur. Some examples of heteroaryl groups include, but are not limited to, pyridyl (pyridinyl) (($C_5H_4N$)—), furyl (furanyl) ($OC_4H_3$—), thienyl (($C_4H_3S$)—), and the substituted forms thereof.

"Substituted" as used herein means that one or more hydrogen atoms of the described compound or functional group is replaced with another functional group, or substituent. For example, substituted phenyl may include one or more substituents in place of any hydrogen atom on the phenyl ring. In some embodiment, there may be one substituent at the ortho, meta or para position. In other embodiments, there may be substituents at both ortho positions or both meta positions. In still other embodiments, the optionally substituted phenyl may include substituents at, e.g., both the ortho and para positions, or both meta and para positions. In some embodiments with multiple substituents, the substituents are all the same, in other embodiments with multiple substituents, the substituents are different from each other. Typical substituents include, but are not limited to, $C_1$-$C_4$ alkyl, $C_1$-$C_4$ haloalkyl and $C_1$-$C_4$ alkoxy. When a functional group is described as "optionally substituted" that functional group may have one or more substituents or no substituents.

The precatalyst complexes described herein have at least one metallic center comprising a transition metal ("M"). Examples of transition metals include, but are not limited to, transition metals of Groups 9 and 10 of the periodic table. Group 9 metals include Co, Rh and Ir. Group 10 elements include Ni, Pd and Pt.

The present disclosure further provides the following embodiments set forth in the clauses below:

{1} A compound of formula I

I

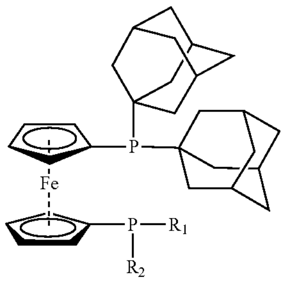

wherein $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl; $R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; and each optional substituent, when present, is selected from the group consisting of $C_1$-$C_4$ alkyl, $C_1$-$C_4$ haloalkyl and $C_1$-$C_4$ alkoxy.

{2} The compound according to clause {1} wherein $R_1$ and $R_2$ are independently selected from the group consisting of phenyl, optionally substituted phenyl, cyclohexyl, isopropyl and tert-butyl. In some embodiments, $R_1$ and $R_2$ are the same. In other embodiments, $R_1$ and $R_2$ are different. In some embodiments, $R_1$ and $R_2$ are both aryl groups. In some embodiments, $R_1$ and $R_2$ are both alkyl groups. In some embodiments, $R_1$ is an aryl moiety and $R_2$ is an alkyl moiety. In some embodiments, $R_1$ and $R_2$ are both phenyl. In some embodiments, $R_1$ and $R_2$ are both substituted phenyl. In some embodiments, $R_1$ and $R_2$ are both cyclcohexyl. In some embodiments, $R_1$ and $R_2$ are both isopropyl. In some embodiments, $R_1$ and $R_2$ are both tert-butyl. In some embodiments, $R_1$ is phenyl and $R_2$ is substituted phenyl. In some embodiments, $R_1$ is phenyl and $R_2$ is cyclohexyl. In some embodiments, $R_1$ is phenyl and $R_2$ is isopropyl. In some embodiments, $R_1$ is phenyl and $R_2$ is tert-butyl. In some embodiments, $R_1$ is substituted phenyl and $R_2$ is cyclohexyl. In some embodiments, $R_1$ is substituted phenyl and $R_2$ is isopropyl. In some embodiments, $R_1$ is substituted phenyl and $R_2$ is tert-butyl. In some embodiments, $R_1$ is cyclohexyl and $R_2$ is isopropyl. In some embodiments, $R_1$ is cyclohexyl and $R_2$ is tert-butyl. In some embodiments, $R_1$ is tert-buyl and $R_2$ is isopropyl.

{3} The compound according to either of clauses {1} or {2} wherein $R_1$ and $R_2$ are each substituted phenyl. In some embodiments, the substituent is alkyl. In certain embodiments, the substituent is methyl. In some embodiments, the substituent is alkoxy. In certain embodiments, the substituent is methoxy. In certain embodiments, the substituent is isopropoxy. In some embodiments, the substituent is haloalkyl. In certain embodiments, the substituent is trifluoromethyl. In certain embodiments, there are multiple substituents. In some embodiments, each substituted phenyl has two alkyl substituents. In such embodiments, the alkyl substituents are $C_1$-$C_4$ alkyl or haloalkyl. In some embodiments, the alkyl substituents are methyl, isopropyl, tert-butyl or trifluoromethyl groups. In other embodiments, each substituted phenyl has three substituents. In such embodiments, the alkyl substituents are $C_1$-$C_4$ alkyl or haloalkyl. In some embodiments, the alkyl substituents are methyl, isopropyl, tert-butyl or trifluoromethyl groups. In still other embodiments, each substituted phenyl has one or more alkyl substituents and one or more alkoxy substituents. In some embodiments, each substituted phenyl has one or more $C_1$-$C_4$ alkyl or haloalkyl substituents and one or more $C_1$-$C_4$ alkoxy substituents. In some embodiments, each substituted phenyl has two $C_1$-$C_4$ alkyl substituents and one $C_1$-$C_4$ alkoxy substituents.

{4} The compound according to any of clauses {1}, {2} or {3} wherein —$PR_1R_2$ is selected from

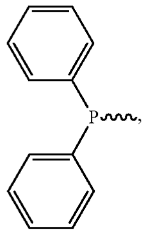,
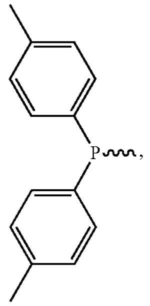,
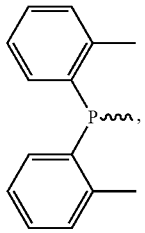,
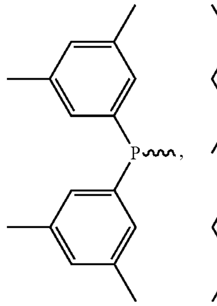,
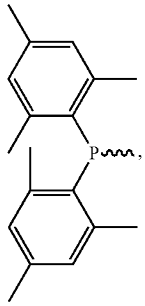,
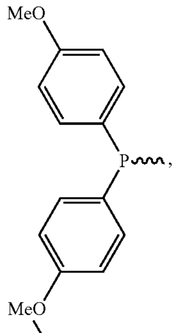,
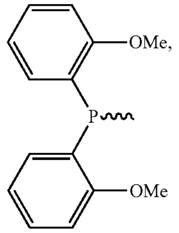,
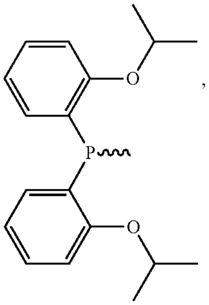, -continued

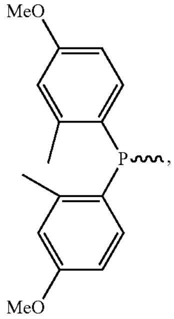

,

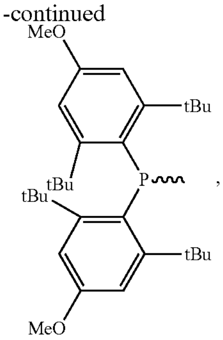

, and

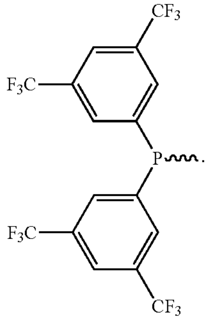

.

{5} A ligand of formula I:

I

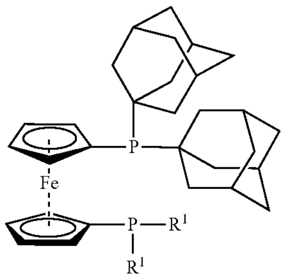

wherein $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl; $R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; and each optional substituent, when present, is selected from the group consisting of $C_1$-$C_4$ alkyl, $C_1$-$C_4$ haloalkyl and $C_1$-$C_4$ alkoxy.

{6} The ligand according to clause {5} wherein $R_1$ and $R_2$ are independently selected from the group consisting of phenyl, optionally substituted phenyl, cyclohexyl, isopropyl and tert-butyl.

{7} The ligand according to either of clauses {5} or {6} wherein $R_1$ and $R_2$ are each substituted phenyl. In some embodiments, the substituent is alkyl. In certain embodiments, the substituent is methyl. In some embodiments, the substituent is alkoxy. In certain embodiments, the substituent is methoxy. In certain embodiments, the substituent is isopropoxy. In some embodiments, the substituent is haloalkyl. In certain embodiments, the substituent is trifluoromethyl. In certain embodiments, there are multiple substituents. In some embodiments, each substituted phenyl has two alkyl substituents. In such embodiments, the alkyl substituents are $C_1$-$C_4$ alkyl or haloalkyl. In some embodiments, the alkyl substituents are methyl, isopropyl, tert-butyl or trifluoromethyl groups. In other embodiments, each substituted phenyl has three substituents. In such embodiments, the alkyl substituents are $C_1$-$C_4$ alkyl or haloalkyl. In some embodiments, the alkyl substituents are methyl, isopropyl, tert-butyl or trifluoromethyl groups. In still other embodiments, each substituted phenyl has one or more alkyl substituents and one or more alkoxy substituents. In some embodiments, each substituted phenyl has one or more $C_1$-$C_4$ alkyl or haloalkyl substituents and one or more $C_1$-$C_4$ alkoxy substituents. In some embodiments, each substituted phenyl has two $C_1$-$C_4$ alkyl substituents and one $C_1$-$C_4$ alkoxy substituents.

{8} A ligand according to either of clauses {5} or {6}, wherein the ligand is selected from

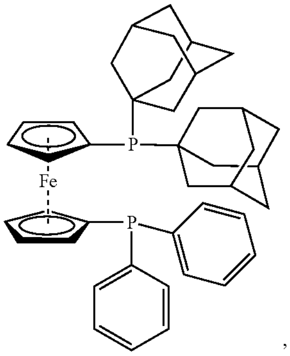

,

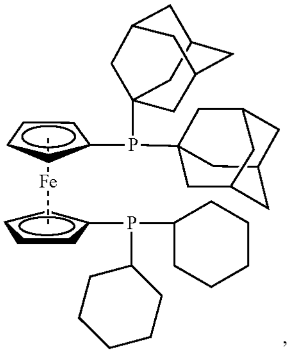

,

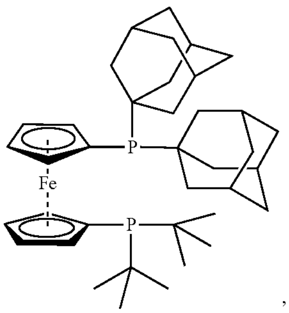

, and

-continued

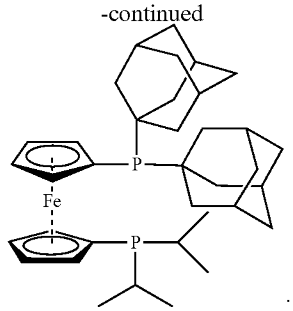

.

{9} A precatalyst of formula II:

II

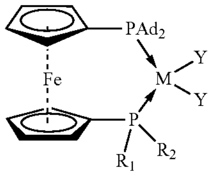

wherein Ad is adamantyl; $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl; $R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; each optional substituent, when present, is selected from the group consisting of $C_1$-$C_4$ alkyl, $C_1$-$C_4$ haloalkyl and $C_1$-$C_4$ alkoxy; M is a transition metal selected from Group 9 or Group 10; and Y is halo.

{10} The precatalyst according to clause {9} wherein $R_1$ and $R_2$ are independently selected from the group consisting of phenyl, optionally substituted phenyl, cyclohexyl, isopropyl and tert-butyl.

{11} The precatalyst according to either of clauses {9} or {10} wherein $R_1$ and $R_2$ are each substituted phenyl. In some embodiments, the substituent is alkyl. In certain embodiments, the substituent is methyl. In some embodiments, the substituent is alkoxy. In certain embodiments, the substituent is methoxy. In certain embodiments, the substituent is isopropoxy. In some embodiments, the substituent is haloalkyl. In certain embodiments, the substituent is trifluoromethyl. In certain embodiments, there are multiple substituents. In some embodiments, each substituted phenyl has two alkyl substituents. In such embodiments, the alkyl substituents are $C_1$-$C_4$ alkyl or haloalkyl. In some embodiments, the alkyl substituents are methyl, isopropyl, tert-butyl or trifluoromethyl groups. In other embodiments, each substituted phenyl has three substituents. In such embodiments, the alkyl substituents are $C_1$-$C_4$ alkyl or haloalkyl. In some embodiments, the alkyl substituents are methyl, isopropyl, tert-butyl or trifluoromethyl groups. In still other embodiments, each substituted phenyl has one or more alkyl substituents and one or more alkoxy substituents. In some embodiments, each substituted phenyl has one or more $C_1$-$C_4$ alkyl or haloalkyl substituents and one or more $C_1$-$C_4$ alkoxy substituents. In some embodiments, each substituted phenyl has two $C_1$-$C_4$ alkyl substituents and one $C_1$-$C_4$ alkoxy substituents.

{12} The precatalyst according to any of clauses {9} through {11} wherein M is selected from the group consisting of Pd, Ni, Rh, Co, Ir and Pt.

{13} The precatalyst according to any of clauses {9} through {12} wherein M is Pd.

{14} The precatalyst according to any of clauses {9} through {13} wherein Y is selected from chloro, bromo and iodo.

{15} The precatalyst according to any of clauses {9}, {10} or {12}-{14} selected from

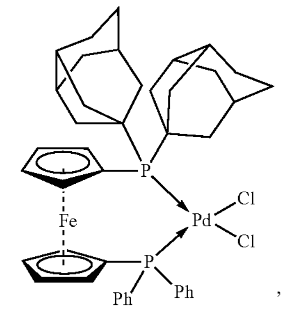

,

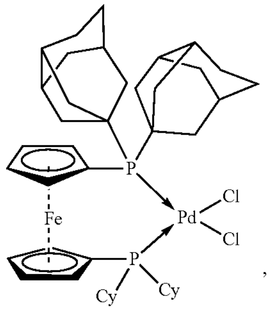

,

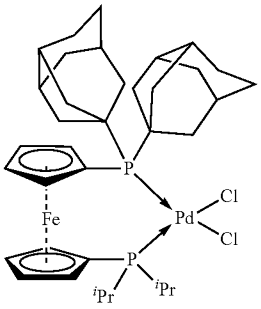

and

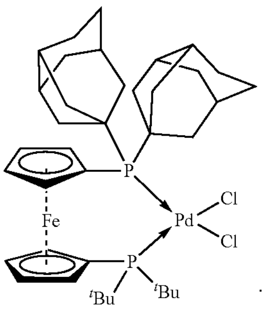

.

{16} A precatalyst of Formula III:

III

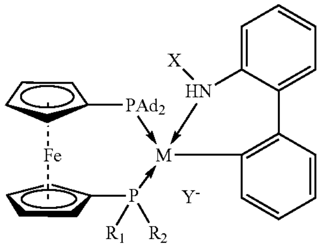

wherein Ad is adamantyl; $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl; $R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; each optional substituent, when present, is selected from the group consisting of $C_1$-$C_4$ alkyl, $C_1$-$C_4$ haloalkyl and $C_1$-$C_4$ alkoxy; M is a transition metal selected from Group 9 or Group 10; X is selected from the group consisting of H, $C_1$-$C_4$ alkyl and phenyl; and $Y^-$ is an anion selected from the group consisting of halide, triflate ($^-$OTf), tetrafluoroborate ($^-BF_4$), hexafluorophosphate ($^{-}PF_6$), mesylate ($^{-}OMs$), tosylate ($^{-}OTs$), tetrakis{3,5-bis(trifluoromethyl)phenyl}borate ($^{-}BArF$), hexafluoro antimonate ($^{-}SbF_6$) and combinations thereof.

{17} The precatalyst according to clause {16} wherein $R_1$ and $R_2$ are independently selected from the group consisting of phenyl, cyclohexyl, isopropyl and tert-butyl.

{18} The precatalyst according to either of clauses {16} or {17} wherein M is selected from the group consisting of Pd, Ni, Rh, Co, Ir and Pt.

{19} The precatalyst according to any of clauses {16} through {18} wherein M is Pd.

{20} The precatalyst according to any of clauses {16} through {19} wherein X is selected from the group consisting of H, methyl and phenyl.

{21} The precatalyst according to any of clauses {16} through {20} wherein $Y^-$ is selected from the group consisting of $Cl^-$, $Br^-$, $I^-$, $^{-}OTf$, $^{-}BF_4$, $^{-}OMs$, $^{-}OTs$, $^{-}PF6$, $^{-}BArF$, and $^{-}SbF6$.

{22} The precatalyst according to any of clauses {16} through {21} selected from the group consisting of

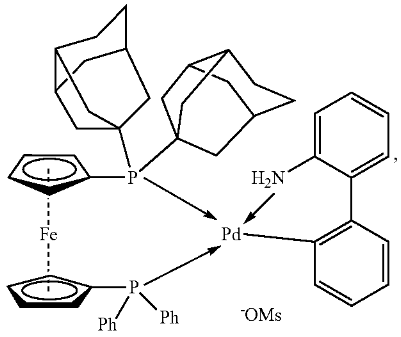
,

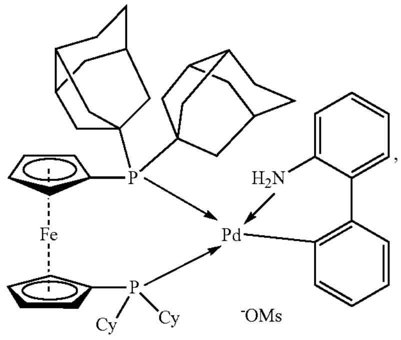
,

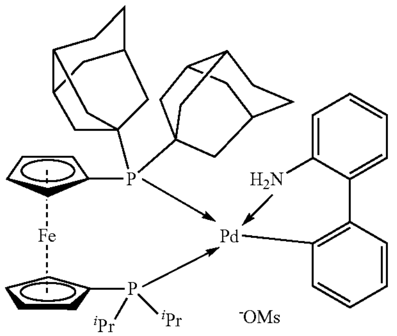
and

-continued

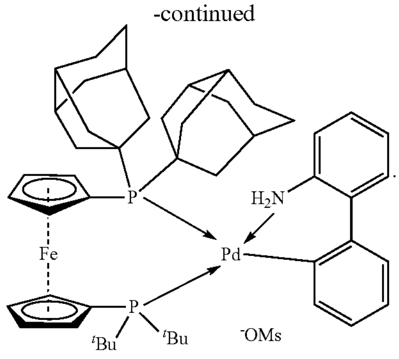
.

{23} A precatalyst of formula IV:

IV

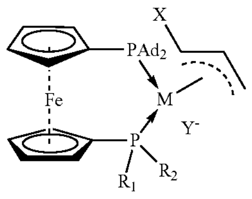

wherein Ad is adamantyl; $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl; $R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; wherein each optional substituent, when present, is selected from the group consisting of $C_1$-$C_4$ alkyl, $C_1$-$C_4$ haloalkyl and $C_1$-$C_4$ alkoxy; M is a transition metal selected from Group 9 or Group 10; X is selected from the group consisting of H, $C_1$-$C_4$ alkyl and phenyl; and $Y^-$ is an anion selected from the group consisting of halide, triflate ($^{-}OTf$), tetrafluoroborate ($^{-}BF_4$), hexafluorophosphate ($^{-}PF_6$), mesylate ($^{-}OMs$), tosylate ($^{-}OTs$), tetrakis{3,5-bis(trifluoromethyl)phenyl} borate ($^{-}BArF$), hexafluoro antimonate ($^{-}SbF_6$) and combinations thereof.

{24} The precatalyst according to clause {23} wherein $R_1$ and $R_2$ are independently selected from the group consisting of phenyl, cyclohexyl, isopropyl and tert-butyl.

{25} The precatalyst according to either of clauses {23} or {24} wherein M is selected from the group consisting of Pd, Ni, Rh, Co, Ir and Pt.

{26} The precatalyst according to any of clauses {23} through {25} wherein M is Pd.

{27} The precatalyst according to any of clauses {23} through {26} wherein X is selected from the group consisting of H, methyl and phenyl.

{28} The precatalyst according to any of clauses {23} through {27} wherein $Y^-$ is selected from the group consisting of $Cl^-$, $Br^-$, $I^-$, $^{-}OTf$, $^{-}BF_4$, $^{-}OMs$, $^{-}OTs$, $^{-}PF_6$, $^{-}BArF$, and $^{-}SbF6$.

{29} The precatalyst according to any of clauses {23} through {28} selected from the group consisting of

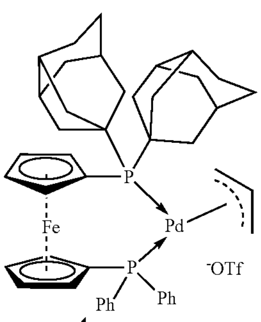
,
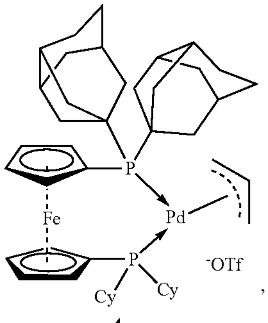
,
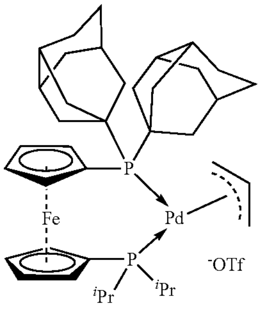
and
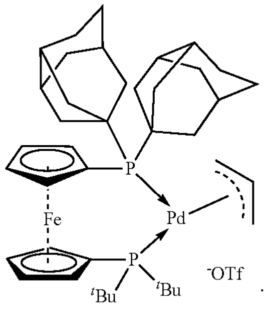
.

{30} A method for performing a metal-catalyzed P—C cross-coupling reaction comprising the steps of: contacting a ligand according to any of clauses {5} through {8} with a metal catalyst in the presence of an aromatic solvent and a base in a reaction vessel; adding a first substrate of formula Ar—X', wherein Ar is aryl and X' is halo and a second substrate of formula $R'_2PH$, wherein R' is selected from the group consisting of $C_1$-$C_{10}$ alkyl and $C_3$-$C_{10}$ cycloalkyl, to the reaction vessel; heating the reaction vessel to a temperature in the range from 100° C. to 200° C. for a time sufficient to form the carbon-phosphorous bond.

{31} The method of clause {30} wherein the ligand is a ligand according to clause {8}, the catalyst is a Pd catalyst.

{32} A method for performing a metal-catalyzed $C_{sp2}$-$C_{sp3}$ cross-coupling reaction comprising the steps of: contacting a precatalyst of Formula II according to any of clauses {9} through {15} with a first substrate and a second substrate in the presence of a solvent in a reaction vessel; wherein the first substrate is of formula Ar—X', wherein Ar is optionally substituted aryl or optionally substituted heteroaryl and X' is chloro or bromo or iodo; wherein the second substrate is of formula R'{M}, wherein R' is selected from the group consisting of $C_1$-$C_{10}$ alkyl, $C_1$-$C_{10}$ fluoroalkyl and $C_3$-$C_{10}$ cycloalkyl, {M} is selected from the group consisting of Li, MgX', ZnX' and $B(OH)_2$ and related boron reagents, wherein X' is selected from the group consisting of chloro, bromo and iodo; optionally, heating the reaction vessel and allowing first substrate and the second substrate to react in the presence of the precatalyst for a time sufficient for the $C_{sp2}$-$C_{sp3}$ cross-coupling to occur.

{33} The method according to clause {32} wherein the first substrate is selected from the group consisting of optionally substituted phenyl, optionally substituted pyridyl, optionally substituted thienyl, and optionally substituted furyl.

{34} The method according to either of clauses {32} or {33} wherein {M} is Li, the solvent is toluene, and the reaction vessel is not heated.

{35} The method according to either of clauses {32} or {33} wherein {M} is selected from MgX' and ZnX', the solvent is tetrahydrofuran, and the reaction vessel is heated to 50° C.

{36} The method according to either of clauses {32} or {33} wherein {M} is $B(OH)_2$, the solvent is toluene and the reaction vessel is heated to 100° C.

EXAMPLES

Synthesis of Ligands of Formula I

Example 1. Synthesis of (1-diisopropylphosphino)-(1'-diadamantylphosphino)ferrocene (I-c)

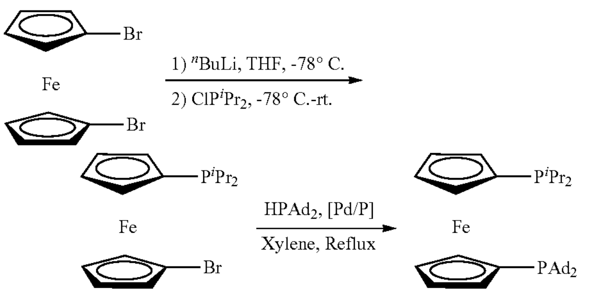

I-c

Under nitrogen, 1,1'-dibromoferrocene (5 g, 0.015 mol) was placed in a 250 mL Schlenk flask and dissolved in 50 mL anhydrous THF. This solution was then cooled to −78° C. using dry ice/acetone bath. nBuLi (2.5M in hexanes, 6 mL, 0.015 mol) was slowly added dropwise into the reaction solution at −78° C. The result orange reaction solution was stirred at −78° C. for about 1 hour. Chlorodiisopropylphosphine ($ClP^iPr_2$, 2.5 mL, 0.016 mol) was slowly added dropwise using a syringe at −78° C. The reaction mixture was slowly warmed up to room temperature and stirred at room temperature for about 3 hours. Methanol (2 mL) was added into the reaction mixture to quench the reaction. Solvent was removed on a rotary evaporator, and the residue was dissolved in 20 mL hexanes and filtered through a plug of silica. The plug was washed with hexanes until the first light orange-colored band (impurity band) was completely eluted out, and then with TBME to collect the following dark-orange colored band (product band) until no colored filtrate was eluted out. The dark-orange colored filtrate was initially concentrated using a rotary evaporator until most of the solvent was evaporated, and then under a high vacuum to yield an orange oil (5 g) which was confirmed by $^{31}$P-NMR (>95% purity, 0.37 ppm). The material at this stage was used as is for next step.

$Pd(OAc)_2$ (100 mg, 0.4 mmol), $D^iPPF$ (1,1'-bis(diisopropylphosphino)ferrocene; 180 mg, 0.4 mmol), (1-diisopropylphosphino)-1'-bromoferrocene (5.0 g, 0.013 mol), diadamantylphosphine ($Ad_2PH$, 4.20 g, 0.014 mol) and NaOtBu (1.4 g, 0.015 mol) were placed in a 250 mL Schlenk flask, followed by adding 100 mL anhydrous toluene. The reaction mixture was stirred at room temperature for 10 minutes, and then heated to reflux for 20 hours, at which point the reaction was deemed complete on the basis of $^{31}$P NMR data obtained from a withdrawn aliquot. The reaction mixture was then allowed to cool and passed through a plug of silica, and the plug was then washed with $CH_2Cl_2$ until all the orange solution was collected. The combined eluent was collected, and the solvent was removed in vacuo to obtain an orange solid, which was slurry washed with 50 mL $Et_2O$ to obtain an orange solid. The solid was filtered and washed with $Et_2O$ (2×10 mL) and dried under vacuum to yield 6.3 g, (80%) orange solid. $^{1}$H NMR ($CD_2Cl_2$): δ=4.35 (m, 2H; Fc-H), 4.32 (m, 2H; Fc-H), 4.23 (m, 2H; Fc-H), 4.15 (m, 2H; Fc-H), 2.09 (m, 6H), 1.96-1.85 (m, 14H; 1-Ad), 1.72 (s, 12H; 1-Ad), 1.12-1.07 (m, 12H, $CH_3$); $^{31}P\{^{1}H\}$ NMR ($CD_2Cl_2$): δ=25.39 ($PAd_2$), −0.03 ($P^{i}Pr_2$).

Other ligands described herein were synthesized similarly.

Example 2. (1-diphenylphosphino)-(1'-diadamantylphosphino)ferrocene (I-a)

The general procedure for compound I-c was used, except with the replacement of chlorodiisopropylphosphine with chlorodiphenylphosphine (3.53 g, 0.016 mol). The resulting compound was an orange solid. $^{1}$H NMR ($CD_2Cl_2$): δ=7.50-7.33 (m, 10H, Ar—H), 4.42 (m, 2H; Fc-H), 4.29 (m, 2H; Fc-H), 4.15 (m, 2H; Fc-H), 4.08 (m, 2H; Fc-H), 2.01-1.97 (m, 6H, 1-Ad), 1.91-1.87 (m, 6H; 1-Ad), 1.84-1.80 (m, 6H; 1-Ad), 1.68 (s, 12H, 1-Ad); $^{31}P\{^{1}H\}$ NMR ($CD_2Cl_2$): δ=25.66 ($PAd_2$), 17.05 ($PPh_2$).

Example 3. (1-dicyclohexylphosphino)-(1'-diadamantylphosphino)ferrocene (I-b)

The general procedure for compound I-c was used, except with the replacement of chlorodiisopropylphosphine with chlorodicyclohexylphosphine (3.72 g, 0.016 mol). The resulting compound was an orange solid. $^{1}$H NMR ($CD_2Cl_2$): δ=4.33 (m, 2H; Fc-H), 4.30 (m, 2H; Fc-H), 4.21 (m, 2H; Fc-H), 4.13 (m, 2H; Fc-H), 2.10-2.06 (m, 6H), 1.95-1.70 (m, 37H), 1.35-1.20 (m, 9H); $^{31}P\{^{1}H\}$ NMR ($CD_2Cl_2$): δ=25.18 ($PAd_2$), −8.15 ($PCy_2$).

Example 4. (1-di-t-butylphosphino)-(1'-diadamantylphosphino)ferrocene (I-d)

The general procedure for compound I-c was used, except with the replacement of chlorodiisopropylphosphine with chlorodi-t-butylphosphine (2.89 g, 0.016 mol). The resulting compound was an orange solid. $^{1}$H NMR ($CD_2Cl_2$): δ=4.38-4.35 (m, 4H; Fc-H), 4.20-4.18 (m, 4H; Fc-H), 2.09-2.05 (m, 6H, 1-Ad), 1.95-1.84 (m, 12H; 1-Ad), 1.70 (s, 12H; 1-Ad), 1.18 (d, 18H, $^{t}$Bu—H); $^{31}P\{^{1}H\}$ NMR ($CD_2Cl_2$): δ=27.07 ($P^{t}Bu_2$), 25.31 ($PAd_2$).

Example 5. (1-diisopropylphosphino)-(1'-di-t-butylphosphino)ferrocene (I-e)

Under nitrogen, 1,1'-Dibromoferrocene (5 g, 0.013 mol) was placed in a 250 mL Schlenk flask and dissolved in 50 mL anhydrous THF. This solution was then cooled to −78° C. using dry ice/acetone bath. nBuLi (2.5M in hexanes, 6 mL, 0.015 mol) was slowly added dropwise into the reaction solution at −78° C. The result orange reaction solution was stirred at −78° C. for about 1 hour. Chlorodiisopropylphosphine ($ClP^{i}Pr_2$, 2.5 mL, 0.016 mol) was slowly added dropwise using a syringe at −78° C. The reaction mixture was slowly warmed up to room temperature and stirred at room temperature for about 3 hours. Methanol (2 mL) was added into the reaction mixture to quench the reaction. Solvent was removed on a rotary evaporator, and the residue was dissolved in 20 mL hexanes and filtered through a plug of silica. The plug was washed with hexanes until the first light orange-colored band (impurity band) was completely eluted out, and then with TBME to collect the following dark-orange colored band (product band) until no colored filtrate was eluted out. The dark-orange colored filtrate was initially concentrated using a rotary evaporator until most of the solvent was evaporated, and then under a high vacuum to yield an orange oil (5 g) which was confirmed by $^{31}$P-NMR (>95% purity, 0.37 ppm). The material at this stage was used as is for next step.

Under nitrogen, (1-diisopropylphosphino)-1'-bromoferrocene (5 g, 0.013 mol) was placed in a 250 mL Schlenk flask and dissolved in 50 mL anhydrous THF. This solution was then cooled to −78° C. using dry ice/acetone bath. nBuLi (2.5M in hexanes, 6 mL, 0.015 mol) was slowly added dropwise into the reaction solution at −78° C. The result orange reaction solution was stirred at −78° C. for about 1 hour. Chlorodi-t-butylphosphine ($ClP^{t}Bu_2$, 2.89 g, 0.016 mol) was slowly added dropwise using a syringe at −78° C. The reaction mixture was slowly warmed up to room temperature and stirred at room temperature for about 3 hours. Methanol (2 mL) was added into the reaction mixture to quench the reaction. Solvent was removed on a rotary evaporator, and the residue was dissolved in 20 mL dichloromethane and filtered through a plug of silica. The plug was then washed with dichloromethane until the orange band was completely eluted out and collected. The filtrate was concentrated using a rotary evaporator, and the residue was dissolved in 20 mL hexanes. The dark orange solution was cooled to −20° C. in a freezer overnight to yield the solid precipitation. The solid was collected and washed with cold hexanes (5 mL×2) to obtain the orange solid (4.4 g, 75%). $^{1}$H NMR ($CD_2Cl_2$): δ=4.35 (m, 2H; Fc-H), 4.32 (m, 2H; Fc-H), 4.27 (m, 2H; Fc-H), 4.19 (m, 2H; Fc-H), 2.00-1.92 (m, 2H, $CH(CH_3)_2$), 1.22 (d, 18H; $^{t}$Bu), 1.15-1.05 (m, 12H; $CH(CH_3)_2$); $^{31}P\{^{1}H\}$ NMR ($CD_2Cl_2$): δ=27.06 ($P^{t}Bu_2$), −0.22 ($P^{i}Pr_2$)

Synthesis of Precatalysts of Formula II

Example 6. Synthesis of [(1-diisopropylphosphino)(1'-diadamantylphosphino)ferrocene]dichloro Palladium (II-c)

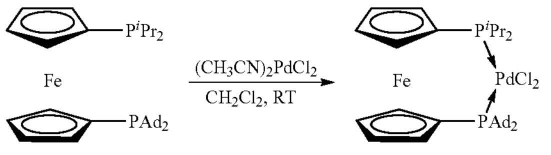

I-c II-c

Under nitrogen, (1-diisopropylphosphino)-(1'-diadamantylphosphino)ferrocene (603 mg, 1.0 mmol) and $Pd(CH_3CN)_2Cl_2$ (259 mg, 1.0 mmol) were placed in a 100 mL Schlenk flask and dissolved in 50 mL anhydrous dichloromethane. The reaction mixture was stirred at room temperature for 2 hours, followed by the solvent removal to yield a brown solid. The solid was slurried with 50 mL hexanes for 30 minutes, to obtain a reddish brown solid, which was filtered and dried under vacuum to yield the pure product (750 mg, 96%). Slow diffusion of pentane into a dichloromethane solution of the product yielded single crystals suitable for X-Ray diffraction studies. $^{1}$H NMR ($CD_2Cl_2$): δ=4.77 (m, 2H; Fc-H), 4.59 (s, 2H; Fc-H), 4.52 (s, 2H; Fc-H), 4.50 (m, 2H; Fc-H), 3.31-3.23 (m, 2H; $CH(CH_3)$ 2), 2.75 (br, 6H), 2.38 (br, 6H), 2.06 (s, br, 6H), 1.84-1.60 (m, 18H), 1.35-1.22 (m, 6H); $^{31}P\{^1H\}$ NMR ($CD_2Cl_2$): δ=68.50 (d), 58.10 (d).

Other metal complexes described herein were synthesized similarly.

Example 7. [(1-diphenylphosphino)(1'-diadamantylphosphino)ferrocene]dichloro palladium (II-a)

The general procedure for compound II-c was used, except with the replacement of (1-diisopropylphosphino)-(1'-diadamantylphosphino)ferrocene with (1-diphenylphosphino)-(1'-diadamantylphosphino)ferrocene (671 mg, 1.0 mmol). The resulting product was a brown solid. $^1H$ NMR ($CD_2Cl_2$): δ=8.10 (br, 4H, Ph-H), 7.60-7.50 (m, 6H, Ph-H), 4.96 (m, 2H, Fc-H), 4.57 (m, 2H, Fc-H), 4.33 (m, 2H, Fc-H), 3.91 (m, 2H, Fc-H), 3.20-2.05 (br, 12H, Ad-H), 2.02 (m, 6H, Ad-H), 1.90-1.75 (m, 12H, Ad-H); $^{31}P\{^1H\}$ NMR ($CD_2Cl_2$): δ=75.10 (d), 38.25 (d).

Example 8. [(1-dicyclohexylphosphino)(1'-diadamantylphosphino)ferrocene]dichloro palladium (II-b)

The general procedure for compound II-c was used, except with the replacement of (1-diisopropylphosphino)-(1'-diadamantylphosphino)ferrocene with (1-dicyclohexylphosphino)-(1'-diadamantylphosphino)ferrocene (683 mg, 1.0 mmol). The resulting product was a brown solid. $^1H$ NMR ($CD_2Cl_2$): δ=4.72 (m, 2H, Fc-H), 4.57 (m, 2H, Fc-H), 4.55-4.45 (m, 4H, Fc-H), 3.10-2.20 (br, 18H), 2.20-1.60 (m, 18H), 1.55-1.20 (m, 16H); $^{31}P\{^1H\}$ NMR ($CD_2Cl_2$): δ=75.10 (d), 38.25 (d).

Example 9. [(1-di-t-butylphosphino)(1'-diadamantylphosphino)ferrocene]dichloro palladium (II-d)

The general procedure for compound II-c was used, except with the replacement of (1-diisopropylphosphino)-(1'-diadamantylphosphino)ferrocene with (1-di-t-butylphosphino)-(1'-diadamantylphosphino)ferrocene (631 mg, 1.0 mmol). The resulting product was a brown solid. $^{31}P\{^1H\}$ NMR ($CD_2Cl_2$): δ=66.66 (d), 60.00 (d).

Example 10. [(1-diisopropylphosphino)(1'-di-t-butylphosphino)ferrocene]dichloro palladium (II-e)

The general procedure for compound II-c was used, except with the replacement of (1-diisopropylphosphino)-(1'-diadamantylphosphino)ferrocene with (1-diisopropylphosphino)-(1'-di-t-butylphosphino)ferrocene (446 mg, 1.0 mmol). The resulting product was a brown solid. $^{31}P\{^1H\}$ NMR ($CD_2Cl_2$): δ=74.37 (d), 58.80 (d).

Synthesis of Precatalysts of Formula III

Example 11. Synthesis of [(1-diisopropylphosphino)(1'-diadamantylphosphino)ferrocene][2-(2'-amino-1,1'-biphenyl)]palladium(II) methanesulfonate (III-c)

Under nitrogen, (1-diisopropylphosphino)-(1'-diadamantylphosphino)ferrocene (603 mg, 1.0 mmol) and Di-μ-mesylbis[2'-(amino-N)[1,1'-biphenyl]-2-yl-C]dipalladium(II) (370 mg, 0.5 mmol) were placed in a 100 mL Schlenk flask and dissolved in 50 mL anhydrous dichloromethane. The reaction mixture was stirred at room temperature for 2 hours, followed by the solvent removal to yield a brown solid. The solid was slurried with 50 mL hexanes for 30 minutes, to obtain a reddish brown solid, which was filtered and dried under vacuum to yield the pure product (875 mg, 90%). $^1H$ NMR ($CD_2Cl_2$): δ=7.65-7.55 (m, 2H, Ar—H), 7.35-7.25 (m, 6H, Ar—H), 4.65-4.55 (m, 3H, Fc-H), 4.51 (m, 1H, Fc-H), 4.48 (m, 1H, Fc-H), 4.39 (m, 1H, Fc-H), 4.37 (m, 1H, Fc-H), 4.34 (m, 1H, Fc-H) 2.97 (br, 3H), 2.77 (br, 3H), 2.40 (br, 2H), 2.25 (s, 3H), 2.20-1.70 (m, 26H), 1.35-1.20 (m, 6H), 0.65-0.50 (m, 6H); $^{31}P\{^1H\}$ NMR ($CD_2Cl_2$): δ=38.94 (d), 38.65 (d).

Other metal complexes III described herein were synthesized similarly.

Example 12. [(1-diphenylphosphino)(1'-diadamantylphosphino)ferrocene][2-(2'-amino-1,1'-biphenyl)]palladium(II) methanesulfonate (III-a)

Brown solid. The general procedure for compound II-c was used, except with the replacement of (1-diisopropylphosphino)-(1'-diadamantylphosphino)ferrocene with (1-diphenylphosphino)-(1'-diadamantylphosphino) ferrocene (671 mg, 1.0 mmol). $^1H$ NMR ($CD_2Cl_2$): δ7.80-7.65 (m, 3H, Ar—H), 7.48-7.40 (m, 2H, Ar—H), 7.38-7.30 (m, 3H, Ar—H), 7.25-7.00 (m, 4H, Ar—H), 6.90-6.75 (m, 3H, Ar—H), 6.60-6.50 (m, 1H, Ar—H), 6.45-6.30 (m, 2H, Ar—H), 6.20 (d, 2H), 4.85 (m, 1H, Fc-H), 4.77 (m, 1H, Fc-H), 4.59 (m, 1H, Fc-H), 4.48 (m, 1H, Fc-H), 4.42 (m, 1H, Fc-H), 4.23 (m, 1H, Fc-H), 4.19 (m, 1H, Fc-H), 3.89 (m, 1H, Fc-H), 2.79 (s, 3H), 2.38 (s, 3H), 2.25 (m, 2H), 2.20-1.55 (m, 25H); $^{31}P\{^1H\}$ NMR ($CD_2Cl_2$): δ=34.89 (d), 25.78 (d).

[(1-dicyclohexylphosphino)(1'-diadamantylphosphino)ferrocene][2-(2'-amino-1,1'-biphenyl)]palladium(II) methanesulfonate (III-b): The general procedure for compound II-c was used, except with the replacement of (1-diisopropylphosphino)-(1'-diadamantylphosphino)ferrocene with (1-dicyclohexylphosphino)-(1'-diadamantylphosphino) ferrocene (683 mg, 1.0 mmol). The resulting product was a brown solid. $^1H$ NMR ($CD_2Cl_2$): δ=7.70-7.65 (m, 1H, Ar—H), 7.60-7.50 (m, 1H, Ar—H), 7.45-7.40 (m, 1H, Ar—H), 7.38-7.30 (m, 3H, Ar—H), 7.30-7.25 (m, 2H, Ar—H), 4.62 (m, 2H, Fc-H), 4.58 (m, 1H, Fc-H), 4.50 (m, 2H, Fc-H), 4.36 (m, 2H, Fc-H), 4.28 (m, 1H, Fc-H), 2.95 (br, 3H), 2.78 (br, 3H), 2.36 (s, 3H), 2.25 (s, 2H), 2.20-0.75 (m, 46H); $^{31}P\{^1H\}$ NMR ($CD_2Cl_2$): δ=38.93 (d), 25.97 (d).

Example 13. [(1-diisopropylphosphino)(1'-di-t-butylphosphino)ferrocene][2-(2'-amino-1,1'-biphenyl)]palladium(II) methanesulfonate (III-e)

The general procedure for compound II-c was used, except with the replacement of (1-diisopropylphosphino)-(1'-diadamantylphosphino)ferrocene with (1-diisopropylphosphino)-(1'-di-t-butylphosphino)ferrocene (446 mg, 1.0 mmol). The resulting product was a brown solid. $^1H$ NMR ($CD_2Cl_2$): δ=7.65-7.60 (m, 1H, Ar—H), 7.58-7.50 (m, 1H, Ar—H), 7.40-7.25 (m, 6H, Ar—H), 4.59 (m, 2H, Fc-H), 4.55 (m, 2H, Fc-H), 4.51 (m, 1H, Fc-H), 4.38 (m, 3H, Fc-H), 2.35 (s, 3H), 2.25-2.15 (br, 3H), 1.94 (d, 9H), 1.40-1.22 (m, 16H), 0.70-0.50 (m, 6H); $^{31}P\{^1H\}$ NMR ($CD_2Cl_2$): δ=47.08 (d), 39.07 (d).

Synthesis of Precatalysts of Formula IV

Example 14. Synthesis of Pd(Crotyl)[Fc(PAd$_2$)(PPh$_2$)]Cl (IV-c)

Under nitrogen, (1-diphenylphosphino)-(1'-diadamantylphosphino)ferrocene (671 mg, 1.0 mmol) and (2-Butenyl) chloropalladium dimer (197 mg, 0.5 mmol) were placed in a 100 mL Schlenk flask and dissolved in 50 mL anhydrous THF. The reaction mixture was stirred at room temperature for 2 hours, followed by the solvent removal to yield a brown solid. The solid was slurried with 50 mL hexanes for 30 minutes, to obtain a reddish brown solid, which was filtered and dried under vacuum to yield the pure product (747 mg, 86%). $^{31}P\{^1H\}$ NMR ($CD_2Cl_2$): δ=75.70 (d), 38.90 (d).

Other metal complexes IV described herein were synthesized similarly.

Application Studies. The ligands and catalysts described herein were used in two challenging and underrepresented class of reactions, namely $C_{sp2}$-$C_{sp3}$ coupling and P—C coupling. P—C coupling was chosen not only to demonstrate the proof of concept but also to generate some additional ligands such as adamantyl based phosphines such S-Phos, Ru-Phos, X-Phos, Amphos etc.

Example 15. $C_{sp2}$-$C_{sp3}$ Cross-Coupling

Cross coupling involving sp2-sp3 coupling chemistry is one of the most challenging reactions in organic synthesis.[19] While transition metal catalyzed cross-coupling reactions involving sp2-hybridized carbon nucleophiles and aryl or vinyl halides have been extensively examined during the past three decades,[18] studies on the chemistries with $C_{sp2}$-$C_{sp3}$ couplings are very limited.[19] Among them, Palladium and Nickel catalyzed cross-coupling reactions are two of the most extensively studied catalytic systems. Although there are some scattered reports in the literature with model substrates; major challenges, especially towards the scope of the reactions with different name reactions in cross-coupling, and especially the use of more complex drug-like molecules, remains underrepresented.[19-23] Late-stage functionalization on complex molecules has been and continues to be one of hot research areas for making this technology viable to real world applications.

The studies were initiated by evaluating a series of ferrocenyl based precatalysts with bromobenzene (PhBr) with methylmagnesium bromide (MeMgBr) using 1 mol % catalyst loading at ambient temperature in THF (Table 3). $Pd(dppf)Cl_2$, reported to be a very powerful catalyst for $C_{sp2}$-$C_{sp3}$ coupling,[3] gave poor conversion with methylmagnesium bromide. Further screening with other commercially available next generation precatalysts of ferrocenyl based bidentate ligands, namely $Pd(dcypf)Cl_2$, $Pd(dippf)Cl_2$, $Pd(dtbpf)Cl_2$, did not give satisfactory conversion either. However, $Pd(dtbpf)Cl_2$ gave moderate conversion (66%). In contract, by incorporating $Ad_2P$ moiety into ferrocenyl ligands, namely, $Pd(L1\text{-}4)Cl_2$, significantly increased the reactivity towards methylation via $C_{sp2}$-$C_{sp3}$ couplings. $Pd(L4)Cl_2$, Pd4-a, gave almost quantitative conversion in 2 h at room temperature. Interestingly Stepnicka et. al's ligand, $[Fc(P^tBu_2)(PPh_2)]PdCl_2$, did not give satisfactory conversions either (8%, entry 10), suggesting the importance of $Ad_2P$ moiety. As a baseline comparison, the reaction did not proceed at all without any catalyst addition (entry 1, Table 3).

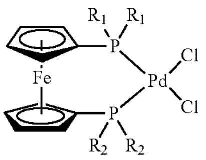

$R_1$ = Ad; $R_2$ = Ph, $(L1)PdCl_2$
$R_2$ = Cy, $(L2)PdCl_2$
$R_2$ = $^iPr$, $(L3)PdCl_2$
$R_2$ = $^tBu$, $(L4)PdCl_2$
$R_1$ = $R_2$ = Ph, $(dppf)PdCl_2$
$R_1$ = $R_2$ = Cy, $(dcypf)PdCl_2$
$R_1$ = $R_2$ = $^iPr$, $(d^ippf)PdCl_2$
$R_1$ = $R_2$ = $^tBu$, $(d^tppf)PdCl_2$

TABLE 3

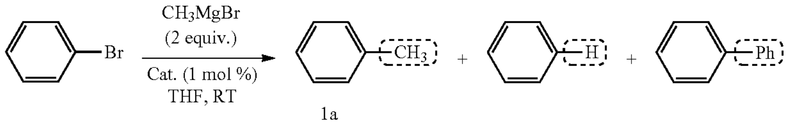

1a

| Entry | Catalyst | Ph—Br, %[b] | Ph—Me, %[b] | Ph—H/Ph, %[b] |
|---|---|---|---|---|
| 1 | No Catalyst | 100 | 0 | 0/0 |
| 2 | $(L1)PdCl_2$ | 95 | 5 | 0/0 |
| 3 | $(L2)PdCl_2$ | 18 | 80 | 1/2 |
| 4 | $(L3)PdCl_2$ | 35 | 65 | 0/0 |
| 5 | $(L4)PdCl_2$ | 0 | 97 | 2/1 |
| 6 | $(dppf)PdCl_2$ | 95 | 3 | 0/2 |
| 7 | $(dcypf)PdCl_2$ | 99 | 0 | 1/0 |
| 8 | $(d^ippf)PdCl_2$ | 90 | 8 | 1/1 |
| 9 | $(d^tbpf)PdCl_2$ | 27 | 66 | 0/7 |
| 10 | $[Fc(PPh_2)(PtBu_2)]PdCl_2$ | 86 | 8 | 6/0 |

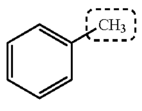

1a, 97%

TABLE 3-continued

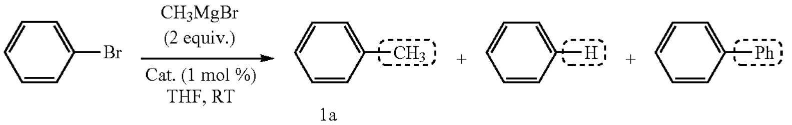

1a

| Entry | Catalyst | Ph—Br, %[b] | Ph—Me, %[b] | Ph—H/Ph, %[b] |
|---|---|---|---|---|
| 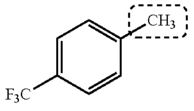 1b, 96% | | | | |
| 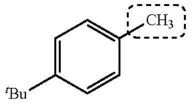 1c, 96% | | | | |
| 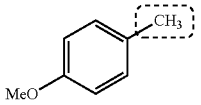 1d, 95% | | | | |
| 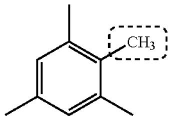 1e, 91%[c,d] | | | | |
| 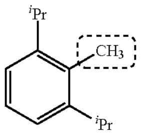 1f, 85%[c,d] | | | | |
| 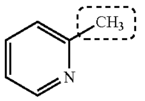 1g, 87% | | | | |
| 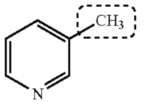 1h, 73% | | | | |
| 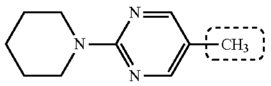 1i, 88%[d] | | | | |

[a]Conditions: Ar—X (0.8 mmol), $CH_3MgBr$ (1.6 mmol), catalyst (1 mol %), THF, room temperature or 50° C.
[b]GC conversion. [c]Reaction Temperature: 50° C.
[d]Isolated yield.

With the preferred catalyst in hand, the cross-coupling reactions between methylmagnesium bromide with various (hetero)aryl halides was examined. With relatively low catalyst loading, 1 mol % $Pd(L4)Cl_2$ (Pd4-a), very good yields were obtained for many substrates (Table 3). Both electron donating and electron withdrawing aryl bromides did not show any significant differences in terms of conversion/yield (>95% conversion). Reactions of sterically hindered aryl bromides (1e and 1f) required slightly higher temp (ca. 50° C.) for obtaining >85% isolated yields. The substrates with nitrogen-containing hetero-cycles, i.e. pyridine (1g and 1h) and pyrimidine (1i), also gave very good results. Finally, coupling of Ar—Cl was also successful, with slightly elevated temperature (1b, 75% GC conversion at 50° C.).

To further investigate the generality of this technology, various alkyl Grignard reagents were investigated (Table 5). Reagents with no β-hydrogen, such as $CD_3$-, $TMSCH_2$—, p-$TolCH_2$—, all worked well with high to excellent isolated yields (1l-p). The cyclic-alkyl reagents, such as cyclopropyl, cyclobutyl, cyclopentyl, also worked effectively (2a-s). However, reagents containing readily accessible β-hydrogen, e.g. Et-, $^{i}$Pr-, $^{n}$Bu-, $^{s}$Bu- etc. didn't work very well under these conditions using $Pd(L4)Cl_2$ (Pd4-a). Significant amounts of dehalogenated side products were observed, resulting in much lower yields (e.g., 30% GC conversion for 3a). In order to address this issue, a catalyst screening on a reaction (Table 4) of 4-Bromoanisole and $^{n}$BuMgCl with a catalyst of $[Fc(Ad_2P)(R_2P)]PdCl_2$ (R=Ph (Pd1-a), Cy (Pd2-a), $^{i}$Pr (Pd3-a) and $^{t}$Bu (Pd4-a)), as well as $(dppf)PdCl_2$ was done. While Pd4-a gave only 30% GC yield, all the other catalysts tests gave excellent conversion. Surprisingly, despite the yields, all catalysts gave almost no isomerization product, namely 4-sec-butylanisole. The reactions with Pd4-a and $(dppf)PdCl_2$ were slower than others with Pd2-a, Pd3-a. Both reactions gave significant amount of unreacted starting material, 4-bromoanisole, even after 20 hrs at room temperature.

TABLE 4

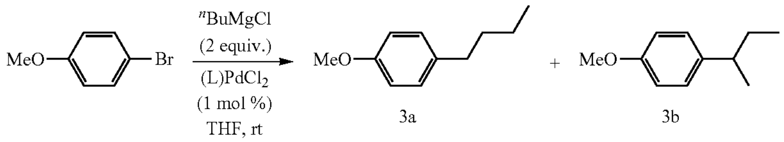

3a

3b

| Entry | Catalyst | Ar—$^{n}$Bu, %[a] | Ar—Br, %[a] | 3a/3b |
|---|---|---|---|---|
| 2 | $(L1)PdCl_2$ | 93 (85[b]) | 0 | 100/0 |
| 3 | $(L2)PdCl_2$ | 86 | 0 | 100/0 |
| 4 | $(L3)PdCl_2$ | 92 | 0 | 100/0 |
| 5 | $(L4)PdCl_2$ | 30 | 37 | 100/0 |
| 6 | $(dppf)PdCl_2$ | 90 | 10 | 40/1 |

[a]GC conversion;
[b]Isolated yield.

For the sake of synthetic simplicity, $(L1)PdCl_2$ (Pd1-a) was selected as the model catalyst for application studies on $C_{sp^2}$-$C_{sp^3}$ couplings with various alkyl Grignard reagents with readily accessible β-hydrogen (Table 5). Both primary alkyl Grignard reagents, such as EtMgBr, $^{i}$BuMgBr, and secondary alkyl Grignard reagents, such as $^{s}$Bu MgBr, $^{i}$PrMgBr, worked nicely with moderate to excellent yields. N-containing heteroaryl substrates also worked well.

TABLE 5

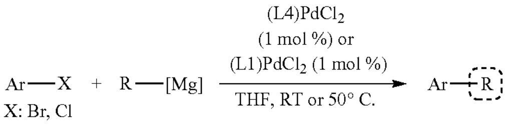

—R = alkyl with no readily accessible β-hydrogen, Cat = $(L4)PdCl_2$

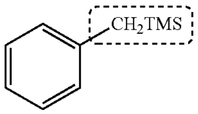

1l. 95%

TABLE 5-continued

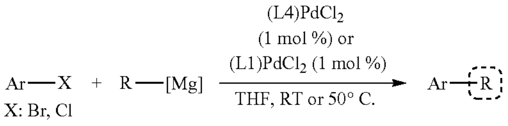

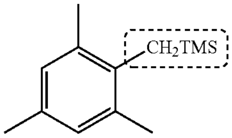

1m. 96%[b]

TABLE 5-continued

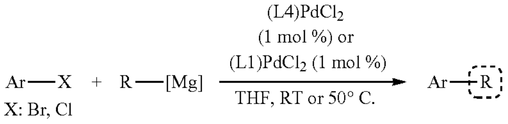

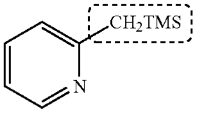

1n. 96%

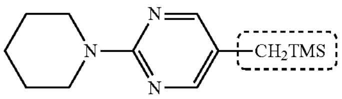

1o. 85%

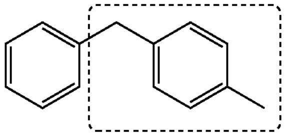

1p. 93%

TABLE 5-continued
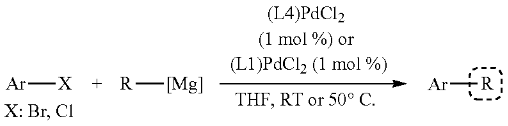
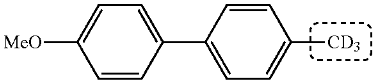
1q. 92%
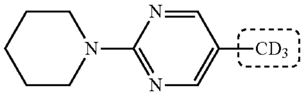
1r. 87%
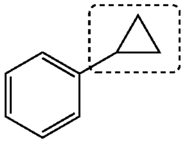
2a. 92%
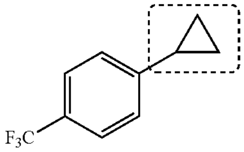
2b. 85%
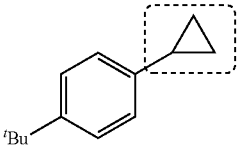
2c. 89%
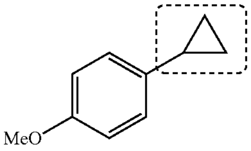
2d. 87%
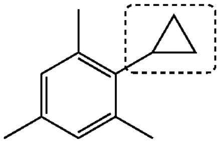
2e. 87%[b]
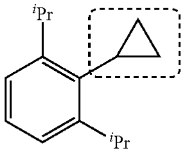
2f. 85%[a]
TABLE 5-continued
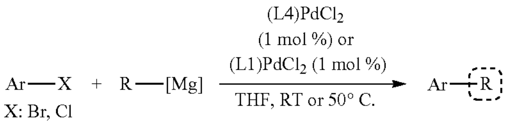
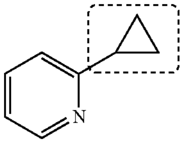
2g. 88%[c]
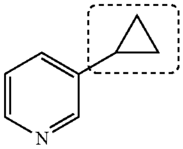
2h. 93%[c]
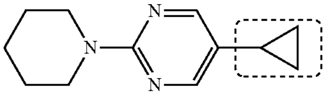
2i. 75%
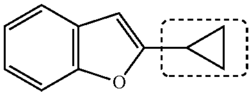
2j. 42%
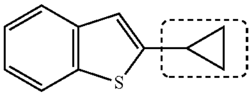
2k. 53%
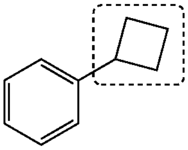
2l. 89%
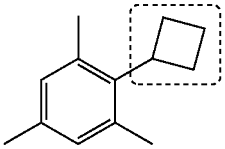
2m. 78%[b]
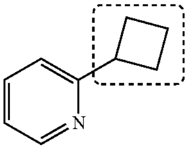
2n. 81%

TABLE 5-continued
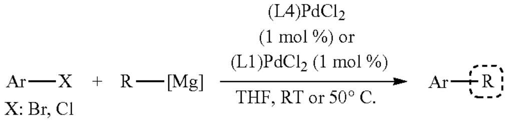
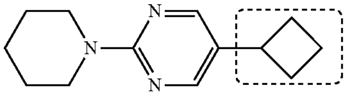
2o. 67%
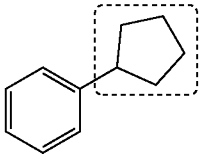
2p. 86%
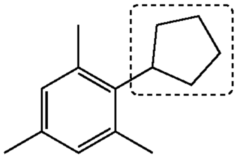
2q. 39%[b]
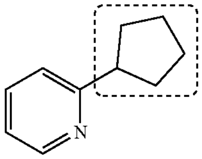
2r. 71%
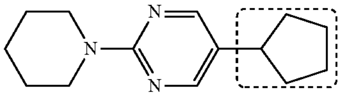
2s. 40%
—R = alkyl with readily accessible β-hydrogen, Cat = $(L1)PdCl_2$—
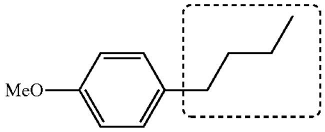
3a. 85% (30%[d])
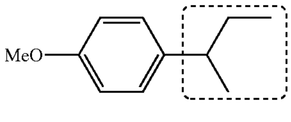
3b. 89%
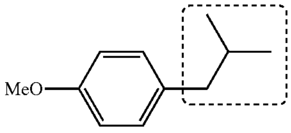
3c. 92%
TABLE 5-continued
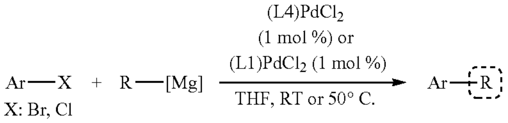
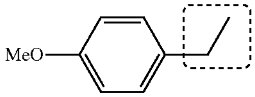
3d. 55%
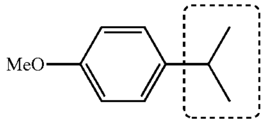
3e. 90%
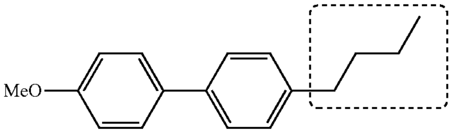
3f. 86%
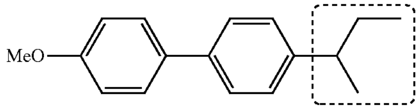
3g. 80%
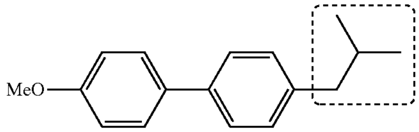
3h. 91% (from tBuMgBr)
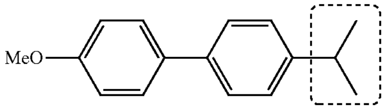
3i. 85%
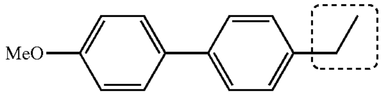
3j. 80%
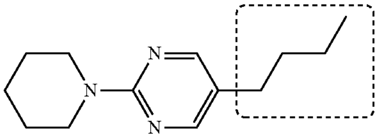
3k. 97%

TABLE 5-continued

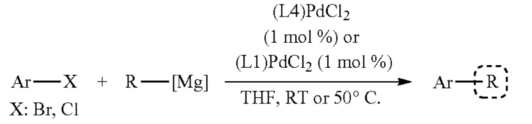

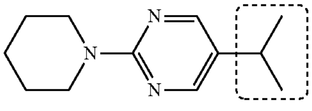

3l. 65%

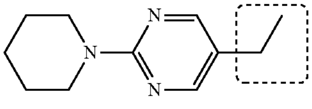

3m. 65%

[a]Conditions: Ar—X (0.8 mmol), RMgX (2.0 equiv.), catalyst (1 mol %), THF, room temperature or 50° C.
[b]Reaction Temperature: 50° C.
[c]Isolated as HCl salt.
[d]GC conversion from the reaction using $(L4)PdCl_2$ as the catalyst. 2j, 2k, 2q and 2s were produced in higher yields under Negishi (Zn) or Suzuki-Miyaura (B) conditions (see Table 5).

With successfully demonstration on the $C_{sp2}$-$C_{sp3}$ coupling using one of the challenging class of nucleophiles, namely Grignard reagents (Kumada-Corriu coupling), the generality of the coupling reactions with other commercially available $C_{sp3}$-hybridized organometallic reagents (nucleophiles), such as alkyl lithium (Murahashi-Feringa), alkyl Zinc (Negishi), and alkyl boronic acid (Suzuki-Miyaura) were also investigated for randomly selected examples (Table 6). Using similar strategy employed for alkyl Grignard reactions (i.e. balancing the steric and electronics of the ligands with that of the substrate), all name reactions investigated here gave good to excellent yields (see examples in Table 6). Owing to the lower nucleophilicity of alkyl zinc/boron reagents, the $C_{sp2}$-$C_{sp3}$ couplings typically gave better results in comparison to the alkyl Grignard reagents. For instance, product 2j was isolated with significantly higher yields from the reactions involving either cyclopropylzinc bromide or cyclopropylboronic acid, than that from the corresponding cyclopropylmagnesium bromide [(95% (B), 95% (Zn), 42% (Mg)]. Similar trend was also observed for product 2k (95% (B), 86% (Zn), 53% (Mg).

Applying the same methodology to the organozinc reagents with various functional groups also proved to be very successful. Functional groups such as terminal alkene (4b, 83%; 4c, 81%, 4d, 94% and 4e, 79%), ester (4g, 89% and 4h, 75%), cyano (4f, 86% and 4i, 80%) were all well tolerated. Interestingly, reactions with the organozinc reagents containing strong electron-withdrawing groups close to the nucleophilic carbon center did require harsher reaction conditions. For instance, the reaction with EtOC(—O)$CH_2CH_2$ZnBr required higher reaction temperature (e.g. 50° C.) with longer reaction time (>20 h) vs the room temperature reaction (<10% of GC conversion). The electronic effects on the organozinc reagents seem to be diminishing with the increase of the chain length from the nucleophilic carbon center as products 4f and 4l have been isolated in excellent yields even at room temperature.

In addition to the reported isomerization and dehalogenation side-reactions for $C_{sp2}$-$C_{sp3}$ coupling with Li and Mg based nucleophiles, the coupling under Suzuki-Miyaura conditions with alkyl boronic acids also reported to suffer proto-deborylation from the corresponding alkyl boronic acid, especially at elevated temperature. To minimize the proto-deborylation side-reaction, Molandar, Hazari and Burk have been using $BF_3K$ and MIDA boronates.[23] The direct use of alkyl boronic acids in $C_{sp2}$-$C_{sp3}$ coupling have been only demonstrated very recently in literature by Goosen et. al. with a few examples.[23a]

With the success on $C_{sp2}$-$C_{sp3}$ coupling under Kumada-Corriu (Mg), Negishi (Zn), Suzuki-Miyaura (B) conditions, finally the one of the least explored coupling reactions namely: Murahashi-Feringa (Li) coupling, especially for $C_{sp3}$-based Li nucleophiles where severe competitive halogen exchange reaction as well as the side reactions from isomerization were reported, were investigated. Because of these drawbacks, the Murahashi-Feringa coupling in general has been largely neglected for 30-40 years since its first discovery in 1970s. Until recently, Feringa group and Gessner group independently reported some significant development of Murahashi-Feringa coupling with much improved substrate scope, functional group tolerance and reaction conditions. However, the catalyst system described herein, namely Pd(L1-4)$Cl_2$, for Murahashi-Feringa coupling (Table 6) was very effective under low catalyst loadings in comparison to the reported methods which uses up to 5% Pd loadings with $O_2$ for activation of catalyst and that some of the modern ligands are not scalable for any practical applications beyond R & D. Both simple aromatic substrates (3f and 3g) and nitrogen containing heterocycles (3i) gave good to excellent yields with alkyllithiums. Interestingly, reaction with MeLi didn't require either slow addition or dilution, presumably due to the slow Li/halogen exchange reaction rate under these conditions coupled with its stability in ether solvents (1i, 73%).

As mentioned earlier, the reactions for Kumada-Corriu and Negishi for Ar—Cl required heating (ca. 50° C.), while those with Ar—Br typically proceeded at room temperature. This has been utilized for sequential $C_{sp2}$-$C_{sp3}$ coupling of the substrates containing both Cl and Br groups to isolate the desired products in excellent selectivity and yield (e.g. 3p, 87% and 3p', 91% from 3p). The mono coupled product 3p was isolated in high yield by coupling 2-bromo-3-chloropyridine with $^n$BuZnBr at room temperature, while keeping the chloro intact. Subsequent coupling of 3p (Ar—Cl) with cyclopropylboronic acid under Suzuki-Miyaura conditions at 100° C. afforded 3p' in 91% isolated yield.

TABLE 6
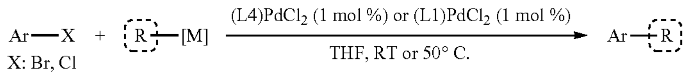
M = Zn (Negishi), B (Suzuki-Miyaura). Li (Murahashi-Feringa)
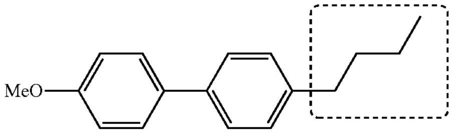
3f. 86% (Mg)
93% (Zn)
95% (B)
90% (Li)
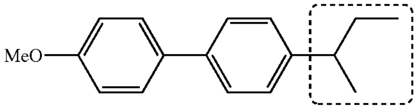
3g. 80% (Mg)
81% (Zn)
80% (B)
76% (Li)
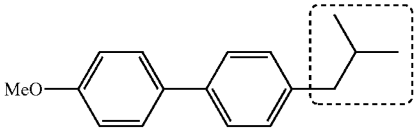
3h. 91% (Mg)
73% (from tBuZnBr)
91% (Zn)
93% (B)
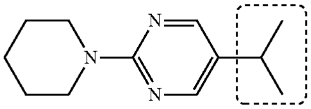
3i. 65% (Mg)
71% (Zn)
75% (B)
58% (Li)
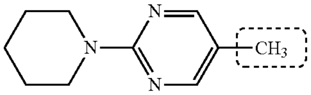
1l. 88% (Mg)
98% (Zn)
89% (B)
73% (Li)
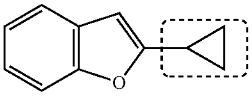
2j. 42% (Mg)
95% (Zn)
95% (B)

TABLE 6-continued
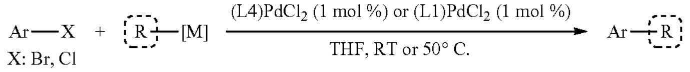
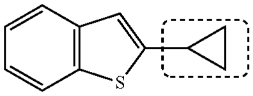
2k. 53% (Mg)
86% (Zn)
94% (B)
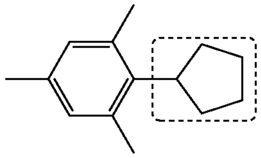
2q. 39% (Mg)
73% (B)
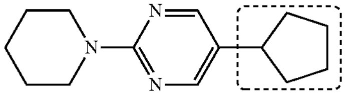
2s. 40% (Mg)
65% (B)
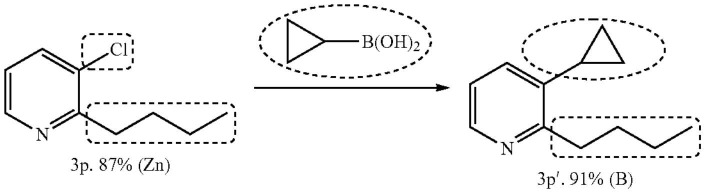
3p. 87% (Zn)
3p'. 91% (B)
from 3p
Functional Group Tolerance
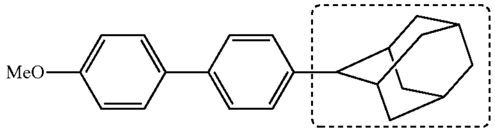
4a. 78% (Zn)
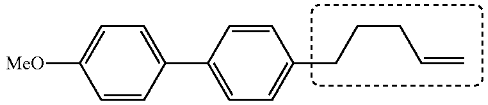
4b. 94% (Zn)
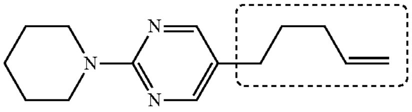
4c. 83% (Zn)
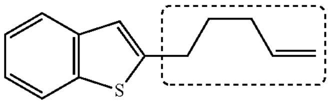
4d. 81% (Zn)

TABLE 6-continued

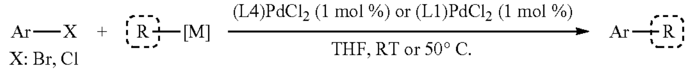

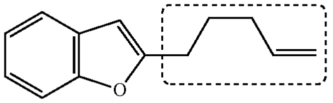

4e. 79% (Zn)

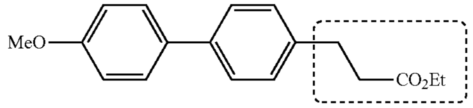

4f. 89%[b] (Zn)

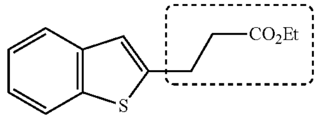

4g. 75%[b] (Zn)

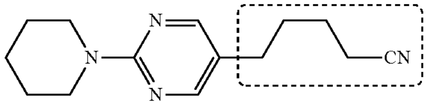

4h. 80% (Zn)

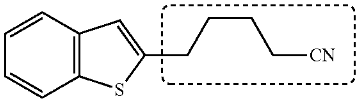

4i. 86% (Zn)

[a]Negishi conditions (Zn): Ar—X (0.8 mmol), RZnX (2.0 equiv.), catalyst (1 mol %), THF, room temperature or 50°C. Suzuki-Miyaura conditions (B): Ar—X (0.8 mmol), RB(OH)2 (2.0 equiv.), catalyst (1 mol %), $K_3PO_4$ (3 equiv.), Toluene/$H_2O$ (10/1), 100° C. Murahashi-Feringa conditions (Li): Ar—X (0.8 mmol), RLi (1.2 equiv., diluted with Toluene to 0.2M), catalyst (1 mol %), Toluene, room temperature. Slow addition using syringe pump for 2 hours.

[b]Reaction temperature: 50° C.

Deuterium labelled drugs (Table 7.1),[24] especially $CD_3$ based molecules are prominent due to the "magic methyl effect", introducing a methyl group into pharmaceuticals could positively affect biological activities, and marked improvements to drug candidates related to absorption, distribution, and metabolism in organisms upon replacing the H atom(s) with deuterium (D). In addition, deuterium atoms can be used as tracer atoms to elucidate metabolic pathways in medicinal chemistry. Cyclopropane motif is also highly significant in drug synthesis as it is the 10th most frequently found ring system in small molecule drugs (Table 7.1).[25] With success on model substrates, grafting various "alkyl fragments" onto the "drug-like" molecules, i.e. "Chemistry Informer Libraries" developed by Merck & Co by extensive research to mimic "late stage functionalization" specially geared for various cross-coupling chemistries,[26] was attempted with excellent isolated yields for 9 examples (Table 7.2). Compounds X3a, X4a, X6b and X14a represent cyclopropane ring incorporated drug like molecules. The strategy of sequential Negishi and Suzuki $C_{sp2}$-$C_{sp3}$ couplings on Cl/Br was also successfully achieved (X6a, 79% yield and X6b, 90% yield). Interestingly reaction of the same "Informer" substrate with $^{n}$BuB(OH)$_2$ at elevated temperature (100° C.) resulted in the double-coupling product X6c in excellent yields (88%). Finally, we also successfully incorporated $CD_3$ group on one of the "Informer" molecules (X15a) with moderate yield (43%). The lower yield of X15a is likely due to the strong nucleophilicity of Grignard reagent towards the functional groups. However, it is predicted that Negishi or Suzuki-Miyaura versions of the nucleophile might give better results in analogy with results on model substrates (currently these reagents are not commercially available).

TABLE 7
1) Examples for drug (drug candidate) molecules containing CD, or cyclopropyl fragment
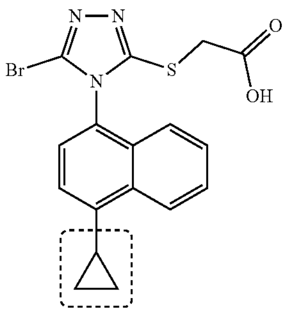
Zurampic®, 2015
AstraZenica
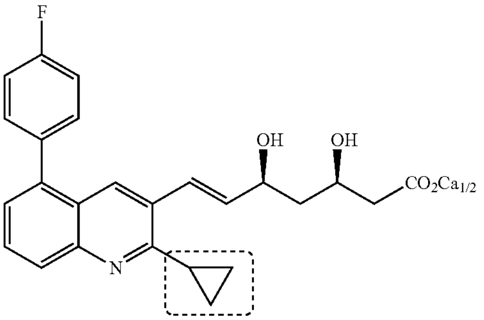
Pitavastatin, 2003
Kowa Pharmaceuticals
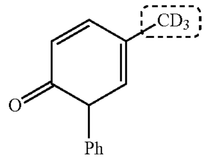
SD-560, Phase I/II
PureTech Health
2) $C_{sp}$-$C_{sp3}$ coupling technology on "Chemistry Informer Library" molecules as described herein
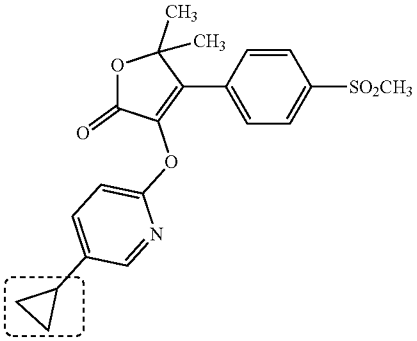
X3a (85%, Suzuki-Miyaura
$(L4)PdCl_2$)

TABLE 7-continued
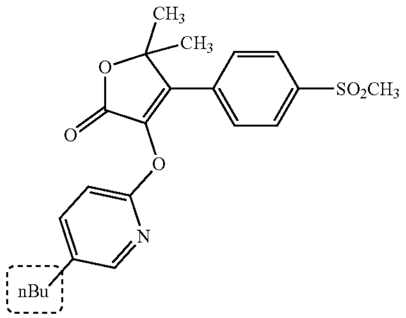
X3b (81%, Suzuki-Miyaura
(L1)$PdCl_2$)
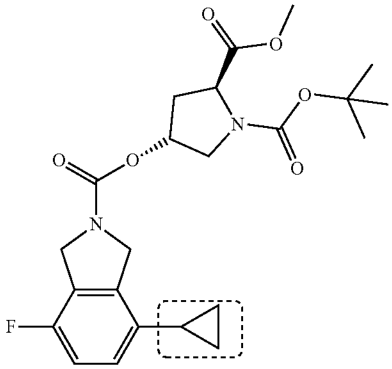
X4a (79%, Suzuki-Miyaura
(L4)$PdCl_2$)
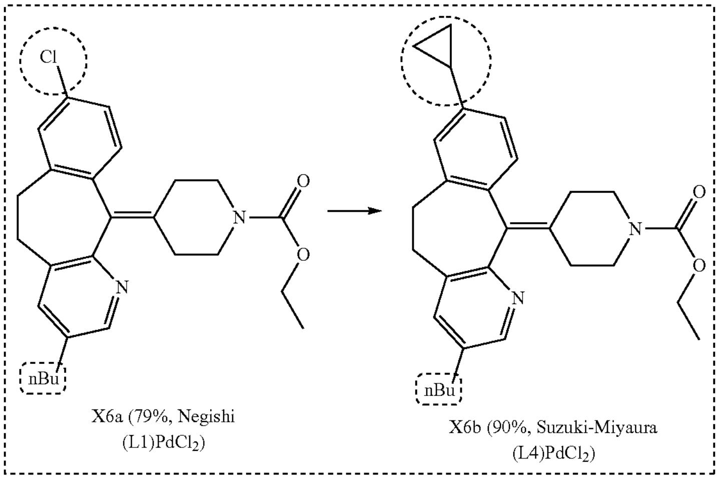
X6a (79%, Negishi
(L1)$PdCl_2$)
X6b (90%, Suzuki-Miyaura
(L4)$PdCl_2$)

TABLE 7-continued

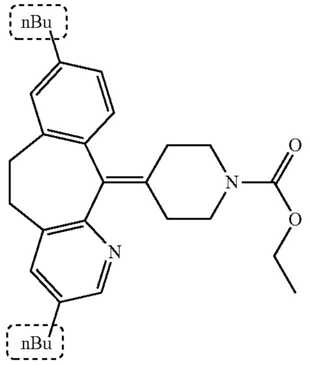

X6c (88%, Suzuki-Miyaura $(L1)PdCl_2$)

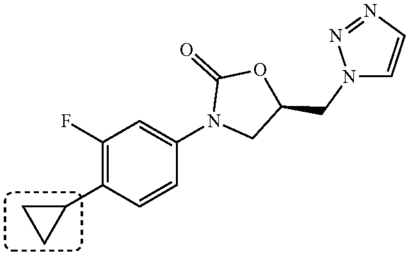

X14a (83%, Suzuki-Miyaura $(L4)PdCl_2$)

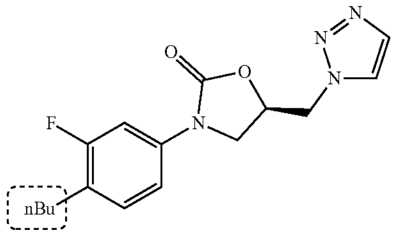

X14b (76%, Suzuki-Miyaura $(L1)PdCl_2$)

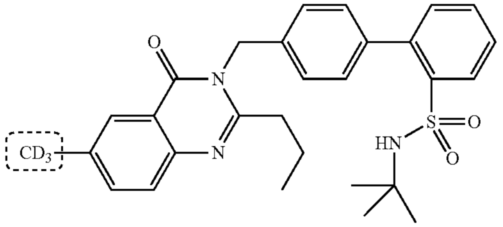

X15a (43%, Kumada-Corriu $(L4)PdCl_2$)

[a]Kumada-Corriu conditions (Mg): Ar—X (100 mg), RMgX (2.0 equiv.), catalyst (2 mol %) THF, room temperature or 50° C. Negishi conditions (Zn): Ar—X (100 mg), RZnX (2.0 equiv.), catalyst (2 mol %), THF, room temperature or 50° C. Suzuki-Miyaura conditions (B): Ar—X (100 mg), $RB(OH)_2$ (2.0 equiv.), catalyst (2 mol %), $K_3PO_4$ (3 equiv.), Toluene/$H_2O$ (10/1), 100° C.

Example 16. P—C Coupling to Make New Ligands

To further understand the usefulness of the ligand/catalyst system described herein in other cross-coupling chemistries, the P—C couplings with a view to synthesize some new ligands as well as to demonstrate the practicality of P—C coupling was investigated. Following the similar protocol reported by Buchwald[27] and Stradiotto groups[12], screening reactions with the ligands described herein and various commercially available monodentate and bidentate ligands were tested (Table 8). The monodentate ligands screened in this work all gave less than 5% $^1$H NMR conversion. On the other hand, bidentate ligands worked better in terms of $^1$H NMR conversion, mostly giving more than 20% $^1$H NMR conversion except dppe (<5%, entry 5) and Fc($PAd_2$)($PPh_2$) (8%, entry 9) giving less than 10% $^1H$ NMR conversion. Surprisingly, Fc($P^iPr_2$)($P^iPr_2$), dippf, reported to be an outstanding ligand for the P—C coupling, didn't work very well in the model reaction, only giving 24% yield (entry 7). More electron rich and bulky Fc($P^tBu_2$)($P^tBu_2$), dtbpf, did not give good conversion either (21% yield, entry 8). By replacing the ligands to the $PAd_2$ based ligands (L1-4) described herein improved the yields significantly. All gave good yields, except Fc($PAd_2$)($PPh_2$) (L1, 8%), while Fc($PAd_2$)($P^iPr_2$), L3, gave the highest yield (87%). Also noteworthy is that XantPhos gave an acceptable $^1H$ NMR conversion (45%, entry 6). The reaction without any phosphine ligand didn't proceed at all (entry 1).

TABLE 8

Reaction screening on C-P coupling

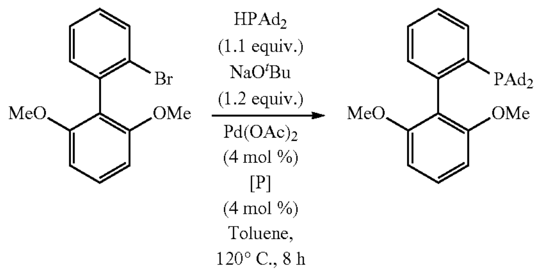

| Entry | [P] | Ar-$PAd_2$ ($^1H$ NMR yield) |
|---|---|---|
| 1 | — | 0% |
| 2 | $P^tBu_3$ | <5% |
| 3 | MorDalPhos | <5% |

TABLE 8-continued

Reaction screening on C-P coupling

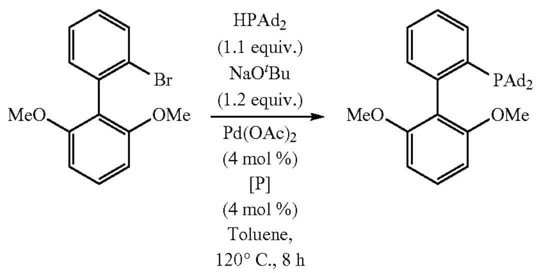

| Entry | [P] | Ar-$PAd_2$ ($^1H$ NMR yield) |
|---|---|---|
| 4 | tBuBrettPhos | <5% |
| 5 | $Ph_2PCH_2CH_2PPh_2$ (dppe) | <5% |
| 6 | XantPhos | 45% |
| 7 | Fc($P^iPr_2$)($P^iPr_2$), dippf | 24% |
| 8 | Fc($P^t$Bu2)($P^tBu_2$), dtbpf | 21% |
| 9 | Fc($PAd_2$)($PPh_2$), L1 | 8% |
| 10 | Fc($PAd_2$)($PCy_2$), L2 | 25% |
| 11 | Fc($PAd_2$)($P^iPr)_2$, L3 | 87% |
| 12 | Fc(PAd2)($P^t$Bu2), L4 | 21% |

With the optimized reaction condition and phosphine ligand in hand, this technology was further applied to synthesize various phosphine ligands. Several examples are shown below. Gratefully, several bulky Buchwald ligands were also synthesized using this P—C coupling with good to excellent isolated yields. Traditionally, these bulk Buchwald ligands are difficult to prepared, especially in industrial large scale.

| Entry | Reaction | Isolated Yield |
|---|---|---|
| 1 | 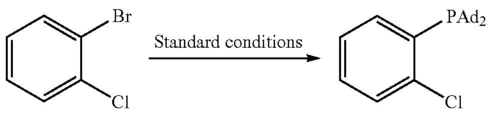  | 86% |
| 2 | 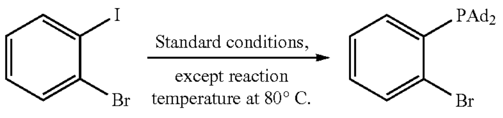  | 91% |
| 3 | 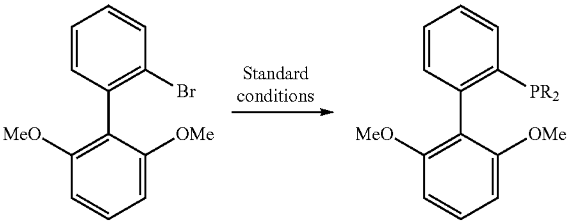  | R = Ad, 82%<br>R = $^t$Bu, 85% |

-continued

| Entry | Reaction | Isolated Yield |
|---|---|---|
| 4 | 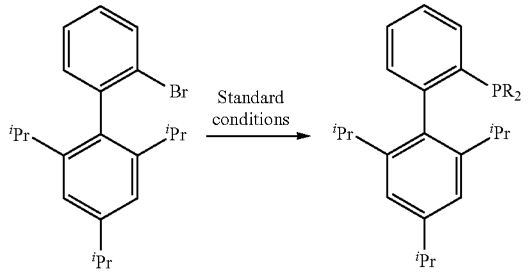 | R = Ad, 93%<br>R = $^t$Bu, 86% |

The examples provided herein are not meant to limit the scope of the invention as set forth in the claims.

REFERENCES

[1](a) Colacot, T. J. A Concise Update on the Applications of Chiral Ferrocenyl Phosphines in Homogeneous Catalysis Leading to Organic Synthesis *Chem. Rev.* 2003, 103(8), 3101. (b) Stepnicka, P. (Eds), *Ferrocenes: Ligands, Materials and Biomolecules*. Wiley, 2008; (c) Ferrocenes. Homogeneous Catalysis, Organic Synthesis and Materials Science; Togni, A., Hayashi, T., Eds.; VCH: Weinheim, Germany, 1995 (and references cited therein). (d) Atkinson, R. C. J.; Gibson, V. C.; Long, N. J. The syntheses and catalytic applications of unsymmetrical ferrocene ligands. *Chem. Soc. Rev.* 2004, 33, 313.

[2](a) Sollot, G. P.; Snead, J. L.; Portnoy, S.; Peterson, W. R., Jr.; Mertway, H. E. *Chem. Abstr.* 1965, 63, 18147b. (b) Bishop, J. J.; Davison, A.; Katcher, M. L.; Lichtenberg, D. W.; Merril, R. E.; Smart, J. C. Symmetrically disubstituted ferrocenes: I. The synthesis of potential bidentate ligands *J. Organomet. Chem.* 1971, 27, 241. (c) Marr, G.; Hunt, T. Unsymmetrically Disubstituted Ferrocenes. Part VIII. Synthesis and Reactivity of Some 2-Substituted Ferrocenyl phosphines *J. Chem. Soc. C* 1969, 1070.

[3]Hayashi, T.; Konishi, M.; Kumada, M. Dichloro[1,1'-Bis(diphenylphosphino)ferrocene]palladium(II): an effective catalyst for cross-coupling reaction of a secondary alkyl Grignard reagent with organic halides. *Tetrahedron Lett.* 1979, 20, 1871.

[4]Review: Li, H.; Seechurn, C. C. C. J.; Colacot, T. Development of Preformed Pd Catalysts for Cross-Coupling Reactions, Beyond the 2010 Nobel Prize. *ACS Catal.* 2012, 2, 1147.

[5](a) Colacot, T. J.; Shea, H. A. $Cp_2Fe(PR_2)_2PdCl_2$ (R=i-Pr, t-Bu) Complexes as Air-Stable Catalysts for Challenging Suzuki Coupling Reactions. *Org. Lett.* 2004, 6, 3731. (b) Grasa, G. A.; Colacot, T. J. α-Arylation of Ketones Using Highly Active, Air-Stable (DtBPF)$PdX_2$ (X=Cl, Br) Catalysts. *Org. Lett.* 2007, 9, 5489; c) New Trends in Cross Coupling: Theory and Applications, T. Colacot (Eds), 2015, RSC.

[6](a) Pfaltz, A. (2004). "Asymmetric Catalysis Special Feature Part II: Design of chiral ligands for asymmetric catalysis: From C2-symmetric P,P- and N,N-ligands to sterically and electronically nonsymmetrical P,N-ligands". *Proceedings of the National Academy of Sciences*. 101: 5723. (b) Yoon, T P; Jacobsen, E N (March 2003). "Privileged chiral catalysts". *Science*. 299: 1691.

[7]Keylor, M. H.; Niemeyer, Z. L.; Sigman, M. S.; Tan, K. L. Inverting Conventional Chemoselectivity in Pd-Catalyzed Amine Arylations with Multiply Halogenated Pyridines *J. Am. Chem. Soc.* 2017, 139, 10613.

[8]Chen, L.; Ren, P.; Carrow, B. P. Tri(1-adamantyl)phosphine: Expanding the Boundary of Electron-Releasing Character Available to Organophosphorus Compounds. *J. Am. Chem. Soc.* 2016, 138, 6392.

[9]Wagner, J. P.; Schreiner, P. R. London Dispersion in Molecular Chemistry—Reconsidering Steric Effects. *Angew. Chem., Int. Ed.* 2015, 54, 12274.

[10](a) Chen, L.; Francis, H.; Carrow, B. P. An "On-Cycle" Precatalyst Enables Room-Temperature Polyfluoroarylation Using Sensitive Boronic Acids. *ACS Catal.* 2018, 8, 2989. (b) Yang, Y.; Lin, Y.; Wu, Y. Palladium-Catalyzed Cascade Arylation of Vinylogous Esters Enabled by Tris(1-adamantyl)phosphine. *Org. Lett.* 2019, 21, 9286.

[11]Su, M.; Buchwald, S. L. A Bulky Biaryl Phosphine Ligand Allows for Palladium-Catalyzed Amidation of Five-Membered Heterocycles as Electrophiles. *Angew. Chem. Int. Ed.* 2012, 51, 4710.

[12]Alsabeh, P. G.; McDonald, R.; Stradiotto, M. Stoichiometric Reactivity Relevant to the Mor-DalPhos/Pd-Catalyzed Cross-Coupling of Ammonia and 1-Bromo-2-(phenylethynyl)benzene. *Organometallics* 2012, 31, 1049.

[13]Ehrentraut, A.; Zapf, A.; Beller, M. A New Efficient Palladium Catalyst for Heck Reactions of Deactivated Aryl Chlorides. *Synlett* 2000, 11, 1589.

[14](a) Butler, I.; Cullen, W.; Kim, T.; Rettig, S.; Trotter, J. 1,1'-Bis[(alkyl/aryl)phosphino]ferrocenes: Synthesis and Metal Complex Formation. Crystal Structure of Three Metal Complexes of Fe($\eta^5$-$C_5H_4PPh_2$)$_2$. *Organometallics* 1985, 4, 972-980. (b) Vosahlo, P.; Cisarova, I.; Stepnicka, P. Comparing the asymmetric dppf-type ligands with their semi-homologous counterparts. *J. Organomet. Chem.* 2018, 860, 14. (c) Elsagir, A. R.; Gaßner, F.; Gorls, H.; Dinjus, E. Bidentate ferrocenylphosphines and their palladium(II)dichloride complexes—X-ray structural and NMR spectroscopic investigations and first results of their characteristics in the Pd-catalysed cooligomerisation of 1,3-butadiene with CO2. *J. Organomet. Chem.* 2000, 597, 139.

[15]Su, M.; Buchwald, S. L. A Bulky Biaryl Phosphine Ligand Allows for Palladium-Catalyzed Amidation of Five-Membered Heterocycles as Electrophiles. *Angew. Chem. Int. Ed.* 2012, 51, 4710.

[16](a) Murata, M.; Buchwald, S. L. A general and efficient method for the palladium-catalyzed cross-coupling of thiols and secondary phosphines. *Tetrahedron* 2004, 60, 7397. (b) Lundgren, R. J.; Sappong-Kumankumah, A.; Stradiotto, M. A Highly Versatile Catalyst System for the Cross-Coupling of Aryl Chlorides and Amines. *Chem. Eur. J.* 2010, 16, 1983. (c) Lundgren, R. J.; Peters, B. D.; Alsabeh, P. G.; Stradiotto, M. A P,N-Ligand for Palladium-Catalyzed Ammonia Arylation: Coupling of Deactivated Aryl Chlorides, Chemoselective Arylations, and Room Temperature Reactions. *Angew. Chem. Int. Ed.* 2010, 49, 4071

[17]Bruno, N. C.; Tudge, M. T.; Buchwald, S. L. Design and preparation of new palladium precatalysts for C—C and C—N cross-coupling reactions. *Chem. Sci.,* 2013, 4, 916

[18]For recent reviews, see: (a) Metal-Catalyzed Cross-Coupling Reactions; de Meijere, A., Diederich, F., Eds., Wiley-VCH: New York, 2004. (b) Tamao, K.; Miyaura, N. Top. *Curr. Chem.* 2002, 219, 1. (c) Hassan, J.; Sevignon, M.; Gozzi, C.; Schulz, E.; Lemaire, M. *Chem. Rev.* 2002, 102, 1359.

[19]For recent reviews on $C_{sp2}$-$C_{sp3}$ couplings, see: (a) Hazra, S.; Johansson Seechurn, C. C. C.; Handa, S.; Colacot, T. J. The Resurrection of Murahashi Coupling after Four Decades. *ACS Catalysis,* 2021, 11, 13188; (b) Janwa, E. M.; Tharwat Mohy, E. D.; Lu, C. S.; Iyad, K.; Ali, K.; Kyriaki, P.; Janah, S. Recent Advances in Metal-Catalyzed Alkyl-Boron (C(sp3)-C(sp2)) Suzuki-Miyaura Cross-Couplings. *Catalysts,* 2020, 10, 296; (c) Campeau, L.; Hazari, N. Cross-Coupling and Related Reactions: Connecting Past Success to the Development of New Reactions for the Future. *Organometallics,* 2019, 38, 3; (d) Wang, C.; Derosa, J.; Biscoe, M. R. Configurationally stable, enantioenriched organometallic nucleophiles in stereo-specific Pd-catalyzed cross-coupling reactions: an alternative approach to asymmetric synthesis. *Chem. Sci.,* 2015, 6, 5105; (e) Jana, R.; Pathak, T. P.; Sigman, M. S. Advances in Transition Metal (Pd,Ni,Fe)-Catalyzed Cross-Coupling Reactions Using Alkyl-organometallics as Reaction Partners. *Chem. Rev.,* 2011, 111, 1417; (f) Kambe, N.; Iwasaki, T.; Terao, J. Pd-catalyzed cross-coupling reactions of alkyl halides. *Chem. Soc. Rev.,* 2011, 40, 4937.

[20]For Murahashi-Feringa coupling (Li), see: (a) Helbert, H.; Antunes, I. F.; Luurtsema, G.; Szymanski, W.; Feringa, B. L.; Elsinga, P. H. Cross-coupling of [11C] methyllithium for 11C-labelled PET tracer synthesis. *Chem. Commun.,* 2021, 57, 203; (b) Zhao, Q.; Meng, G.; Li, G.; Flach, C.; Mendelsohn, R.; Lalancette, R.; Szostak, R.; Szostak, M. IPr#—highly hindered, broadly applicable N-heterocyclic carbenes *Chem. Sci.,* 2021, 12, 10583; (c) Freure, G. P. R.; Skrotzki, E. A.; Lavertu, J. E.; Newman, S. G. Palladium-Catalyzed Cross-Coupling of Superbase-Generated C(sp3) Nucleophiles. *ACS Catal.,* 2021, 11, 12258; (d) Scherpf, T.; Steinert, H.; Großjohann, A.; Dilchert, K.; Tappen, J.; Rodstein, I.; Gessner, V. H. Efficient Pd-Catalyzed Direct Coupling of Aryl Chlorides with Alkyllithium Reagents. *Angew. Chem. Int. Ed.,* 2020, 59, 20596; (e) Heijnen, D.; Hornillos, V.; Corbet, B. P.; Giannerini, M.; Feringa, B. L. Palladium-Catalyzed C(sp3)-C(sp2) Cross-Coupling of (Trimethylsilyl)methyllithium with (Hetero)Aryl Halides. *Org. Lett.,* 2015, 17, 2262; (f) Vila, C.; Hornillos, V.; Giannerini, M.; Fananas-Mastral, M.; Feringa, B. L. Palladium-Catalysed Direct Cross-Coupling of Organolithium Reagents with Aryl and Vinyl Triflates. *Chem. Eur. J.,* 2014, 20, 13078; (g) Vila, C.; Giannerini, M.; Hornillos, V.; Fanaas-Mastral, M.; Feringa, B. L. Palladium-catalysed direct cross-coupling of secondary alkyllithium reagents. *Chem. Sci.,* 2014, 5, 1361; (h) Giannerini, M.; Fananas-Mastral, M.; Feringa, B. L. Direct catalytic cross-coupling of organolithium compounds. *Nat. Chem.* 2013, 5, 667; (i) Murahashi, S.; Yamamura, M.; Yanagisawa, K.; Mita, N.; Kondo, K. Stereoselective synthesis of alkenes and alkenyl sulfides from alkenyl halides using palladium and ruthenium catalysts. *J. Org. Chem.,* 1979, 44, 2408; (j) Yamamura, M.; Moritani, I.; Murahashi, S. The reaction of σ-vinylpalladium complexes with alkyllithiums. Stereospecific syntheses of olefins from vinyl halides and alkyllithiums. *J. Organomet. Chem.,* 1975, 91, C39.

[21]For Kumada-Corriu coupling (Mg), see: (a) Limmert, M. E.; Roy, A. H.; Hartwig, J. F. Kumada Coupling of Aryl and Vinyl Tosylates under Mild Conditions. *J. Org. Chem.* 2005, 70, 9364; (b) Hayashi, T.; Konishi, M.; Kobori, Y.; Kumada, M.; Higuchi, T.; Hirotsu, K. Dichloro[1,1'-bis(diphenylphosphino)ferrocene]palladium(II): an effective catalyst for cross-coupling of secondary and primary alkyl Grignard and alkylzinc reagents with organic halides. *J. Am. Chem. Soc.* 1984, 106, 158; (c) Tamao, K.; Kiso, Y.; Sumitani, K.; Kumada, M. Alkyl Group Isomerization in the Cross-Coupling Reaction of Secondary Alkyl Grignard Reagents with Organic Halides in the Presence of Nickel-Phosphine Complexes as Catalysts. *J. Am. Chem. Soc.* 1972, 94, 9268.

[22]For Negishi coupling (Zn), see: (a) Dilauro, G.; Azzollini, C. S.; Vitale, P.; Salomone, A.; Perna, F. M.; Capriati, V. Scalable Negishi Coupling between Organozinc Compounds and (Hetero)Aryl Bromides under Aerobic Conditions when using Bulk Water or Deep Eutectic Solvents with no Additional Ligands. *Angew. Chem.* 2021, 133, 10726; (b) Bhonde, V. R.; O'Neill, B. T.; Buchwald, S. L. An Improved System for the Aqueous Lipshutz-Negishi Cross-Coupling of Alkyl Halides with Aryl Electrophiles. *Angew. Chem. Int. Ed.* 2016, 55, 1849; (c) Atwater, B.; Chandrasoma, N.; Mitchell, D.; Rodriguez, M. J.; Pompeo, M.; Froese, R. D. J.; Organ, M. G. The Selective Cross-Coupling of Secondary Alkyl Zinc Reagents to Five-Membered-Ring Heterocycles Using Pd-PEPPSI-IHeptCl. *Angew. Chem. Int. Ed.* 2015, 54, 9502; (d) Alonso, N.; Miller, L. Z.; Munoz, J. de M.; Alcazar, J.; McQuade, D. T. Continuous Synthesis of Organozinc Halides Coupled to Negishi Reactions. *Adv. Synth. Catal.* 2014, 356, 3737; (e) Pompeo, M.; Froese, R. D. J.; Hadei, N.; Organ, M. G. Pd-PEPPSI-IPentCl: A Highly Effective Catalyst for the Selective Cross-Coupling of Secondary Organozinc Reagents. *Angew. Chem. Int. Ed.* 2012, 51, 11354; (f) Duplais, C.; Krasovskiy, A.; Lipshutz, B. H. Organozinc Chemistry Enabled by Micellar Catalysis. Palladium-Catalyzed Cross-Couplings between Alkyl and Aryl Bromides in Water at Room Temperature. *Organometallics* 2011, 30, 6090; (g) Krasovskiy, A.; Thomé, I.; Graff, J.; Krasovskaya, V.; Konopelski, P.; Duplais, C.; Lipshutz, B. H. Cross-couplings of alkyl halides with heteroaromatic halides, in water at room temperature. *Tetrahedron Letters* 2011, 52, 2203; (h) Valente, C.; Belowich, M. E.; Hadei, N.; Organ, M. G. Pd-PEPPSI Complexes and the Negishi Reaction. *Eur. J. Org. Chem.* 2010, 4343; (i) Duplais, C.; Krasovskiy, A.; Wattenberg, A.; Lipshutz, B. H. Cross-couplings between benzylic and aryl halides "on water": synthesis of diarylmethanes. *Chem. Commun.,* 2010, 46, 562; (j) Krasovskiy, A.; Duplais, C.; Lipshutz, B. H. Zn-Mediated, Pd-Catalyzed Cross-Couplings in Water at Room Temperature Without Prior Formation of Organozinc Reagents. *J. Am. Chem. Soc.* 2009, 131, 15592; (k) Han, C.; Buchwald, S. L. Negishi Coupling of Secondary Alkylzinc Halides with Aryl Bromides and Chlorides. *J. Am. Chem. Soc.* 2009, 131, 7532; (1) Luo, X.; Zhang, H.; Duan, H.; Liu, Q.; Zhu, L.; Zhang, T.; Lei, A. Superior Effect of a π-Acceptor Ligand (Phosphine-Electron-Deficient Olefin Ligand) in the Negishi Coupling Involving Alkylzinc Reagents. *Org. Lett.* 2007, 9, 4571; (m) Melzig, L.; Gavryushin, A.; Knochel, P. Direct Aminoalkylation of Arenes and Hetarenes via Ni-Catalyzed Negishi Cross-Coupling Reactions. *Org. Lett.* 2007, 9, 5529; (n) Kondolff, I.; Doucet, H.; Santelli, M. Palladium-Tetraphosphine as Catalyst Precursor for High-Turnover-Number Negishi Cross-Coupling of Alkyl- or Phenylzinc Derivatives with Aryl Bromides. *Organometallics* 2006, 25, 5219; (o) Corley, E. G.; Conrad, K.; Murry, J. A.; Savarin, C.; Holko, J.; Boice, G. Direct Synthesis of 4-Arylpiperidines via Palladium/Copper(I)-Cocatalyzed Negishi Coupling of a 4-Piperidylzinc Iodide with Aromatic Halides and Triflates. *J. Org. Chem.* 2004, 69, 5120; (p) Dai, C.; Fu, G. C. The First General Method for Palladium-Catalyzed Negishi Cross-Coupling of Aryl and Vinyl Chlorides: Use of Commercially Available Pd(P(t-Bu)3)2 as a Catalyst. *J. Am. Chem. Soc.* 2001, 123, 2719; (q) Boudier, A.; Knochel, P. Palladium catalyzed stereoselective cross-couplings and acylations of chiral secondary diorganozincs. *Tetrahedron Lett.* 1999, 40, 687.

[23]For Suzuki-Miyaura coupling (B), see: (a) Sivendran, N.; Pirk, N.; Hu, Z.; Doppiu, A.; Gooßen, L. J. Halogen-Bridged Methylnaphthyl Palladium Dimers as Versatile Catalyst Precursors in Coupling Reactions. *Angew. Chem. Int. Ed.* 2021, 60, 25151. (b) Espinosa, M. R.; Doppiu, A.; Hazari, N. Differences in the Performance of Allyl Based Palladium Precatalysts for Suzuki-Miyaura Reactions. *Adv. Synth. Catal.* 2020, 362, 5062; c) Chen, L.; Ren, P.; Carrow, B. P. Tri(1-adamantyl)phosphine: Expanding the Boundary of Electron-Releasing Character Available to Organophosphorus Compounds. *J. Am. Chem. Soc.* 2016, 138, 6392; d) Li, L.; Zhao, S.; Joshi-Pangu, A.; Diane, M.; Biscoe, M. R. Stereospecific Pd-Catalyzed Cross-Coupling Reactions of Secondary Alkylboron Nucleophiles and Aryl Chlorides. *J. Am. Chem. Soc.* 2014, 136, 14027; (e) Sandrock, D. L.; Jean-Gerard, L.; Chen, C.; Dreher, S. D.; Molander, G. A. Stereospecific Cross-Coupling of Secondary Alkyl β-Trifluoroboratoamides. *J. Am. Chem. Soc.* 2010, 132, 17108; (f) Molander, G. A.; Canturk, B. Organotrifluoroborates and Monocoordinated Palladium Complexes as Catalysts—A Perfect Combina-tion for Suzuki-Miyaura Coupling. *Angew. Chem. Int. Ed.* 2009, 48, 9240; (g) Dreher, S. D.; Dormer, P. G.; Sandrock, D. L.; Molander, G. A. Efficient Cross-Coupling of Secondary Alkyltrifluoroborates with Aryl Chlorides—Reaction Discovery Using Parallel Microscale Experimentation. *J. Am. Chem. Soc.* 2008, 130, 9257; (h) Molander, G. A.; Gormisky, P. E. Cross-Coupling of Cyclopropyl- and Cyclobutyltrifluoroborates with Aryl and Heteroaryl Chlorides. *J. Org. Chem.* 2008, 73, 7481; (i) Dreher, S. D.; Dormer, P. G.; Sandrock, D. L.; Molander, G. A. Efficient Cross-Coupling of Secondary Alkyltrifluoroborates with Aryl Chlorides-Reaction Discovery Using Parallel Microscale Experimentation. *J. Am. Chem. Soc.* 2008, 130, 9257; (j) Knapp, D. M.; Gillis, E. P.; Burke, M. D. A General Solution for Unstable Boronic Acids: Slow-Release Cross-Coupling from Air-Stable MIDA Boronates. *J. Am. Chem. Soc.* 2009, 131, 6961.

[24](a) Suna, Q.; Soule, J. Broadening of horizons in the synthesis of $CD_3$-labeled molecules. *Chem. Soc. Rev.,* 2021, 50, 10806; (b) Steverlynck, J.; Sitdikov, R.; Rueping, M. The Deuterated "Magic Methyl" Group: A Guide to Site-Selective Trideuteromethyl Incorporation and Labeling by Using $CD_3$ Reagents. *Chem. Eur. J.* 2021, 27, 11751; (c) Wang, M.; Zhao, Y.; Zhao, Y.; Shi, Z. Bioinspired design of a robust d3-methylating agent. *Sci. Adv.* 2020, 6, eaba0946; (d) Halford, B. Deuterium switcheroo breathes life into old drugs. *Chem. Eng. News* 2016, 94, 32; (b) Timmins, G. S. Deuterated drugs: where are we now? *Expert Opin. Ther. Pat.* 2014, 24, 1067; (e) Timmins, G. S. Deuterated drugs; updates and obviousness analysis. *Expert Opin. Ther. Pat.* 2017, 27, 1353; (f) Gant, T. G. Using Deuterium in Drug Discovery: Leaving the Label in the Drug. *J. Med. Chem.* 2014, 57, 3595; (g) Tung, R. D. Deuterium medicinal chemistry comes of age. *Future Med. Chem.* 2016, 8, 491; (h) Atzrodt, J.; Derdau, V.; Kerr, W. J.; Reid, M. Deuterium- and Tritium-Labelled Compounds: Applications in the Life Sciences. *Angew. Chem. Int. Ed.* 2018, 57, 1758.

[25](a) Chawner, S. J.; Cases-Thomas, M. J.; Bull, J. A. Divergent Synthesis of Cyclopropane-Containing Lead-Like Compounds, Fragments and Building Blocks through a Cobalt Catalyzed Cyclopropanation of Phenyl Vinyl Sulfide. *Eur. J. Org. Chem.* 2017, 5015; (b) Talele, T. T. The "Cyclopropyl Fragment" is a Versatile Player that Frequently Appears in Preclinical/Clinical Drug Molecules. *J. Med. Chem.* 2016, 59, 8712.

[26](a) Ray, R.; Hartwig, J. F. Oxalohydrazide Ligands for Copper-Catalyzed C—O Coupling Reactions with High Turnover Numbers. *Angew. Chem. Int. Ed.* 2021, 60, 8203; (b) Piou, T.; Slutskyy, Y.; Kevin, N. J.; Sun, Z.; Xiao, D.; Kong, J. Direct Arylation of Azoles Enabled by Pd/Cu Dual Catalysis. *Org. Lett.* 2021, 23, 1996; (c) Charboneau, D. J.; Barth, E. L.; Hazari, N.; Uehling, M. R.; Zultanski, S. L. A Widely Applicable Dual Catalytic System for Cross-Electrophile Coupling Enabled by Mechanistic Studies. *ACS Catal.* 2020, 10, 12642; (d) Larson, H.; Schultz, D.; Kalyani, D. Ni-Catalyzed C—H Arylation of Oxazoles and Benzoxazoles Using Pharmaceutically Relevant Aryl Chlorides and Bromides. *J. Org. Chem.* 2019, 84, 13092; (e) Zhang, R.; Li, G.; Wismer, M.; Vachal, P.; Colletti, S. L.; Shi, Z. C. Profiling and Application of Photoredox C(sp3)-C(sp2) Cross-Coupling in Medicinal Chemistry. *ACS Med. Chem. Lett.* 2018, 9, 773; (f) Vara, B. A.; Li, X.; Berritt, S.; Walters, C. R.; Petersson, E. J.; Molander, G. A. Scalable thioarylation of unprotected peptides and biomolecules under Ni/photoredox catalysis. *Chem. Sci.* 2018, 9, 336; (g) Fier, P. S.; Maloney, K. M. Reagent Design and Ligand Evolution for the Development of a Mild Copper-Catalyzed Hydroxylation Reaction. *Org. Lett.* 2017, 19, 3033; (h) Fier, P.

S.; Maloney, K. M. Synthesis of Complex Phenols Enabled by a Rationally Designed Hydroxide Surrogate. *Angew. Chem. Int. Ed.* 2017, 56, 4478; (i) Corcoran, E. B.; Pirnot, M. T.; Lin, S.; Dreher, S. D.; DiRocco, D. A.; Davies, I. W.; Buchwald, S. L.; MacMillan, D. W. C. Aryl amination using ligand-free Ni(II) salts and photoredox catalysis. *Science* 2016, 353, 279; (j) Kutchukian, P. S.; Dropinski, J. F.; Dykstra, K. D.; Li, B.; DiRocco, D. A.; Streck-fuss, E. C.; Campeau, L. C.; Cernak, T.; Vachal, P.; Davies, I. W.; Krska, S. W.; Dreher, S. D. Chemistry informer libraries: a chemoinformatics enabled approach to evaluate and advance synthetic methods. *Chem. Sci.* 2016, 7, 2604; (k) Greshock, T. J.; Moore, K. P.; McClain, R. T.; Bellomo, A.; Chung, C. K.; Dreher, S. D.; Kutchukian, P. S.; Peng, Z.; Davies, I. W.; Vachal, P.; Ellwart, M.; Manolikakes, S. M.; Knochel, P.; Nantermet, P. G. Synthesis of Complex Druglike Molecules by the Use of Highly Functionalized Bench-Stable Organozinc Reagents. *Angew. Chem. Int. Ed.* 2016, 55, 13714; (1) Santanilla, A. B.; Regalado, E. L.; Pereira, T.; Shevlin, M.; Bateman, K.; Campeau, L. C.; Schneeweis, J.; Berritt, S.; Shi, Z. C.; Nantermet, P.; Liu, Y.; Helmy, R.; Welch, C. J.; Vachal, P.; Davies, I. W.; Cernak, T.; Dreher, S. D. Nanomole-scale high-throughput chemistry for the synthesis of complex molecules. *Science* 2015, 347, 49.

[27]Murata, M.; Buchwald, S. L. A general and efficient method for the palladium-catalyzed cross-coupling of thiols and secondary phosphines. *Tetrahedron* 2004, 60, 7397.

We claim:

1. A compound of formula I

I

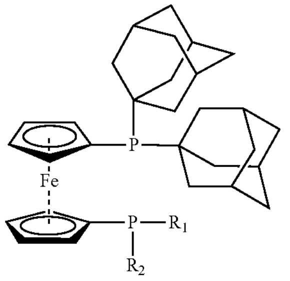

wherein $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl;

$R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; and each optional substituent, when present, is selected from the group consisting of $C_1$-$C_4$ alkyl, $C_1$-$C_4$ haloalkyl and $C_1$-$C_4$ alkoxy.

2. The compound according to claim 1 wherein $R_1$ and $R_2$ are independently selected from the group consisting of phenyl, optionally substituted phenyl, cyclohexyl, isopropyl and tert-butyl.

3. The compound according to claim 2 wherein $R_1$ and $R_2$ are each substituted phenyl.

4. The compound according to claim 1 wherein—$PR_1R_2$ is selected from the group consisting of

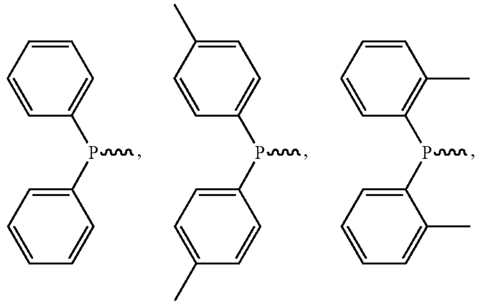

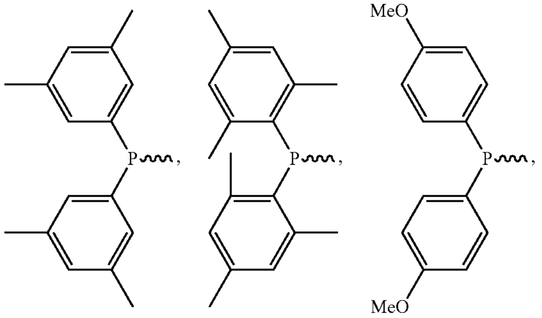

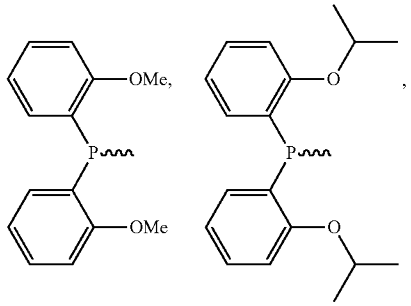

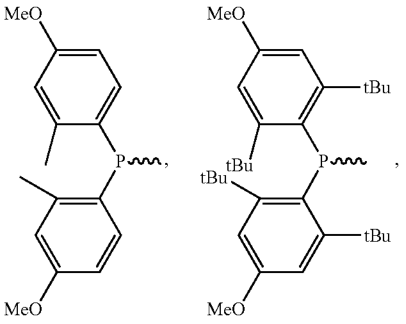

and

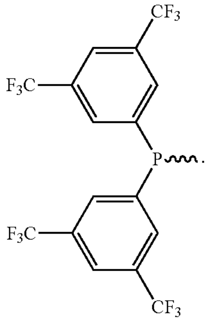

5. A ligand of formula I:

I

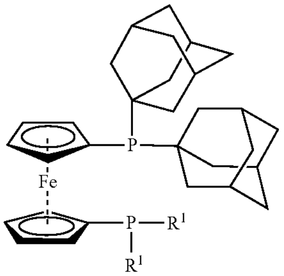

wherein $R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl;

$R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents; and each optional substituent, when present, is selected from the group consisting of $C_1$-$C_4$ alkyl, $C_1$-$C_4$ haloalkyl and $C_1$-$C_4$ alkoxy.

6. The ligand according to claim 5 wherein $R_1$ and $R_2$ are independently selected from the group consisting of phenyl, optionally substituted phenyl, cyclohexyl, isopropyl and tert-butyl.

7. The ligand according to claim 6 wherein $R_1$ and $R_2$ are each substituted phenyl.

8. The ligand according to claim 5 selected from the group consisting of

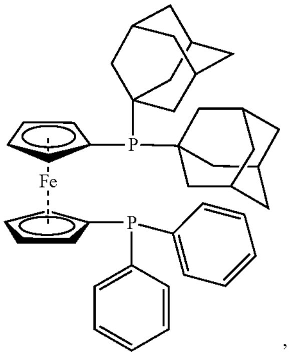

,

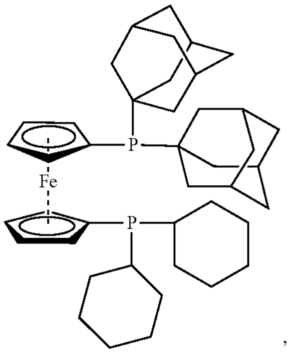

,

-continued

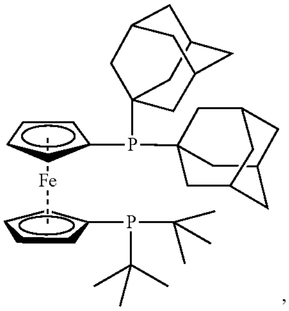

, and

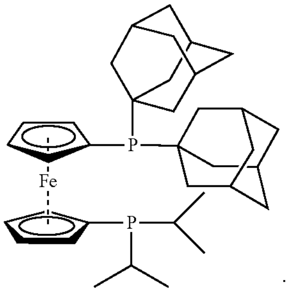

.

9. A method for performing a metal-catalyzed P—C cross-coupling reaction comprising the steps of:

contacting a ligand according to claim 5 with a metal catalyst in the presence of an aromatic solvent and a base in a reaction vessel;

adding a first substrate of formula Ar—X', wherein Ar is aryl and X' is halo and a second substrate of formula $R'_2PH$, wherein R' is selected from the group consisting of $C_1$-$C_{10}$ alkyl and $C_3$-$C_{10}$ cycloalkyl, to the reaction vessel;

heating the reaction vessel to a temperature in the range from 100° C. to 200° C. for a time sufficient to form the carbon-phosphorous bond.

10. The method of claim 9 wherein the ligand is selected from the group consisting of

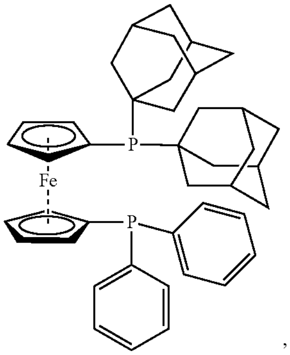

,

-continued

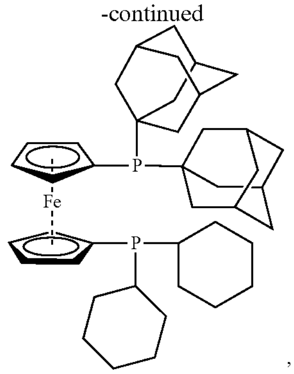

,

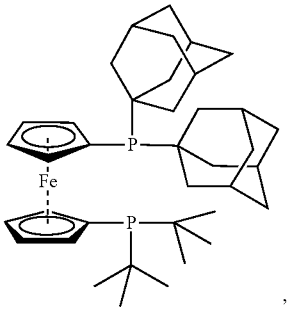

, and

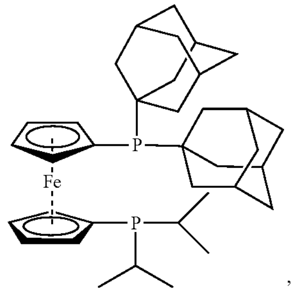

, and the catalyst is a Pd catalyst.

11. A precatalyst of formula II:

II

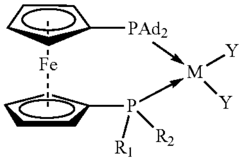

wherein

Ad is adamantyl;

$R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl;

$R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents;

each optional substituent, when present, is selected from the group consisting of $C_1$-$C_4$ alkyl, $C_1$-$C_4$ haloalkyl and $C_1$-$C_4$ alkoxy;

M is a transition metal selected from Group 9 or Group 10; and

Y is halo.

12. The precatalyst according to claim 11 wherein $R_1$ and $R_2$ are independently selected from the group consisting of phenyl, optionally substituted phenyl, cyclohexyl, isopropyl and tert-butyl.

13. The precatalyst according to claim 11 wherein $R_1$ and $R_2$ are each substituted phenyl.

14. The precatalyst according to claim 11 wherein M is selected from the group consisting of Pd, Ni, Rh, Co, Ir and Pt.

15. The precatalyst according to claim 14 wherein Mis Pd.

16. The precatalyst according to claim 11 wherein Y is selected from chloro, bromo and iodo.

17. The precatalyst according to claim 11 selected from the group consisting of

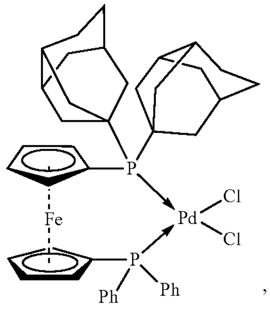

,

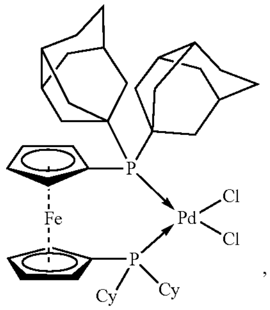

,

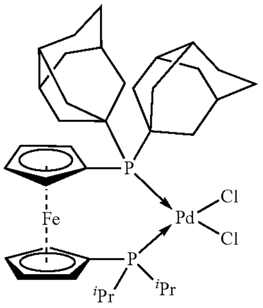

and

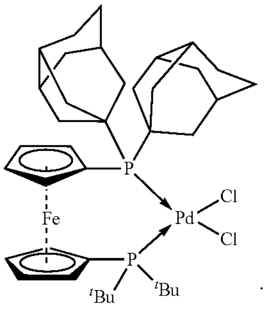

.

18. A method for performing a metal-catalyzed $C_{sp2}$-$C_{sp3}$ cross-coupling reaction comprising the steps of:

contacting a precatalyst of Formula II according to claim 11 with a first substrate and a second substrate in the presence of a solvent in a reaction vessel;

wherein the first substrate is of formula Ar—X', wherein Ar is optionally substituted aryl or optionally substituted heteroaryl and X' is chloro or bromo or iodo;

wherein the second substrate is of formula R'[M], wherein R' is selected from the group consisting of $C_1$-$C_{10}$ alkyl, $C_1$-$C_{10}$ fluoroalkyl and $C_3$-$C_{10}$ cycloalkyl, [M] is selected from the group consisting of Li, MgX', ZnX' and $B(OH)_2$ and related boron reagents, wherein X' is selected from the group consisting of chloro, bromo and iodo;

optionally, heating the reaction vessel and allowing first substrate and the second substrate to react in the presence of the precatalyst for a time sufficient for the $C_{sp2}$-$C_{sp3}$ cross-coupling to occur.

19. The method according to claim 18 wherein the first substrate is selected from the group consisting of optionally substituted phenyl, optionally substituted pyridyl, optionally substituted thienyl, and optionally substituted furyl.

20. The method according to claim 18 wherein [M] is Li, the solvent is toluene, and the reaction vessel is not heated.

21. The method according to claim 18 wherein [M] is selected from MgX' and ZnX', the solvent is tetrahydrofuran, and the reaction vessel is heated to 50° C.

22. The method according to claim 18 wherein [M] is $B(OH)_2$, the solvent is toluene and the reaction vessel is heated to 100° C.

23. A precatalyst of Formula III:

III

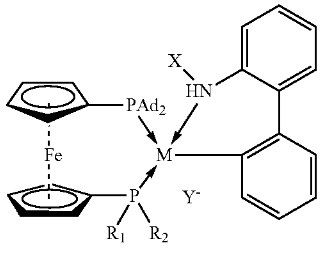

wherein

Ad is adamantyl;

$R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl;

$R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents;

each optional substituent, when present, is selected from the group consisting of $C_1$-$C_4$ alkyl, $C_1$-$C_4$ haloalkyl and $C_1$-$C_4$ alkoxy;

M is a transition metal selected from Group 9 or Group 10;

X is selected from the group consisting of H, $C_1$-$C_4$ alkyl and phenyl; and

Y" is an anion selected from the group consisting of halide, triflate ($^-$OTf), tetrafluoroborate ($^-BF_4$), hexafluorophosphate ($^-PF_6$), mesylate ($^-$OMs), tosylate ($^-$OTs), tetrakis [3,5-bis(trifluoromethyl)phenyl]borate ($^-$BArF), hexafluoro antimonate ($^-SbF_6$) and combinations thereof.

24. The precatalyst according to claim 23 wherein $R_1$ and $R_2$ are independently selected from the group consisting of phenyl, cyclohexyl, isopropyl and tert-butyl.

25. The precatalyst according to claim 23 wherein M is selected from the group consisting of Pd, Ni, Rh, Co, Ir and Pt.

26. The precatalyst according to claim 25 wherein Mis Pd.

27. The precatalyst according to claim 23 wherein X is selected from the group consisting of H, methyl and phenyl.

28. The precatalyst according to claim 23 wherein $Y^-$ is selected from the group consisting of $Cl^-$, $Br^-$, $I^-$, $^-$OTf, $^-BF_4$, $^-$OMs, $^-$OTs, $^-PF_6$, $^-$BAF, and $^-SbF_6$.

29. The precatalyst according to claim 23 selected from the group consisting of

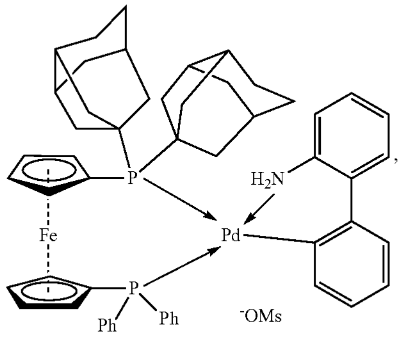

,

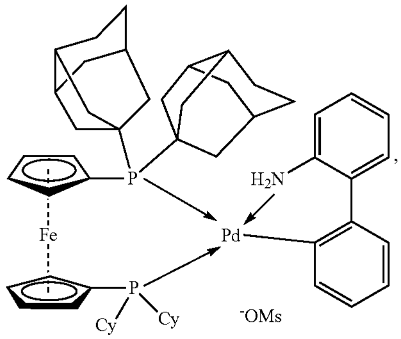

,

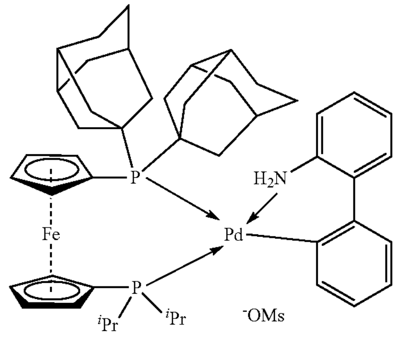

and

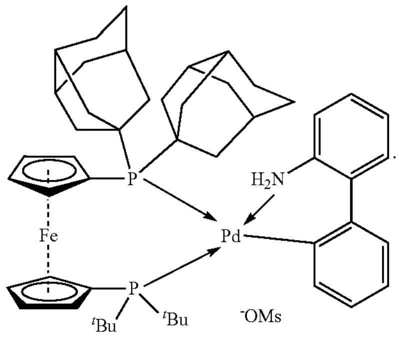

.

30. A precatalyst of formula IV:

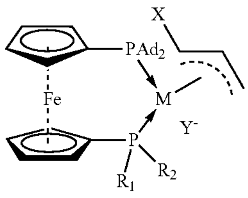

IV wherein

Ad is adamantyl;

$R_1$ and $R_2$ are independently selected from the group consisting of $C_1$-$C_{12}$ alkyl, $C_3$-$C_{12}$ cycloalkyl, $C_1$-$C_{12}$ alkoxy, —$NR_4R_5$, and optionally substituted phenyl;

$R_4$ and $R_5$ are individually selected from the group consisting of H and $C_1$-$C_{12}$ alkyl, or $R_4$ and $R_5$ together can form a saturated or unsaturated 5- or 6-membered ring, the ring optionally including one or more additional heteroatoms selected from O, S and N, and one or more optional substituents;

wherein each optional substituent, when present, is selected from the group consisting of $C_1$-$C_4$ alkyl, $C_1$-$C_4$ haloalkyl and $C_1$-$C_4$ alkoxy;

M is a transition metal selected from Group 9 or Group 10;

X is selected from the group consisting of H, $C_1$-$C_4$ alkyl and phenyl; and $Y^-$ is an anion selected from the group consisting of halide, triflate ($^-$OTf), tetrafluoroborate ($^-BF_4$), hexafluorophosphate ($^-PF_6$), mesylate ($^-$OMs), tosylate ($^-$OTs), tetrakis [3,5-bis(trifluoromethyl)phenyl]borate ($^-$BArF), hexafluoro antimonate ($^-SbF_6$) and combinations thereof.

31. The precatalyst according to claim 30 wherein $R_1$ and $R_2$ are independently selected from the group consisting of phenyl, cyclohexyl, isopropyl and tert-butyl.

32. The precatalyst according to claim 30 wherein M is selected from the group consisting of Pd, Ni, Rh, Co, Ir and Pt.

33. The precatalyst according to claim 32 wherein Mis Pd.

34. The precatalyst according to claim 30 wherein X is selected from the group consisting of H, methyl and phenyl.

35. The precatalyst according to claim 30 wherein $Y^-$ is selected from the group consisting of $Cl^-$, $Br^-$, $I^-$, $^-$OTf, $^-BF_4$, $^-$OMs, $^-$OTs, $^-PF_6$, $^-$BArF, and $^-SbF_6$.

36. The precatalyst according to claim 30 selected from the group consisting of

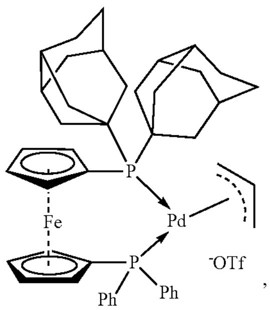

,

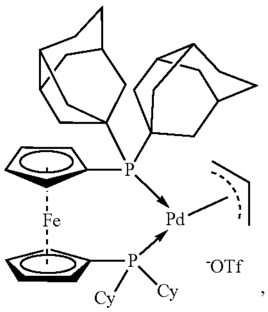

,

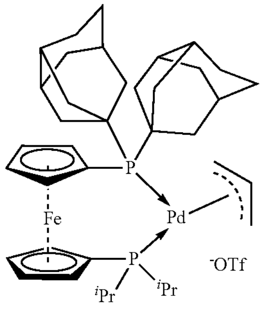

and

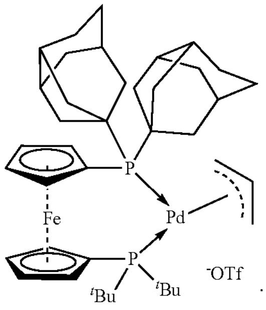

.

* * * * *